United States Patent Office 3,677,983
Patented July 18, 1972

3,677,983
POLYURETHANE PRODUCTS
Thomas K. Brotherton and John W. Lynn, Charleston, and Robert J. Knopf, St. Albans, W. Va., assignors to Union Carbide Corporation
No Drawing. Division of application Ser. No. 478,400, Aug. 9, 1965, now Patent No. 3,553,249, which is a continuation-in-part of applications Ser. No. 256,495, Jan. 25, 1963, now Patent No. 3,275,679, and Ser. No. 265,367, Mar. 15, 1963. This application Aug. 7, 1969, Ser. No. 849,299
Int. Cl. C08g 22/24, 22/26, 22/44
U.S. Cl. 260—2.5 AT                    1 Claim

ABSTRACT OF THE DISCLOSURE

Polyurethane products are obtained by reacting organic polyisocyanates which are characterized by a common structural unit, with active hydrogen containing compounds as determined according to the Zerewitinoff method. These products have a high degree of utility in fields such as cast and thermoplastic polyurethanes, reinforced plastics, elastic fibers and films, coatings, urethane foams especially rigid urethane foam products, etc.

---

This application is a divisional application of application Ser. No. 478,400 entitled "Novel Cyclic Unsaturated Isocyanates and Products Therefrom," by T. K. Brotherton, J. W. Lynn, and R. J. Knopf, filed Aug. 9, 1965, now U.S. Pat. No. 3,553,249, which in turn is a continuation-in-part of application Ser. No. 256,495 entitled "Novel Ester Isocyanates and Process for Preparation," by T. K. Brotherton, J. W. Lynn, and R. J. Knopf, filed Jan. 25, 1963, now U.S. Pat. No. 3,275,679 and application Ser. No. 265,367 entitled "Novel Halogenated Isocyanates and Process for Preparation," by T. K. Brotherton, J. W. Lynn, and R. J. Knopf, filed Mar. 15, 1963, now abandoned, all of the aforesaid applications being assigned to the same assignee as the instant application.

This invention relates to novel isocyanate compositions and to the processes for preparing the same. In one aspect, the invention relates to novel polymers of isocyanate compositions which polymers contain a plurality of ethylene bonds, i.e., $>C=C<$. In another aspect, the invention relates to novel polymers of several of the above-said isocyanate compositions, said polymers containing a plurality of pendant isocyanato groups, i.e., —NCO. In a further aspect, the invention relates to novel compositions which result from the reaction of novel isocyanates with active hydrogen compounds. In various aspects, the invention relates to the preparation of novel cast resins, thermoplastic resins, millable gum stocks and the cured products therefrom, prepolymers, elastomers, elastic and relatively non-elastic fibers, urethane foams, including flame-retardant foams, adhesives, coatings, reinforced plastics, and the like.

The novel isocyanate compounds which are contemplated can be represented by Formula I infra.

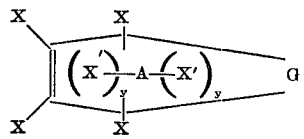

wherein X represents hydrogen; halogen, e.g., chlorine, bromine, iodine, etc.; and alkoxy which preferably contains from 1 to 6 carbon atoms; wherein X' represents hydrogen; halogen, e.g., chlorine, bromine, iodine, etc.; and alkoxy which preferably contains from 1 to 6 carbon atoms; wherein $y$ is an integer having a value of zero or one; wherein A represents oxygen or carbon; wherein G represents one of the following structures:

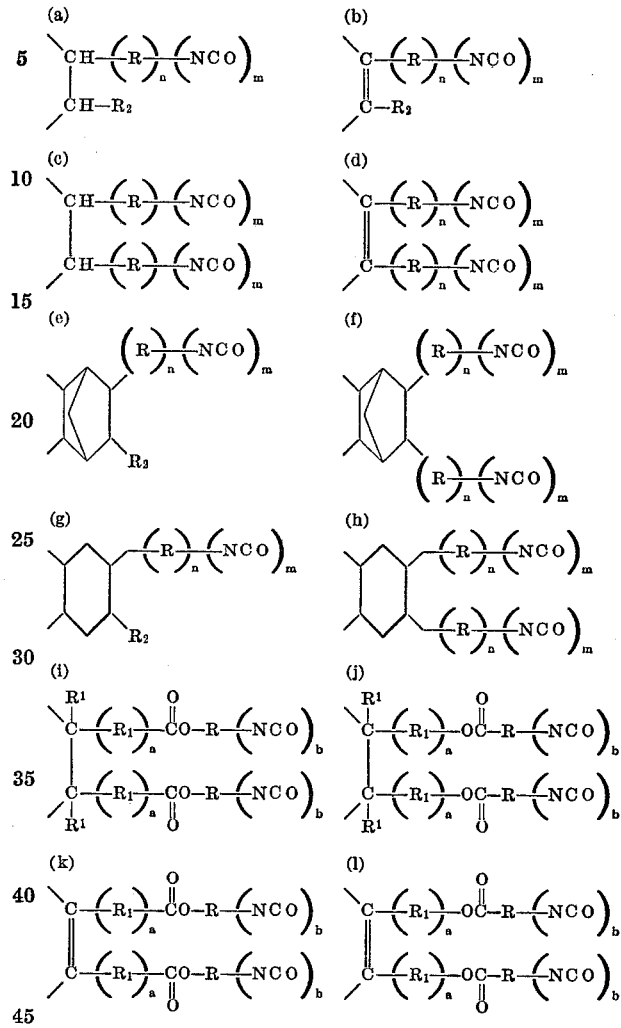

with the proviso that (1) all the X variables (and preferably the X plus X' variables) are halogen, especially chlorine, when G represents one of the structural units designated as (a) through (f) inclusive above, and (2) when A is oxygen, $y$ is zero, and when A is carbon, $y$ is one. Thus A can be the oxy group (—O—) or the

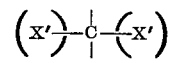

group.

In the structural units designated as (a) through (l) inclusive, the R variable represents a divalent aliphatic, alicyclic, or aromatic radical, preferably a divalent group composed of (1) carbon and hydrogen, or (2) carbon, hydrogen, and oxygen, containing up to 24 carbon atoms, and preferably still, up to 12 carbon atoms. Illustrative preferred R variables include the divalent hydrocarbon radicals, e.g., alkylene, alkenylene, cycloalkylene, cycloalkylene, arylene, alkylcycloalkylene, alkylcycloalkenylene, alkylenecycloalkyl, alkylenecycloalkenyl, alkarylene, alkylenearyl, alkenylenearyl, and the like; the divalent hydrocarbon-oxy-hydrocarbon radicals; e.g., alkyleneoxyalkyl, alkyleneoxyaryl, alkyleneoxyarylene, and the like; and the divalent carbonyloxy-containing radicals, e.g., carbonyloxyalkyl, alkyeneoxycarbonylaryl, alkylene-oxycarbonylalkyl, oxycarbonylalkyl, alkylenecarbonyloxyalkyl, and the like.

The $R_2$ variable in the appropriate structural units above represents hydrogen or a hydrocarbon group which preferably contains from 1 to 24 carbon atoms, and preferably still, from 1 to 12 carbon atoms, such as alkyl, cycloalkyl, aryl, alkaryl, and aralkyl, e.g., methyl, ethyl, propyl, butyl, dodecyl, cyclohexyl, phenyl, benzyl, phenethyl, tolyl, xylyl, and the like.

The $R_1$ variable in units (i) through (l) above represents a divalent aliphatic radical, especially a divalent aliphatic hydrocarbon radical, for example, alkenylene or alkylene of 2 to 18 carbon atoms, preferably alkenylene or alkylene of 2 to 10 carbon atoms. The variable $R^1$ represents hydrogen or alkyl which preferably contains from 1 to 6 carbons. The variable $a$ is an integer which has a value of zero or one, whereas the variable $b$ is an integer which has a value of 1 to 3.

The variable $m$ in units (a) through (h) above is an integer which has a value of from 1 to 3, preferably from 1 to 2. The variable $n$ is an integer which has a value of zero or one, with the proviso that when $n$ is zero then $m$ is one.

Various highly useful and attractive subclasses of novel isocyanate compositions which fall within the metes and bounds of Formula I supra are as follows:

the bis(isocyanatoalkyl) 5-norbornene-2,3-dicarboxylates;
the bis(isocyanatoalkenyl) 5-norbornene-2,3-dicarboxylates;
the bis(isocyanatocycloalkyl) 5-norbornene-2,3-dicarboxylates;
the bis(isocyanatoaryl) 5-norbornene-2,3-dicarboxylates;
the bis(isocyanatohydrocarbyl) 2,5-norbornadiene-2,3-dicarboxylates;
the bis(isocyanatoalkyl) 2,5-norbornadiene-2,3-dicarboxylates;
the 2,3-bis(isocyanatohydrocarbyloxycarbonylalkyl)-5-norbornenes;
the 2,3-bis(isocyanatoalkoxycarbonylalkyl)-5-norbornenes;
the bis(isocyanatohydrocarbyl)-5-norbornene-2,3-dicarboxylates;
the 2,3-bis(isocyanatoalkoxycarbonylalkyl)-2,5-norbornadienes;
the bis(isocyanatohydrocarbyl) 3,6-endo-oxo-4-cyclohexene-1,2-dicarboxylates;
the bis(isocyanatoalkyl) 3,6-endo-oxo-4-cyclohexene-1,2-dicarboxylates;
the bis(isocyanatoalkenyl) 3,6-endo-oxo-4-cyclohexene-1,2-dicarboxylates;
the bis(isocyanatoaryl) 3,6-endo-oxo-4-cyclohexene-1,2-dicarboxylates;
the bis(isocyanatohydrocarbyl) 3,6-endo-oxo-1,4-cyclohexadiene-1,2-dicarboxylates;
the bis(isocyanatoalkyl) 3,6-endo-oxo-1,4-cyclohexadiene-1,2-dicarboxylates;
the bis(isocyanatoalkenyl) 3,6-endo-oxo-1,4-cyclohexadiene-1,2-dicarboxylates;
the bis(isocyanatoaryl) 3,6-endo-oxo-1,4-cyclohexadiene-1,2-dicarboxylates;
the hexachlorinated 2-isocyanatoalkyl-5-norbornenes;
the hexachlorinated 2-isocyanatoalkenyl-5-norbornenes;
the hexachlorinated 2-isocyanatocycloalkyl-5-norbornenes;
the hexachlorinated 2-isocyanatocycloalkenyl-5-norbornenes;
the hexachlorinated 2-isocyanatoaryl-5-norbornenes;
the hexachlorinated 2-isocyanatoalkaryl-5-norbornenes;
the hexachlorinated 2-(isocyanatoalkoxyalkyl)-5-norbornenes;
the hexachlorinated 2-(isocyanatoaryloxyalkyl)-5-norbornenes;
the hexachlorinated isocyanatoalnyl 5-norbornene-2-carboxylates;
the hexachlorinated isocyanatoaryl 5-norbornene-2-carboxylates;
the hexachlorinated 5-nornoren-2-ylalkyl isocyanatoalkanoates;
the hexachlorinated 2,3-bis(isocyanatoalkyl)-5-norbornenes;
the hexachlorinated 2,3-bis(isocyanatoalkenyl)-5-norbornenes;
the hexachlorinated 2,3-bis(isocyanatocycloalkyl)-5-norbornenes;
the hexachlorinated 2,3-bis(isocyanatoaryl)5-norbornenes;
the hexachlorinated 2,3-bis(isocyanatoalkoxyalkyl)-5-norbornenes;
the hexachlorinated 2,3-bis(isocyanatoaryloxyalkyl)-5-norbornenes;
the hexachlorinated bis(isocyanatoalkyl) 5-norbornene-2,3-dicarboxylates;
the hexachlorinated bis(isocyanatoaryl) 5-norbornene-2,3-dicarboxylates;
the hexachlorinated 5-norbornenyl-2,3-dialkyl bis(isocyanatoalkanoates);
the hexachlorinated 2-isocyanatoalkyl-2,5-norbornadienes;
the hexachlorinated 2,3-bis(isocyanatoalkyl)-2,5-norbornadienes;
the hexachlorinated 2,3-bis(isocyanatoalkenyl)-2,5-norbornadienes;
the hexachlorinated 2,3-bis(isocyanatocycloalkyl)-2,5-norbornadienes;
the hexachlorinated 2,3-bis(isocyanatocycloalkenyl)-2,5-norbornadienes;
the hexachlorinated 2,3-bis(isocyanatoaryl)-2,5-norbornadienes;
the hexachlorinated 2,3-bis(isocyanatoalkaryl)-2,5-norbornadienes;
the hexachlorinated 2,3-bis(isodyanatoalkoxyalkyl)-2,5-norbornadienes;
the hexachlorinated 2,3-bis(isocyanatoaryloxyalkyl)-2,5-norbornadienes;
the hexachlorinated bis(isocyanatoalkyl) 2,5-norbornadiene-2,3-dicarboxylates;
the hexachlorinated bis(isocyanatoaryl) 2,5-norbornadiene-2,3-dicarboxylates;
the hexachlorinated 2,5-norbornadienyl-2,3-dialkyl bis(isocyanatoalkanoates);
the hexachlorinated 5-norborenyl-2-alkyl diisocyanatoacylate;
the hexachlorinated 5-norbornenyl-2-alkyl 3,5-diisocyanatobenzoates;
the hexachlorinated norborn-5-en-2-ylalkyl isocyanates;
the hexachlorinated bis(isocyanatoalkyl) 1,4:5,8-dimethano-1,2,3,4,5,8,9,10-octahydronaphthalene-2,3-dicarboxylate;
the hexachlorinated octahydro-2-(isocyanatoalkyl)-1,4:5,8-dimethanonaphthalene;
and the like.

Specific novel isocyanate compounds which are contemplated include, for example, 1,4,5,6,7,7-hexachloro-5-norbornenyl-2-methyl 3,5-diisocyanatobenzoate,
8-(1,4,5,6,7,7-hexachloronorborn-5-en-2-yl)octyl isocyanate,
4-(1,4,5,6,7,7-hexachloronorborn-5-en-yl(butyl isocyanate,
2-(1,4,5,6,7,7-hexachloro-5-norbornenyl)methyl 2,4-diisocyanatophenyl ether,
bis(2-isocyanatoethyl) 5-norbornene-2,3-dicarboxylate,
bis(2-isocyanato-1-methylethyl) 5-norbornene-2,3-dicarboxylate,
bis(3-isocyanatopropyl) 5-norbornene-2,3-dicarboxylate,
bis(18-isocyanatooctadecyl) 5-norbornene-2,3-dicarboxylate, bis(2,4-diisocyanatobutyl) 5-norbornene-2,3-
dicarboxylate,
bis(6,12,18-triisocyanatooctadecyl) 5-norbornene-2,3-
dicarboxylate,
bis(4-isocyanatobut-2-enyl) 5-norbornene-2,3-
dicarboxylate,
bis(12-isocyanatododec-5-enyl) 5-norbornene-2,3-
dicarboxylate,
bis(4-isocyanatocyclohexyl) 5-norbornene-2,3-
dicarboxylate,
bis(3,5-diisocyanatocyclohexyl) 5-norbornene-2,3-
dicarboxylate,
bis(2,4-diisocyanatophenyl) 3,6-endo-oxo-4-cyclohexene-
1,2-dicarboxylate,
bis(4-isocyanatocyclohexyl) 3,6-endo-oxo-4-cyclohexene-
1,2-dicarboxylate,
bis(2-isocyanatoethyl) 3,6-endo-oxo-1,4-cyclohexadiene-
1,2-dicarboxylate,
bis(4-isocyanatocyclohexyl) 3,6-endo-oxo-1,4-
cyclohexadiene-1,2-dicarboxylate,
bis(4-isocyanatophenyl) 3,6-endo-oxo-1,4-cyclohexadiene-
1,2-dicarboxylate,
bis(3,5-diisocyanatophenyl) 3,6-endo-oxo-1,4-
cyclohexadiene-1,2-dicarboxylate,
2-isocyanato-1,4,5,6,7,7-hexachloro-5-norbornene,
2-isocyanatomethyl-1,4,5,6,7,7-hexachloro-5-norbornene,
2-(4-isocyanatobutyl)-1,4,5,6,7,7-hexachloro-5-
norbornene,
2-(10-isocyanatodecyl)-1,4,5,6,7,7-hexachloro-5-
norbornene,
2-(18-isocyanatooctadecyl)-1,4,5,6,7,7-hexachloro-5-
norbornene,
2-(24-isocyanatotetracosyl)-1,4,5,6,7,7-hexachloro-5-
norbornene,
2-(24-diisocyanatobutyl)-1,4,5,6,7,7-hexachloro-5-
norbornene,
2-(4-isocyanatobuten-2-yl)-1,4,5,6,7,7-hexachloro-5-
norbornene,
2-(8-isocyanatoocten-4-yl)-1,5,6,7,7-hexachloro-5-
norbornene,
2-(12-isocyanatododecen-5-yl)-1,5,6,7,7-hexachloro-5-
norbornene,
2-(8,10-diisocyanatooctadecen-4-yl)-1,4,5,6,7,7-
hexachloro-5-norbornene,
2-(4-isocyanatocyclohexyl)-1,4,5,6,7,7-hexachloro-5-
norbornene,
2-(3,5-diisocyanatocyclohexyl)-1,4,5,6,7,7-hexachloro-5-
norbornene,
2-(2,4,6-triisocyanatocyclohexyl)-1,4,5,6,7,7-hexachloro-
5-norbornene,
2-(4-isocyanatocyclohexen-2-yl)-1,4,5,6,7,7-hexachloro-
5-norbornene,
2-(4-isocyanatophenyl)-1,4,5,6,7,7-hexachloro-5-
norbornene,
2-(2,6-diisocyanatophenyl)-1,4,5,6,7,7-hexachloro-5-
norbornene,
2-(4-isocyanatonaphthyl)-1,4,5,6,7,7-hexachloro-5-
norbornene,
2-(4-isocyanato-2,6-dimethylphenyl)-1,4,5,6,7,7-
hexachloro-5-norbornene,
2-(4-isocyanatobutoxymethyl)-1,4,5,6,7,7-hexachloro-5-
norbornene,
2-(12-isocyanatododecoxymethyl)-1,4,5,6,7,7-hexachloro-
5-norbornene,
2-(2,4-diisocyanatophenoxymethyl)-1,4,5,6,7,7-
hexachloro-5-norbornene,
2-(2,4,6-triisocyanatophenoxymethyl)-1,4,5,6,7,7-
hexachloro-5-norbornene,
2-isocyanatoethyl 1,4,5,6,7,7-hexachloro-5-norbornene-2-
carboxylate,
3-isocyanatopropyl 1,4,5,6,7,7-hexachloro-5-norbornene-
2-carboxylate,
2-isocyanato-1-methyl 1,4,5,6,7,7-hexachloro-5-
norbornene-2-carboxylate,
2,6-diisocyanatophenyl 1,4,5,6,7,7-hexachloro-5-
norbornene-2-carboxylate,
2,4,6-triisocyanatophenyl 1,4,5,6,7,7-hexachloro-5-
norbornene-2-carboxylate,
1,4,5,6,7,7-hexachloro-5-norbornen-2-ylmethyl
isocyanatoacetate,
1,4,5,6,7,7-hexachloro-5-norbornen-2-ylmethyl
3,5-diisocyanatobenzoate,
2,3-bis(isocyanatomethyl)-1,4,5,6,7,7-hexachloro-5-
norbornene,
2,3-bis(2-isocyanatoethyl)-1,4,5,6,7,7-hexachloro-5-
norbornene,
2,3-bis(2-isocyanato-1-methylethyl)-1,4,5,6,7,7-
hexachloro-5-norbornene,
2,3-bis(18-isocyanatooctadecyl)-1,4,5,6,7,7-hexachloro-
5-norbornene,
2,3-bis(24-isocyanatotetracosyl)-1,4,5,6,7,7-hexachloro-
5-norbornene,
2,3-bis(6,10-diisocyanatodecyl)-1,4,5,6,7,7-hexachloro-
5-norbornene,
2,3-bis(6,12,18-triisocyanatooctadecyl)-1,4,5,6,7,7-
hexachloro-5-norbornene,
2,3-bis(4-isocyanatobuten-2-yl)-1,4,5,6,7,7-hexachloro-5-
norbornene,
2,3-bis(19-isocyanatononadecen-10-yl)-1,4,5,6,7,7-
hexachloro-5-norbornene,
2,3-bis(8,10-diisocyanatooctadecen-4-yl)-1,4,5,6,7,7-
hexachloro-5-norbornene,
2,3-bis(4-isocyanatocyclohexyl)-1,4,5,6,7,7-hexachloro-
5-norbornene,
2,3-bis(3,5-diisocyanatocyclohexyl)-1,4,5,6,7,7-
hexachloro-5-norbornene,
2,3-bis(2,4,6-triisocyanatocyclohexyl)-1,4,5,6,7,7-
hexachloro-5-norbornene,
2,3-bis(4-isocyanatocyclohexen-2-yl)-1,4,5,6,7,7-
hexachloro-5-norbornene,
2,3-bis(3,5-diisocyanatocyclohexen-2-yl)-1,4,5,6,7,7-
hexachloro-5-norbornene,
2,3-bis[4-(3-isocyanatopropyl)cyclohexyl]-1,4,5,6,7,7-
hexachloro-5-norbornene,
2,3-bis[4-(4-isocyanatobutyl)cyclohexen-2-yl]-1,4,5,6,7,7-
hexachloro-5-norbornene,
2,3-bis[4-(8-isocyanatoocten-5-yl)cyclohexen-2-yl]-
1,4,5,6,7,7-hexachloro-5-norbornene,
2,3-bis(3-methyl-4-isocyanatocyclohexyl)-1,4,5,6,7,7-
hexachloro-5-norbornene,
2,3-bis(2,6-dimethyl-4-isocyanatocyclohexyl)-1,4,5,6,7,7-
hexachloro-5-norbornene,
2,3-bis(4-isocyanatophenyl)-1,4,5,6,7,7-hexachloro-5-
norbornene,
2,3-bis(2,6-diisocyanatophenyl)-1,4,5,6,7,7-hexachloro-
5-norbornene,
2,3-bis(4-isocyanatonaphthyl)-1,4,5,6,7,7-hexachloro-5-
norbornene,
2,3-bis(4-isocyanato-2,6-dimethylphenyl)-1,4,5,6,7,7-
hexachloro-5-norbornene,
2,3-bis(4-isocyanatobutoxymethyl)-1,4,5,6,7,7-hexachloro-
5-norbornene,
2,3-bis(1,2-isocyanatododecoxymethyl)-1,4,5,6,7,7-
hexachloro-5-norbornene,
2,3-bis(2,4-diisocyanatophenoxymethyl)-1,4,5,6,7,7-
hexachloro-5-norbornene,
bis(2-isocyanatoethyl) 1,4,5,6,7,7-hexachloro-5-
norbornene-2,3-dicarboxylate,
bis(3-isocyanatopropyl) 1,4,5,6,7,7-hexachloro-5-
norbornene-2,3-dicarboxylate,
bis(2,6-diisocyanatophenyl) 1,4,5,6,7,7-hexachloro-5-
norbornene-2,3-dicarboxylate,
bis(2,4,6-triisocyanatophenyl) 1,4,5,6,7,7-hexachloro-5-
norbornene-2,3-dicarboxylate,
1,4,5,6,7,7-hexachloro-5-norbornenyl-2,3-dimethyl
bis(isocyanatoacetate),
1,4,5,6,7,7-hexachloro-5-norbornenyl-2,3-dimethyl
bis(3,5-diisocyanatobenzoate),
2-(2-isocyanatoethyl)-3-(5-isocyanatopentyl)-1,4,5,6,7,7-
hexachloro-5-norbornene, 2-(3-isocyanatopropyl)-3-(4-isocyanatobuten-2-yl)-
1,4,5,6,7,7-hexachloro-5-norbornene,
2-(7-isocyanatoheptyl)-3-(4-isocyanatocyclohexyl)-
1,4,5,6,7,7-hexachloro-5-norbornene,
2-(4-isocyanatophenyl)-3-(3,5-diisocyanatophenyl)-
1,4,5,6,7,7-hexachloro-5-norbornene,
2-(4-isocyanatophenyl)-3-(2-isocyanatoethyl)-1,4,5,6,7,7-
hexachloro-5-norbornene,
2-isocyanato-1,4,5,6,7,7-hexachloro-2,5-norbornadiene,
2-isocyanatomethyl-1,4,5,6,7,7-hexachloro-2,5-
norbornadiene,
2,3-bis(isocyanatomethyl)-1,4,5,6,7,7-hexachloro-2,5-
norbornadiene,
2-isocyanatomethyl-1,4,5,6,7,7-hexachloro-2,5-
norbornadiene,
2,3-bis(isocyanatomethyl)-1,4,5,6,7,7-hexachloro-2,5-
norbornadiene,
3-isocyanatopropyl 1,4,5,6,7,7-hexachloro-2,5-
norbornadiene-2-carboxylate,
bis(2-isocyanatoethyl) 1,4,5,6,7,7-hexachloro-2,5-
norbornadiene-2,3-dicarboxylate,
2,3-diisocyanato-1,4,5,6,7,7-hexachloro-2,5-norbornadiene,
2,3-bis(isocyanatomethyl)-1,4,5,6,7,7-hexachloro-2,5-
norbornadiene,
2,3-bis(2-isocyanatoethyl)-1,4,5,6,7,7-hexachloro-2,5-
norbornadiene,
2,3-bis(4-isocyanatobutyl)-1,4,5,6,7,7-hexachloro-2,5-
norbornadiene,
2,3-bis(18-isocyanatooctadecyl)-1,4,5,6,7,7-hexachloro-
2,5-norbornadiene,
2,3-bis(6,12,18-triisocyanatooctadecyl)-1,4,5,6,7,7-
hexachloro-2,5-norbornadiene,
2,3-bis(4-isocyanatobuten-2-yl)-1,4,5,6,7,7-hexachloro-
2,5-norbornadiene,
2,3-bis(12-isocyanatododecen-5-yl)-1,4,5,6,7,7-
hexachloro-2,5-norbornadiene,
2,3-bis(8,10-diisocyanatooctadecen-4-yl)-1,4,5,6,7,7-
hexachloro-2,5-norbornadiene,
2,3-bis(4-isocyanatocyclohexyl)-1,4,5,6,7,7-hexachloro-
2,5-norbornadiene,
2,3-bis(2,4,6-triisocyanatocyclohexyl)-1,4,5,6,7,7-
hexachloro-2,5-norbornadiene,
2,3-bis(4-isocyanatocyclohexen-2-yl)-1,4,5,6,7,7-
hexachloro-2,5-norbornadiene,
2,3-bis(3,5-diisocyanatocyclohexen-2-yl)-1,4,5,6,7,7-
hexachloro-2,5-norbornadiene,
2,3-bis(2,6-dimethyl-4-isocyanatocyclohexyl)-1,4,5,6,7,7-
hexachloro-2,5-norbornadiene,
2,3-bis(4-isocyanatophenyl)-1,4,5,6,7,7-hexachloro-2,5-
norbornadiene,
2,3-bis(2,6-diisocyanatophenyl)-1,4,5,6,7,7-hexachloro-
2,5-norbornadiene,
2,3-bis(4-isocyanatonaphthyl)-1,4,5,6,7,7-hexachloro-2,5-
norbornadiene,
2,3-bis(4-isocyanato-2,6-dimethylphenyl)-1,4,5,6,7,7-
hexachloro-2,5-norbornadiene,
2,3-bis(4-isocyanatobutoxymethyl)-1,4,5,6,7,7-hexachloro-
2,5-norbornadiene,
2,3-bis(12-isocyanatododecoxymethyl)-1,4,5,6,7,7-
hexachloro-2,5-norbornadiene,
2,3-bis(2,4-diisocyanatophenoxymethyl)-1,4,5,6,7,7-
hexachloro-2,5-norbornadiene,
bis(2-isocyanatoethyl) 1,4,5,6,7,7-hexachloro-2,5-
norbornadiene-2,3-dicarboxylate,
bis(3-isocyanatopropyl) 1,4,5,6,7,7-hexachloro-2,5-
norbornadiene-2,3-dicarboxylate,
bis(2,6-diisocyanatophenyl) 1,4,5,6,7,7-hexachloro-2,5-
norbornadiene-2,3-dicarboxylate,
1,4,5,6,7,7-hexachloro-2,5-norbornadienyl-2,3-dimethyl
bis(isocyanatoacetate),
1,4,5,6,7,7-hexachloro-2,5-norbornadienyl-2,3-dimethyl
bis(3,5-diisocyanatobenzoate),
2-(2-isocyanatopentyl)-1,4,5,6,7,7-hexachloro-2,5-
norbornadiene,
2-(3-isocyanatopropyl)-3-(4-isocyanatobuten-2-yl)-
1,4,5,6,7,7-hexachloro-2,5-norbornadiene,
2-(7-isocyanatoheptyl)-3-(4-isocyanatocyclohexyl)-
1,4,5,6,7,7-hexachloro-2,5-norbornadiene,
2-(4-isocyanatophenyl)-3-(3,5-diisocyanatophenyl)-
1,4,5,6,7,7-hexachloro-2,5-norbornadiene,
2-(4-isocyanatophenyl)-3-(2-isocyanatoethyl)-1,4,5,6,7,7-
hexachloro-2,5-norbornadiene,
bis(2-isocyanatoethyl) 5,6,7,8,12,12-hexachloro-1,5:5,8-
dimethano-1,2,3,4,5,8,9,10-octahydronaphthalene-2,3-
dicarboxylate,
bis(2-isocyanatoethyl) 5,6,7,8,11,11-hexachloro-5,8-
methano-1,2,3,4,5,8,9,10-octahydronaphthalene-2,3-
dicarboxylate,
5,6,7,8,9,9-hexachloro-1,2,3,4,4a,5,8,8a-octahydro-2-
(isocyanatomethyl)-1,4:5,8-dimethanonaphthalene,
5,6,7,8,9,9-hexachloro-1,2,3,4,4a,5,8,8a-octahydro-2,3-
bis(isocyanatomethyl)-1,4:5,8-dimethanonaphthalene,
5,6,7,8,9,9-hexachloro-1,2,3,4,4a,5,8,8a-octahydro-2-(2-
isocyanatoethyl)-1,4:5,8-dimethanonaphthalene,
5,6,7,8-tetrachloro-9,9-dimethoxy-1,2,3,4,4a,5,8,8a-
octahydro-2-(isocyanatomethyl)-1,4:5,8-dimethano-
naphthalene,
5,6,7,8-tetrachloro-9,9-dimethoxy-1,2,3,4,4a,5,8,8a-
octahydro-2,3-bis(isocyanatomethyl)-1,4:5,8-
dimethanonaphthalene,
5,6,7,8-tetrachloro-9,9-dimethoxy-1,2,3,4,4a,5,8,8a-
octahydro-2(2-isocyanatoethyl)-1,4:5,8-dimethano-
naphthalene, and the like.

The novel isocyanates which are embraced within Formula I supra can be produced by the Diels-Alder reaction of a mono- and polyhalogenated cyclopentadiene, e.g. hexachloropentadiene; an alkoxy-substituted halogenated cyclopentadiene, e.g., dimethoxytetrachlorocyclopentadiene; a non-halogenated cyclopentadiene, e.g. cyclopentadiene, methylcyclopentadiene, propylcyclopentadiene; furan; and the like, and an appropriate dienophile. The dienophilic compounds which are suitable for use in the Diels-Alder reaction with the appropriate cyclopentadiene include, among others, those represented by the formulae:

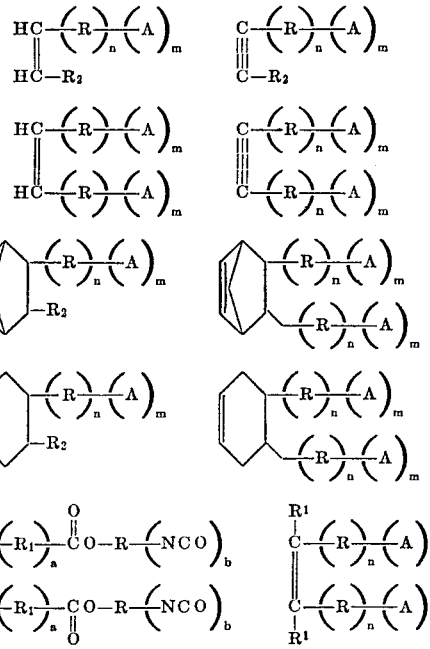

wherein A represents hydrogen, nitro, amino, or isocyanato groups, and wherein R, $R_2$, $R^1$, $R_1$, $a$, $b$, $n$, and $m$ have the meanings set out in Formula I supra.

In those instances wherein A represents hydrogen, the Diels-Alder reaction product can be nitrated, reduced to the amine, and finally reacted with phosgene to obtain the desired isocyanate. In those instances wherein A represents a nitro or amino group, the Diels-Alder product can be converted to the isocyanate by reduction and phosgenation, or merely by phosgenation depending up the group present. In some instances the dienophile may itself contain one or more isocyanate groups so that upon reaction with the appropriate cyclopentadiene compound the novel isocyanate is obtained directly. In other instances, an indirect route may be more practical for economic considerations. For example, the dienophile may contain one or more amino groups which can subsequently be treated with phosgene to obtain the isocyanate after the Diels-Alder reaction is completed. Alternatively, an unsaturated compound containing one or more nitro groups can serve as the dienophile, whereupon after the Diels-Alder reaction is completed, the nitro groups are reduced to the amine by known methods followed by phosgenation to the isocyanate. In some instances wherein it is not economically advantageous or practical to employ a nitro, amino, or isocyanato dienophile, other synthetic routes are available to the appropriate isocyanates. For example, 2-(2,4-diisocyanatophenyl)-1,4,5,6,7,7-hexachloro-5 - norbornene was prepared by nitration, reduction and phosgenation of 1,4,5,6,7,7-hexachloro-2-phenylnorborn-5-ene, the Diels-Alder adduct of hexachlorocyclopentadiene with styrene. Nitration was accomplished with a mixture of sulfuric acid and fuming nitric acid. The 2,4-dinitro isomer obtained by recrystallization of the crude nitration product was catalytically hydrogenated to the diamine in acetic acid or isopropanol with platinum oxide catalyst and the diamine, without isolation, was phosgenated in o-dichlorobenzene solution to afford the corresponding diisocyanate. The unusually inert character of both the chlorine atoms and the aliphatic double bond in adducts of hexachlorocyclopentadiene is strikingly demonstrated by the above reaction sequence. Neither the strongly acidic conditions of nitration nor the vigorous conditions of hydrogenation (acetic acid/platinum oxide) affects these normally-sensitive functional groups.

The reaction of the appropriate cyclopentadiene and unsaturated isocyanate, amino, or nitro compound, as the case may be, can be effected at a temperature of from about 50° C., to about 250° C., preferably from about 75° C. to about 200° C., for a period of time sufficient to form the composition. Depending upon the choice of reactants and temperature employed, the reaction period may vary from as little as about 1 hour, or less, to about 100 hours, or longer.

While reaction temperatures within the aforementioned range of from about 50° C. to about 250° C., have been found desirable, temperatures above and below this range can also be employed. However, from economic consideration the optimum yield and rate of reaction are attained within the aforesaid range. The particular temperature employed will be dependent, in part, upon the diene and dienophilic starting material.

The mol ratio of appropriate cyclopentadiene compound to the unsaturated isocyanate, amino, or nitro compound, can vary over a considerable range. For example, a mol ratio of diene to dienophile of from about 0.1:1.0 to about 10:1.0 and more preferably from about 1.0 to 4.0:1.0 can be employed. The pressure employed in the process is not necessarily critical and the reaction can be effected at atmospheric, subatmospheric or superatmospheric pressures.

In various instances, it may be desirable to conduct the reaction in the presence of an inert, normally liquid organic vehicle, although the use of a vehicle is not required. Suitable vehicles include, among others, aromatic hydrocarbons, such as toluene, xylene, benzene, naphthalene, diphenyl, ethylbenzene; cycloaliphatic hydrocarbons, such as cyclohexane, methylcyclpentane; the chlorinated aromatic hydrocarbons, such as chlorobenzene, orthodichlorobenzene; and the like.

Recovery of the desired reaction product can be effected by one of many common techniques such as filtration, distillation, extraction, vacuum sublimation, and the like.

Among the unsaturated ester isocyanates which can be employed as the dienophilic component in the Diels-Alder reaction include, among others, bis(2-isocyanotoethyl) fumarate,
bis(3-isocyanatopropyl) glutaconate,
bis(2-isocyanato-1-methylethyl) fumarate,
bis(5-isocyanatopentyl) beta-hydromuconate,
bis(2,2-dimethyl-3-isocyanatopropyl) fumarate,
bis(9-isocyanatononyl) fumarate,
bis(5,6,7-triethyl-9-isocyanatononyl) fumarate,
2-isocyanatoethyl 3-isocyanatopropyl glutaconate,
bis(2-isocyanatoethyl) acetylenedicarboxylate,
bis(4-isocyanato-2-butenyl) glutaconate,
bis(4-isocyanato-2-butenyl) itaconate,
bis(5-isocyanato-3-pentenyl) fumarate,
bis(9-isocyanato-5-nonenyl) itaconate,
bis(3,4-dimethyl-5-isocyanato-3-pentenyl) glutaconate,
bis(2-methyl-4-ethyl-6-isocyanato-2-hexenyl) itaconate,
bis(5,6,7-tirethyl-9-isocyanato-4-nonenyl) glutaconate,
4-isocyanato-2-butenyl 3-isocyanatopropyl fumarate,
4-isocyanato-2-butenyl 5-isocyanato-3-pentenyl glutaconate,
bis(2-phenyl-3-isocyanatopropyl) fumarate,
bis(3-styryl-5-isocyanatopentyl) glutaconate,
bis(4-tolyl-6-isocyanatohexyl) itaconate,
bis(7-mesityl-9-isocyanatononyl) glutaconate,
bis(2-cyclohexyl-3-isocyanatopropyl) itaconate,
bis(4-cyclohexyl-6-isocyanatohexyl) fumarate,
bis(3-cycloheptyl-5-isocyanatopentyl) itaconate,
bis(3-cyclohexenyl-5-isocyanatopentyl) glutaconate,
bis(2-isocyanatocyclobutyl) fumarate,
bis(3-isocyanatocyclopentyl) fumarate,
bis(4-isocyanatocyclohexyl) glutaconate,
bis(5-isocyanatocycloheptyl) itaconate,
bis(3-isocyanato-4-cyclopentenyl) beta-hydromuconate,
bis(6-isocyanato-7-cyclooctenyl) fumarate,
bis(3-isocyanatocyclopentylmethyl) fumarate,
bis(3-isocyanato-2-ethylcyclopentyl) glutaconate,
bis(3-isocyanato-5-methylcyclohexyl) fumarate,
bis(3-isocyanato-5,6-dimethylcyclohexyl) glutaconate,
bis(3-isocyanato-4,5-diethylcyclopentyl) fumarate,
bis(2-isocayanatophenyl) fumarate,
bis(3-isocyanatophenyl) glutaconate,
bis(7-isocyanato-2-naphthyl) alpha-hydromuconate,
bis(7-isocyanato-1-naphthyl) beta-hydromuconate,
bis(4'-isocyanato-4-biphenylyl) itaconate,
bis(5-isocyanato-2-indenyl) maleate,
bis(4-isocyanatobenzyl) fumarate,
bis(7-isocyanatonaphthylmethyl) itaconate,
bis[4(3'-isocyanatopropyl)phenyl] maleate,
bis(4-isocyanatomethylphenyl) fumarate,
bis[2(3'-isocyanatopropyl)naphthyl] glutaconate,
bis(4-isocyanato-2-methylphenyl) alpha-hydromuconate,
bis(4-isocyanato-3-cumenyl) fumarate,
bis(4-isocyanato-2-methoxyphenyl) glutaconate,
bis(4-isocyanatostyryl) itaconate,
bis(4-isocyanatocinnamyl) fumarate,
bis[4(4'-isocyanato-2'-butenyl)phenyl] glutaconate, and the like.

Although the preferred diisocyanates of this invention contain no elements other than carbon, hydrogen, oxygen and nitrogen, the molecule can be substituted with various organic and inorganic radicals containing such groups as ether, sulfide, polysulfide, sulfone, sulfoxide, ester, nitro, nitrile, and carbonate groups.

The bicycloalkenyl dienophiles, e.g., 2-isocyanatomethylnorborn-5-ene, are prepared by the Diels-Alder reaction of cyclopentadiene and an appropriate, dienophile, e.g., allylamine. The preparation of these compounds is the subject matter of an application entitled "Novel Unsaturated Isocyanates And Process For Preparation" by T. K. Brotherton and J. W. Lynn, Ser. No. 88,279, filed Feb. 10, 1961, now U.S. Pat. No. 3,141,900, and assigned to the same assignee as the instant invention.

The olefinically unsaturated isocyanates which are employed in preparing the novel compositions of this invention are themselves prepared by the reaction of the corresponding ester diamine dihydrohalide with a carbonyl dihalide. The preparation of the olefinically unsaturated ester isocyanates such as bis(2-isocyanatoethyl) fumarate, bis(4-isocyanatophenyl) fumarate, and the like, is the subject matter of an application entitled "Novel Olefinically Unsaturated Diisocyanates and Process for Preparation" by T. K. Brotherton and J. W. Lynn, Ser. No. 212,480, filed July 25, 1962, and assigned to the same assignee as the instant invention and now abandoned.

In general, the conversion of the ester diamine salt to the ester diisocyanate is accomplished by sparging a carbonyl dihalide, more preferably phosgene, through a slurry of the ester diamine dihydrohalide contained in an inert, normally liquid reaction medium at a temperature within the range of from about 100° C. to about 225° C., more preferably from about 125° C. to about 170° C., and thereafter recovering the ester diisocyanate. In either instance, it is believed that the intermediate carbamoyl chloride is first formed from the free amine and subsequently thermally degraded to the diisocyanate at the reaction temperature employed. The process can be conducted in either a batch type or continuous reactor.

The preparation of the olefinically unsaturated ester diamine hydrohalide, such as bis(2-aminoethyl) fumarate dihydrohalide, bis(4-aminophenyl) fumarate dihydrohalide, and the like is the subject matter of an application entitled "Novel Amino Esters of Olefinically Unsaturated Polycarboxylic Acids and Process for Preparation" by T. K. Brotherton and J. W. Lynn, Ser. No. 212,481, filed July 25, 1962, and assigned to the same assignee as the instant invention and now abandoned.

The starting materials can be prepared, as indicated in the examples, and in the aforementioned copending application, by the reaction of an olefinically unsaturated polycarboxylic acid halide, such as fumaryl chloride, and a hydroxy amine hydrohalide, such as monoethanolamine hydrohalide, at a temperature of from about 65° to about 95° C., for several hours. The ester diamine dihydrohalide is then isolated, as for example, by filtration and then washed and dried. By the aforementioned process the ester diamine dihydrohalides can be obtained in yields of about 95 percent and higher. For further information regarding the production of the ester diamines hydrohalides reference is hereby made to the disclosure of the aforementioned application.

The novel isocyanates are an extremely useful class of compounds which possess exceptionally attractive and outstanding properties. The reaction products of the novel aliphatic isocyanates are highly resistant to sunlight or ultra-violet light degradation. Many of the novel isocyanates are virtually nonlachrymators. Moreover, several of the novel isocyanates are relatively inexpensive compounds which may readily compete with commercially available diisocyanates.

Of significance with regard to many of the novel isocyanates are their ability to undergo both vinyl polymerization and isocyanate condensation polymerization. For example, the novel polymerizable ethylenically unsaturated isocyanates can be homopolymerized or copolymerized with a host of ethylenically unsaturated compounds, e.g., styrene, vinyl chloride, butadiene, isoprene, chloroprene, ethyl acrylate, methyl acrylate, etc., through a polymerizable ethylenic bond of the reactant(s), under conventional vinyl polymerization conditions, to give polymers of varying molecular weight which contain a plurality of pendant or free isocyanato groups. The resulting polyisocyanato-containing polymers then can be subjected to isocyanate condensation polymerization reactions with an active polyhydrogen compound, e.g., polyol, poly- amine, etc., to give useful three dimensional, crosslinked solid products which can be termed poly(vinyl urethanes), poly(vinyl ureas), etc., depending on the active hydrogen compound employed.

The reaction of the novel polymerizable ethylenically unsaturated isocyanates of Formula I supra, on the other hand, with an active monohydrogen compound, e.g., monoamine, alkanol, etc., results in novel ethylenically unsaturated compounds which in turn can be polymerized with an ethylenically unsaturated organic compound which contains at least one polymerizable ethylenic bond (through the polymerizable carbon to carbon double bond) to yield a myriad of polymeric products.

Isocyanate condensation polymerization reactions involving a difunctional compound such as a diol, diamine, etc., with the novel polyethylenically unsaturated diisocyanates of Formula I can yield linear polyethylenically unsaturated polymeric products which products can be crosslinked to useful solids by reaction with olefins, e.g., divinylbenzene, butadiene, and the like.

Crosslinked poly(vinyl urethanes) can also be prepared via a "one shot" process which involves concurrent vinyl and condensation polymerization reactions.

Thus, it is apparent that the novel polymerizable ethylenically unsaturated isocyanates permit the wedding of low costly vinyl monomers, i.e., ethylenically unsaturated organic monomers which contain at least one polymerizable ethylenic bond, with high performance polyurethanes, polyureas, and the like. This advantage has significance in the development of a myriad of products (based on several of the novel isocyanates) which have exceptionally strong commercial and economic attractiveness.

A most noteworthy feature of the novel isocyanates, in particular the novel chlorinated polyisocyanates, is their exceptional ability to impart into products such as foams, coatings, castings, reinforced plastics, elastomers, etc., outstanding characteristics and properties. Moreover, the low cost of many of the novel hexachlorinated isocyanates makes them potentially commercially attractive in, for example, the urea and/or urethane fields.

In many instances, novel pourable polyisocyanates such as the hexachlorinated 2,3 - bis(isocyanatoalkyl) 5 - norbornene-2,3 - dicarboxylates, e.g., bis-(2-isocyanatoethyl) 1,4,5,6,7,7-hexachloro-5-norbornene - 2,3 - dicarboxylate, can be employed in the preparation of flame-retardant foams, especially rigid foams, which exhibit the characteristic of charring rather than dripping during the burning test. The novel hexachlorinated polyisocyanates in admixture with polyisocyanates especially those produced by the phosgenation of the reaction products of aniline and formaldehyde represent a particularly attractive aspect of the invention as will become apparent hereinafter.

In one aspect, the invention is directed to the preparation of novel products which result from the reaction of the novel isocyanates such as those exemplified by Formula I with compounds which contain at least one reactive hydrogen as determined according to the Zerewitinoff test described by Wohler in the Journal of the American Chemical Society, volume 48, p. 3181 (1927). Illustrative classes of compounds which contain at least one active hydrogen include, for instance, alcohols, amines, carboxylic acids, phenols, ureas, urethanes, hydrazines, water, ammonia, hydrogen sulfide, imines, thiourea, sulfimides, amides, thiols, amino alcohols, sulfonamides, hydrazones, semi-carbazones, oximes, hydroxycarboxylic acids, aminocarboxylic acids, vinyl polymers which contain a plurality of pendant active hydrogen substituents such as hydroxyl or amino, and the like. In addition, the hydrogen substituent may be activated by proximity to a carbonyl group. The active hydrogen organic compounds represent a preferred class.

Illustrative of the aforesaid active hydrogen compounds are the hydroxyl-containing compounds, especially those which possess at least one alcoholic hydroxyl group and preferably at least two alcoholic hydroxyl groups. Typical compounds include, for instance, the monohydric alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 3-heptanol, 2-ethyl-1-hexanol, 4-nonanol, propargyl alcohol, benzyl alcohol, cyclohexanol, cyclopentanol, cycloheptanol, and trimethylcyclohexanol. Further alcohols contemplated include the monoesterified diols such as those prepared by the reaction of equimolar amounts of an organic monocarboxylic acid, its ester, or its halide, with a diol such as alkylene glycols, mono- and polyether diols, mono- and polyester diols, etc., e.g.,

wherein

is acyl and R' is a divalent organic radical containing at least two carbon atoms in the divalent chain; the monoetherified diols such as those represented by the formula $R_1OR'OH$ wherein $R_1$ represents a monovalent organic radical such as a hydrocarbyl or oxahydrocarbyl radical and R' has the aforesaid value; the mono-ols produced by the partial esterification reaction of a polyol containing at least three hydroxyl groups, e.g., glycerine, with a stoichiometric defiiciency of an organic monocarboxylic acid, its ester, or acyl halide; and the like. The aforesaid reaction are well documented in the literature.

Polyhydric alcohols can be exemplified by polyols of the formula HO—R—OH wherein R is a divalent hydrocarbyl radical or a mono- or polyhydroxy substituted hydrocarbyl radical, the aforesaid formula hereinafter being referred to as "alkylene polyols" (when they possess two or more hydroxy groups) or "alkylene glycols" (when they possess two hydroxy groups). Other polyhydric alcohols can be represented by the formula HO—$R^1$—OH wherein $R^1$ is a substituted or unsubstituted (alkyleneoxy)$_n$alkylene radical with $n$ being an integer of at least one. This latter formula will hereinafter be referred to as "polyether polyols" (when they contain at least two hydroxy groups) or "polyether glycols" (when they contain two hydroxy groups). The variables R and $R^1$ have at least two carbon atoms in the linear chain, and the substituents or pendant groups on these variables can be, for example, lower alkyl, halo, lower alkoxy, etc., such as methyl, ethyl, n-propyl, isopropyl, chloro, methoxy, ethoxy, and the like. Illustrative alkylene polyols and polyether polyols include ethylene glycol; butylene glycol; 2,2-diethyl-1,3-propanediol; 2,2-diethyl - 1,3 - propanediol; 3-methyl-1,5-pentanediol; 2-butene - 1,4 - diol; the polyoxyalkylene glycols such as diethylene glycol, dipropylene glycol, dibutylene glycol, polyoxytetramethylene glycol, and the like; the mixed mono- and polyoxyalkylene glycols such as the mono- and polyoxyethyleneoxypropylene glycols, the mono- and polyoxyethyleneoxybutylene glycols, and the like; polydioxolane and polyformals prepared by reacting formaldehyde with other glycols or mixtures of glycols, such as tetramethylene glycol and pentamethylene glycol; and the like. Other polyols include the N-methyl- and N-ethyl-diethanolamines; 4,4'-methyl-enebiscyclohexanol; 4,4'-isopropylidenebiscyclohexanol; butyne-1,4-diol; the hydroxymethyl substituted phenethyl alcohols; the ortho-, meta-, and para-hydroxymethylphenylpropanols; the various phenylenediethanols, the various phenylenediproponals, the various heterocyclic diols such as 1,4-piperazinediethanol; and the like. The polyhydroxyl-containing esterification products which range from liquid to non-crosslinked solids, i.e., solids which are soluble in many of the more common inert normally liquid organic media, and which are prepared by the reaction of monocarboxylic acids and/or polycarboxylic acids, their anhydrides, their esters, or their halides, with a stoichiometric excess of a polyol such as the various diols, triols, etc.; illustrated previously, are highly preferred. The aforesaid polyhydroxyl-containing esterification products will hereinafter be referred to as "polyester polyols." Those polyester polyols which contain two alcoholic hydroxyl groups will hereinafter be termed "polyester diols." Illustrative of the polycarboxylic acids which can be employed to prepare the polyester polyols preferably include the dicarboxylic acids, tricarboxylic acids, etc., such as maleic acid, succinic acid, glutaric acid, adipic acid, pimelic acid, suberic acid, azelaic acid, sebacic acid, chlorendic acid, 1,2,4-butanetricarboxylic acid, phthalic acid, etc. This esterification reaction is well documented in the literature.

Higher functional alcohols suitable for reaction with the novel isocyanates include the triols such as glycerol, 1,1,1-trimethylolpropane, 1,2,4-butanetriol, 1,2,6-hexanetriol, triethanolamine, triisopropanolamine, and the like; the tetrols such as erythritol, pentaerythritol, N,N,N',N'-tetrakis(2-hydroxyethyl)ethylenediamine, N,N,N',N'-tetrakis(2-hydroxypropyl)ethylenediamine, and the like; the pentols; the hexols such as dipentaerythritol, sorbitol, and the like; the alkyl glycosides such as the methyl glucosides; the carbohydrates such as glucose, sucrose, starch, cellulose, and the like.

Other suitable hydroxyl-containing compounds include the mono- and the polyoxyalkylated derivatives of mono- and polyfunctional compounds having at least one reactive hydrogen atom. These functional compounds may contain primary or secondary hydroxyls, phenolic hydroxyls, primary or secondary amino groups, amide, hydrazino, guanido, ureido, mercapto, sulfino, sulfonamido, or carboxyl groups. They can be obtained by reacting, (1) monohydric compounds such as aliphatic and cycloaliphatic alcohols, e.g., alkanol, alkenol, methanol, ethanol, allyl alcohol, 3-buten-1-ol, 2-ethylhexanol, etc.; diols of the class HO$(R)_n$OH and HO$(RORO)_n$H wherein R is alkylene of 2 to 4 carbon atoms, and wherein $n$ equals 1 to 10 such as ethylene glycol, propylene glycol, diethylene glycol, dipropylene glycol, and the like; thiodiethanol; the xylenediols, 4,4'-methylene-diphenol, 4,4'-isopropylidenediphenol, resorcinol; and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acids; phosphoric acids; the aliphatic, aromatic, and cycloaliphatic primary monoamines, like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with (2) vicinal monoepoxides as exemplified by ethylene oxide, 1,2-epoxypropane, 1,2-epoxybutane, 2,3-epoxybutane, isobutylene oxide, butadiene monoxide, allyl glycidyl ether, 1,2-epoxyoctene-7, styrene oxide, and mixtures thereof.

Further examples of polyols are the polyoxyalkylated derivatives of polyfunctional compounds having three or more reactive hydrogen atoms such as, for example, the reaction products (adducts) of 1,1,1-trimethylolpropane with a lower vicinal-epoxyalkane, e.g., ethylene oxide, propylene oxide, butylene oxide, and mixtures thereof, in accordance with the reaction:

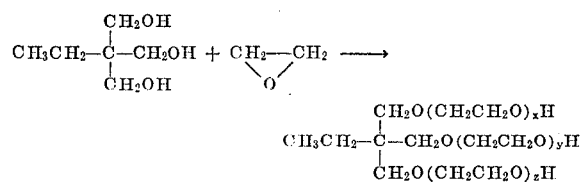

wherein $x+y+z$ equals 3 to 45, and more.

In addition to the polyoxyalkylated derivatives of 1,1,1-trimethylolpropane, the following illustrative compounds are likewise suitable: 1,1,1-trimethylolethane; glycerol; 1,2,4-butanetriol; 1,2,6-hexanetriol; erythritol; pentaerythritol; sorbitol; the alkyl glycosides such as the methyl glucosides; glucose; sucrose; the diamines of the general formula $H_2N(CH_2)_nNH_2$, where $n$ equals 2 to 12; 2-(methylamino)ethylamine; the various phenylene- and toluene-diamines; benzidine; 3,3'-dimethyl-4,4'-biphenyldiamine; 4,4'-methylenedianiline; 4,4',4''-methylidynetrianiline, the cycloaliphatic diamines such as 2,4-cyclohexanediamine, and the like; the amino alcohols of the general formula $HO(CH_2)_nNH_2$, where $n$ equals 2 to 10; the polyalkylenepolyamines such as diethylenetriamine, triethylenetetramine, tetraethylenepentamine, and the like; the polycarboxylic acids such as citric acid, aconitic acid, mellitic acid, pyromellitic acid, and the like; and polyfunctional inorganic acids like phosphoric acid. The aforesaid polyfunctional polyoxyalkylated compounds will be referred to hereinafter as "polyoxyalkylated polyols." The polyoxyalkylated polyols which contain two alcoholic hydroxyl groups will be termed "polyoxyalkylated diols" whereas those which contain a sole alcoholic hydroxyl group will be referred to as "polyoxyalkylated mono-ols."

Illustrative amino-containing compounds which are contemplated are those which contain at least one primary amino group (—$NH_2$), or secondary amino group (—NHR wherein R is hydrocarbyl such as alkyl, aryl, cycloalkyl, alkaryl, aralkyl, etc.), or mixtures of such groups. Preferred amino-containing compounds are those which contain at least two of the above groups. Illustrative of the amino-containing compounds include the aliphatic amines such as the alkylamines, e.g., the methyl-, ethyl-, n-propyl-, isopropyl-, n-butyl-, sec-butyl-, isobutyl-, tert-butyl-, n-amyl-, n-hexyl-, and 2-ethylhexylamines, as well as the corresponding dialkylamines; the aromatic amines such as aniline, ortho-toluidine, meta-toluidine, and the like; the cycloaliphatic amines such as cyclohexylamine, dicyclohexylamine, and the like; the heterocyclic amines such as pyrrolidine, piperidine, morpholine, and the like; the various aliphatic diamines of the general formula $H_2N(CH_2)_nNH_2$, monosecondary diamines of the general formula $R''NH(CH_2)_nNH$, and disecondary diamines of the general formula $R''NH(CH_2)_nNHR''$, where $n$ equals 2 to 10, and more, and where R'' is hydrocarbyl such as alkyl, aryl, aralkyl, alkaryl, or cycloalkyl; the etheric diamines of the formula $$NH_2—(CH_2)_nOR'O—(CH_2)_nNH_2$$

wherein $n$ is an integer of 2 to 10, and wherein R' is alkylene or oxaalkylene of 2 to 10 carbon atoms; the aromatic diamines such as meta-phenylene-diamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyl-diamine, 3,3'-dichloro-4,4'-biphenyldiamine, 4,4'-methylenedianiline, 4,4'-methylene-bis(ortho-chloroaniline), 4,4'-ethylenedianiline, 2,3,5,6-tetramethyl-para-phenylenediamine, 2,5-fluorenediamine, and 2,7-fluorenediamine; the cycloaliphatic diamines such as 1,4-cyclohexanediamine, 4,4'-methylenebiscyclohexylamine, and 4,4'-isopropylidenebiscyclohexylamine; and the heterocyclic amines such as piperazine, 2,5-dimethylpiperazine, 1,4-bis(3-aminopropyl)piperazine, and the like.

Illustrative of the higher functional amino-containing compounds which can be employed include, for example, higher polyalkylenepolyamines such as diethylenetriamine, triethylenetetramine, tetraethylenepentamine, dipropylenetriamine, tripropylenetetramine, tetrapropylenepentamine, and the like; 1,2,5-benzenetriamine; toluene-2,4,6-triamine; 4,4',4''-methylidynetrianiline; and the like; the polyamines obtained by interaction of aromatic monoamines with formaldehyde or other aldehydes, for example:

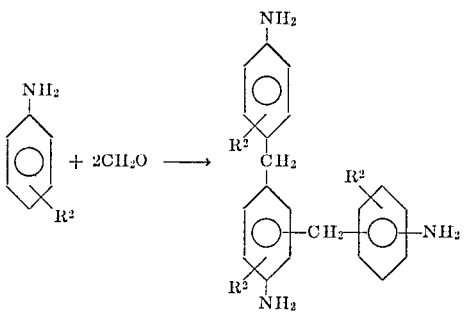

and other reaction products of the above general type, where $R^2$ is, for example, hydrogen or alkyl.

Illustrative of the carboxyl-containing compounds include those organic compounds which contain at least one carboxyl group (—COOH) as exemplified by the monocarboxyl-containing compounds such as alkanoic acids; the cycloalkanecarboxylic acids; the monoesterified dicarboxylic acids, e.g.,

wherein R' is an organic radical such as oxahydrocarbyl, hydrocarbyl, etc., and R is the divalent residue of a dicarboxylic acid after removal of the two dicarboxylic groups; the polycarboxylic acids, e.g., the aliphatic, cycloaliphatic, and aromatic dicarboxylic acids; and the like. Specific examples include propionic acid, butyric acid, valeric acid, dodecanoic acid, acrylic acid, cyclohexanecarboxylic acid, the mono-2-ethylhexyl ester of adipic acid, succini acid, maleic acid, glutaric acid, adipic acid, pimelic acid, suberic acid, azelaic acid, sebacic aid, chlorendic acid, 4,4'-oxydibutyric acid, 5,5'-oxydivaleric acid, 6,6'-oxydihexanoic acid, 4,4'-thiodibutyric acid, 5,5'-thiodivaleric acid, 6,6' - thiodihexanoic acid, itaconic acid, phthalic acid, isophthalic acid, terephthalic acid, the tetrachlorophthalic acids, 1,5 - naphthoic acid, 2,7-naphthoic acid, 2,6 - naphthoic acid, 3,3'-methylenedibenzoic acid, 4,4' - (ethylenedioxy)dibenzoic acid, 4,4'-biphenyldicarboxylic acid, 4,4'-sulfonyldibenzoic acid, 4,4'-oxydibenzoic acid, 4,4'-oxydibenzoic acid, the various tetrahydrophthalic acids, the various hexahydrophthalic acids, tricarballylic acid, aconitic acid, citric acid, hemimellitic acid, trimellitic acid, trimesic acid, pyromellitic acid, 1,2,3,4-butanetetracarboxylic acid, and the like. The polycarboxyl-containing esterification products which range from liquid to non-crosslinked solids and which are prepared by the reaction of polycarboxylic acids, their anhydride, their esters, or their halides, with a stoichiometric deficiency of a polyol such as diols, triols, etc., can also be employed. These polycarboxyl-containing esterification products will hereinafter be referred to as "polycarboxy polyesters."

Compounds which contain at least two different groups of the class of amino (primary or secondary), carboxyl, and hydroxyl, and preferably those which contain at least one amino group and at least one hydroxyl group, can be exemplified by the hydroxycarboxylic acids, the aminocarboxylic acids, the amino alcohols, and the like. Illustrative examples include 2-hydroxypropionic acid, 6-hydroxycaproic acid, 11-hydroxyundecanoic acid, salicylic acid, para-hydroxybenzoic acid, beta-alanine, 6-aminocaproic acid, 7-aminoheptanoic acid, 11-aminoundecanoic acid, para-aminobenzoic acid, and the like; the amino alcohols of the general formula $HO(CH_2)_nNH_2$, where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like; the higher functional amino alcohols having a total of at least three hydroxy and primary or secondary amino groups such as the dihydroxyalkylamines, e.g., diethanolamine, diisopropanol amine, and the like; 2 - (2-amino ethylamino)ethanol; 2-amino-2-(hydroxymethyl)-1,3-propanediol; and the like.

The initiated lactone polyesters which contain free hydroxyl group(s) and/or carbonyl group(s) represent extremely preferred active hydrogen containing compounds. These initiated lactone polyesters are formed by reacting, at an elevated temperature, for example, at a temperature of from about 50° C. to about 250° C., an admixture containing a lactone and an organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least one reactive hydrogen substituent preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. The aforesaid polyesters will hereinafter be referred to, in the generic sense, as "initiated lactone polyesters" which term will also include the various "copolymers" such as lactone copolyesters, lactone polyester/polycarbonates, lactone polyester/polyethers, lactone polyester/polyether/polycarbonates, lactone polyester/polyester, etc. These initiated lactone polyesters will contain at least one hydroxyl group and/or at least one carboxyl group depending, of course, on the initiator and reactants employed. Those initiated lactone polyesters which contain at least three alcoholic hydroxyl groups will be referred to as "initiated lactone polyester polyols"; those with two alcoholic hydroxyl groups will be termed "initiated lactone polyester diols." On the other hand, the initiated lactone polyesters which contain at least two carboxyl groups will be referred to as "initiated polycarboxy lactone polyesters."

The preparation of the aforesaid hydroxyl-containing and/or carboxyl-containing initiated lactone polyesters can be effected in the absence or presence of an ester interchange catalyst to give initiated lactone polyesters of widely varying and readily controllable molecular weights without forming water of condensation. These lactone polyesters so obtained are characterized by the presence of recurring linear lactone units, that is, carbonylakyleneoxy

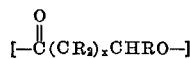

wherein $x$ is from 4 to 6, and wherein the R variables have the values set out in the next paragraph.

The lactone used in the preparation of the initiated lactone polyesters may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

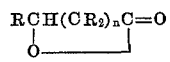

in which $n$ is at least four, for example, from four to six, at least $n+2$R's are hydrogen, and the remaining R's are substituents selected from the group consisting of hydrogen, alkyl, cycloalkyl, alkoxy and single ring aromatic hydrocarbon radicals. Lactones having greater number of substituents other than hydrogen on the ring, and lactones having four carbon atoms in the ring, are considered unsuitable because of the tendency that polymers thereof have to revert to the monomer, particularly at elevated temperature.

The lactones which are preferred in the preparation of the hydroxyl-containing and/or carboxyl-containing initiated lactone polyesters are the epsilon-caprolactones having the general formula:

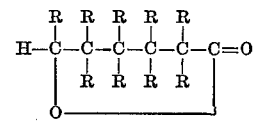

wherein at least six of the R variables are hydrogen and the remainder are hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve.

Among the substituted epsilon-caprolactones considered most suitable are the various monoalkyl epsilon-caprolactones such as the monomethyl-, monoethyl-, monopropyl-, monoisopropyl-, etc. to monododecyl epsilon - caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone can be employed as starting material. Mixtures comprising the $C_6$ to $C_8$ lactones illustrated previously, with/without, for instance, the alpha, alpha - disubstituted-beta-propiolactones, e.g., alpha, alpha-dimethyl-beta-propiolactone, alpha, alpha-dichloromethyl-beta-propiolactone, etc.; with/without, for instance, oxirane compounds, e.g., ethylene oxide, propylene oxide, etc.; with/without, for instance, a cyclic carbonate, e.g., 4,4-dimethyl-2,6-dioxacyclohexanone, etc.; are also contemplated.

Among the organic initiators that can be employed to prepare the initiated lactone polyesters include the carboxyl-containing, hydroxyl-containing, and/or amino-containing compounds illustrated previously, e.g., those compounds which have at least one reactive hydrogen substituent as determined according to the Zerewitinoff method.

The initiator is believed to open the lactone ring to produce an ester or amide having one or more terminal groups that are capable of opening further lactone rings and thereby adding more and more lactone units to the growing molecule. Thus, for example, the polymerization of epsilon-caprolactone initiated with an amino alcohol is believed to take place primarily as follows:

$$HOR'NH_2 + CH_2CH_2CH_2CH_2CH_2C=O \longrightarrow$$

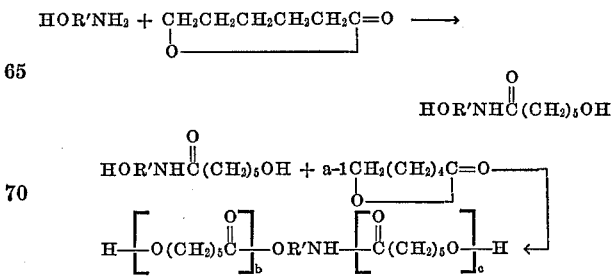

wherein R' (of the initiator and the resulting initiated lactone polyester product) is an organic radical such as an aliphatic, cycloaliphatic, aromatic, or heterocyclic radical, and wherein $a=b+c$.

The reaction of a carboxyl-containing initiator with epsilon-caprolactone is believed to proceed as follows:

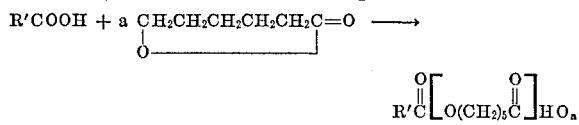

It will be appreciated from the preceding illustrative equations that where a plurality of lactone units are linked together, such linkage is effected by monovalent bonding the oxy (—O—) moiety of one unit to the carbonyl

moiety of an adjacent unit. The terminal lactone unit will have a terminal hydroxy or carboxyl end group depending, of course, on the initiator employed.

The preparatioin of the initiated lactone polyester can be carried out in the absence of a catalyst though it is preferred to effect the reaction in the presence of an ester exchange catalyst. The organic titanium compounds that are especially suitable as catalysts include the tetraalkyl titanates such as tetraisopropyl titanate and tetrabutyl titanate. Additional preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further desirable catalysts which can be employed. The disclosures of the aforesaid patents are incorporated by reference into this specification.

The catalysts are employed in catalytically significant concentration. In general, a catalyst concentration in the range of from about 0.0001 and lower, to about 3, and higher, weight percent, based on the weight of total monomeric feed, is suitable. The lactone polymerization reaction is conducted at an elevated temperature. In general, a temperature in the range of from about 50° C., and lower, to about 250° C. is suitable; a range from about 100° C. to about 200° C. is preferred. The reaction time can vary from several minutes to several days depending upon thet variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The preparation of the lactone polyesters via the preceding illustrative methods has the advantage of permitting accurate control over the average molecular weight of the lactone polyester products and furtherof promoting the formation of a substantially homogeneous lactone polyester in which the molecular weights of the individual molecules are reasonably close to the average molecular weight, that is, a narrow molecular weight distribution is obtained. This control is accomplished by preselecting the molar proportions of lactone and initiator in a manner that will readily be appreciated by those skilled in the art. Thus, for example, if it is desired to form a lactone polyester in which the average molecular weight is approximately fifteen times the molecular weight of the initial lactone, the molar proportions of lactone and intiator utilized in the polymerization reaction are fixed at approximately 15:1 inasmuch as it is to be expected that on the average there will be added to each molecule of initiator approximately fifteen lactone molecules.

The initiated lactone polyesters which are contemplated have average molecular weights as low as 300 to as high as about 7000, and even higher still to about 9000. With vinyl polymers containing a plurality of active hydrogen substituents, e.g., hydroxyl, amino, etc., as initiators, the average molecular weight of the initiated lactone polyesters can easily go as high as 14,000, and higher. Generally, however, the average molecular weight of the initiated lactone polyester is from about 300 to about 9000, preferably from 600 to about 5000.

As intimated previously, also within the term and the scope of the initiated lactone polyesters are those in which the linear lactone units need not necessarily be connected directly to one another. This is readily accomplished, for example, by reacting lactone(s) with combinations of initiators such as dibasic acid(s) plus glycol(s), diamine(s) or amino alcohol(s) such as those exemplified previously. This reaction can be effected at an elevated temperature, e.g., about 100° C. to about 200° C., with all the reactants present, or the reaction of the dibasic acid with the glycol, diamine, or amino alcohol can be accomplished first, and then the resulting amino-, hydroxyl-, or carboxyl-containing products (depending on the reactants and the concentration of same) can be reacted with the lactone to yield hydroxyl-terminated and/or carboxyl-terminated initiated lactone polyesters. Moreover, as also indicated previously, the term and the scope of the hydroxyl- and/or carboxyl-containing initiated lactone polyesters includes the "oxyalkylene-carboxyalkylene" such as described in U.S. Pat. No. 2,962,524 which are incorporated by reference into this disclosure. In addition the term and scope of the hydroxyl-containing initiated lactone polyesters also includes the reaction of an admixture comprising a $C_6-C_8$ lactone(s), a cyclic carbonate(s), and an initiator having at least one group, preferably at least two groups, of the class of hydroxyl, primary amino, or secondary amino, or mixtures thereof, under the operative conditions discussed above. Exemplary cyclic carbonates include 4,4-dimethyl-2,6-dioxacyclohexanone, 4,4-dichloromethyl-2,6-dioxacyclohexanone, 4,4-dicyanomethyl-2,6-dioxacyclohexanone, 4,4-diethyl-2,6-dioxacyclohexanone, 4,4-dimethoxymethyl-2,6-dioxacyclohexanone; and the like. Consequently, where a mixture of linear lactone units (i.e.,

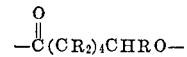

units which are properly termed carbonylalkyleneoxy) and linear carbonate units (i.e.

units which can be termed carbonyloxyalkyleneoxy) are contained in the polymer chain or backbone, the carbonyl moiety of one linear unit will be monovalently bonded to the oxy moiety of a second linear unit. The oxy moiety of a terminal linear unit will be bonded to a hydrogen substitutent to thus form a hydroxyl end group. Moreover, the point of attachment of the initiator and a linear unit (lactone or carbonate) will be between the carbonyl moiety of said unit and the functional group (hydroxyl or amino) of said initiator sans the active hydrogen substitutent of said group.

The preferred initiated lactone polyesters include those which contain at least about 25 mol percent (and preferably at least about 50 mol percent) of carbonylpentamethyleneoxy units therein

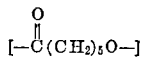

and which possess an average molecular weight of from about 150 to about 5000, particularly from about 500 to about 4000. The remaining portion of the molecule may be comprised of in addition to the initiator, essentially linear units derived from a cyclic carbonate especially those illustrated previously; an oxirane compound especially ethylene oxide, propylene oxide, and/or the butylene oxides; a mono- and/or polyalkyl-substituted epsilon-caprolactone especially the mono- and/or polymethyl and/or ethyl-substituted epsilon-caprolactones; and/or an alpha, alpha-disubstituted-beta-propiolactone especially those exemplified previously. The so-called initiated lactone homopolyesters derived from reacting epsilon-caprolactone with an initiator are likewise included within the preferred lactone polyesters. The initiated lactone polyester polyols, and in particular, the substantially linear initiated lactone polyester diols, are exceptionally preferred.

If desired, various compounds can be employed as catalysts in the isocyanato/active hydrogen reactions. Compounds which are oftentimes useful in catalyzing said isocyanato-active hydrogen reactions include the tertiary amines, phosphines, and various organic metallic compounds in which the metal can be bonded to carbon and/or other atoms such as oxygen, sulfur, nitrogen, halo, hydrogen, and phosphorus. The metal moiety of the organic metallic compounds can be, among others, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic, or antimony. The tertiary amines, the organic tin compounds (which includes the organotin compounds), and the organic lead compounds are eminently preferred. Preferred subclasses of organic metallic compounds include the acylates, particularly the alkanoates, and alkoxides of Sn(II), Sn(IV), Pb(II), Ti(IV), Zn(IV), Co(II), Mn(II), Fe(III), Ni(II), K, and Na. An additional subclass which is extremely useful is the dialkyltin dialkanoates.

Inorganic metallic compounds such as the hydroxides, oxides, halides, and carbonates of metals such as the alkali metals, the alkaline earth metals, iron, zinc, and tin are also suitable.

Specific catalysts include, by way of illustrations, 1,4-diazabicyclo[2.2.2]octane, N,N,N',N' - tetramethyl - 1,3-butanediamine, bis[2-(N,N-dimethylamino)ethyl] ether, bis[2 - (N,N - dimethylamino) - 1-methylethyl] ether, N-methylmorpholine, sodium acetate, potassium laurate, stannous octanoate, stannous oleoate, lead octanoate, tetrabutyl titanate, ferric acetylacetonate, cobalt naphthenate, tetramethyltin, tributyltin chloride, tributyltin hydride, trimethyltin hydroxide, dibutyltin oxide, dibutyltin dioctanoate, dibutyltin dilaurate, butyltin trichloride, triethylstibine oxide, potassium hydroxide, sodium carbonate, magnesium oxide, stannous chloride, stannic chloride, bismuth nitrate. Other catalysts include those set forth in "Part IV. Kinetics and Catalysis of Reactions" of Saunders, et al. "Polyurethanes: Chemistry and Technology—Part I. Chemistry," Interscience Publishers," which is incorporated by reference into this disclosure. In many instances, it is particularly preferred to employ combinations of catalysts such as, for example, a tertiary amine plus an organic tin compound.

The isocyanato-reactive hydrogen reactions can be conducted over a wide temperature range. In general, a temperature range of from about 0° to about 250° C. can be employed. To a significant degree, the choice of the reactants and catalyst, if any, influences the reaction temperature. Of course, sterically hindered novel isocyanates or active hydrogen compounds will retard or inhibit the reaction. Thus, for example, the reaction involving isocyanato with primary amino or secondary amino can be effected from about 0° C. to about 250° C. whereas the isocyanato-phenolic hydroxyl reaction is more suitably conducted from about 30° C. to about 150° C. Reactions involving primary alcoholic hydroxyl, secondary alcoholic hydroxyl, or carboxyl with isocyanato are effectively conducted from about 20° C. to about 250° C. The upper limit of the reaction temperature is selected on the basis of the thermal stability of the reaction products and of the reactants whereas the lower limit is influenced, to a significant degree, by the rate of reaction.

The time of reaction may vary from a few minutes to several days, and longer, depending upon the reaction temperature, the identity of the particular active hydrogen compound and isocyanate as well as upon the absence or presence of an accelerator or retarder and the identity thereof, and other factors. In general the reaction is conducted for a period of time which is at least sufficient to provide the addition or attachment of the "active hydrogen" from the active hydrogen compound to the isocyanato nitrogen of the novel isocyanate. The remainder of the active hydrogen compound becomes bonded to the carbonyl carbon unless decarboxylation or further reaction occurs. The following equation illustrates the reaction involved.

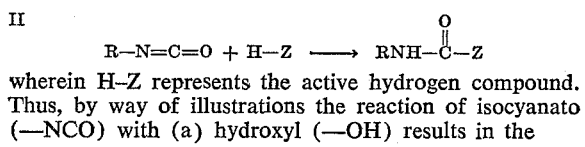

wherein H-Z represents the active hydrogen compound. Thus, by way of illustrations the reaction of isocyanato (—NCO) with (a) hydroxyl (—OH) results in the

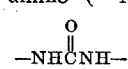

group; (b) primary amino (—NH$_2$) results in the

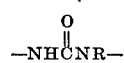

group; (c) secondary amino (—NHR) results in the

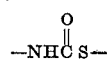

group; (d) thiol (—SH) results in the

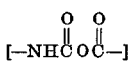

group; (e) carboxyl (—COOH) can be considered to result in the intermediate

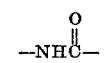

which decarboxylates to the

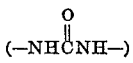

group; (f) ureylene

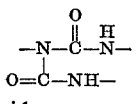

results in the

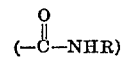

group (biuret); (g) amido

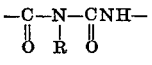

results in the

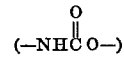

group (carbonylurea); (h) urethane

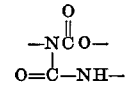

results in the

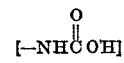

group (allophanate); (i) water (HOH) can be considered to result in the intermediate

[—NHCOH]

which decarboxylates to the —NH₂ group; and the like. Most desirably, conditions are adjusted so as to achieve a practical and commercially acceptable reaction rate depending, to a significant degree, on the end use application which is contemplated. In many instances, a reaction period of less than a few hours is oftentimes sufficient for the intended use.

The isocyanato-reactive hydrogen reactions, in many instances, are preferably accomplished in the presence of a catalytically significant quantity of one or more of the catalysts illustrated previously. In general, a catalyst concentration in the range of from about 0.001 weight percent, and lower, to about 2 weight percent, and higher, based on the total weight of the reactants, has been observed to be useful.

The concentration of the reactants can be varied over a wide range. Thus, for example, one can employ the active hydrogen compound in such relative amounts that there is provided as low as about 0.1 equivalent (group) of active hydrogen, and lower, per equivalent (group) of isocyanato. In general, about 0.2 and oftentimes about 0.25 equivalent of active hydrogen represent more suitable lower limits. The upper limit can be as high as about 7 equivalents of active hydrogen, and higher, per equivalent of isocyanato. However, for many applications, a desirable upper limit is about 3.5 equivalents of active hydrogen per equivalent of isocyanato. When employing bifunctional compounds (those which contain two active hydrogen substituents such as hydroxyl, carboxyl, primary amino, secondary amino, etc.), a suitable concentration would be from about 0.25 to about 3 equivalents of active hydrogen substituent from the bifunctional compound per equivalent of isocyanate. It is readily apparent that depending upon the choice and functionality of the active hydrogen compound(s), the choice of the isocyanate(s), the proportions of the reactants, etc., there can be obtained a myriad of novel compounds and products which range from the liquid state to solids which can be fusible solids, thermoplastic solids, partially cured to essentially completely cured, thermoset solids, etc. Many of the novel liquid to non-crosslinked solid compositions contain a plurality of polymerizable ethylenic bonds which serve as vinyl polymerization sites with vinyl monomers such as those illustrated previously, e.g., styrene, butadiene, vinyl chloride, vinyl acetate, methyl acrylate, etc., under the operative conditions noted supra.

A class of novel compounds, i.e., "blocked isocyanates," which deserve special mention are those which contain the

grouping therein. Among the compounds which fall into this category are those in which the variable G of Formula I supra is characterized as follows:

III (a) 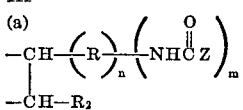  (b) 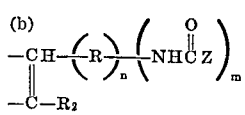

(c) 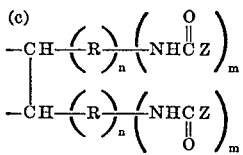  (d) 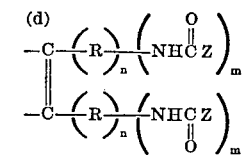

(e) 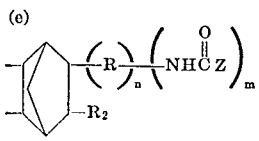  (f) 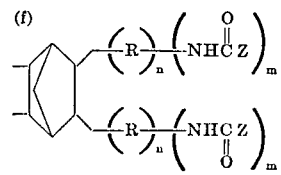

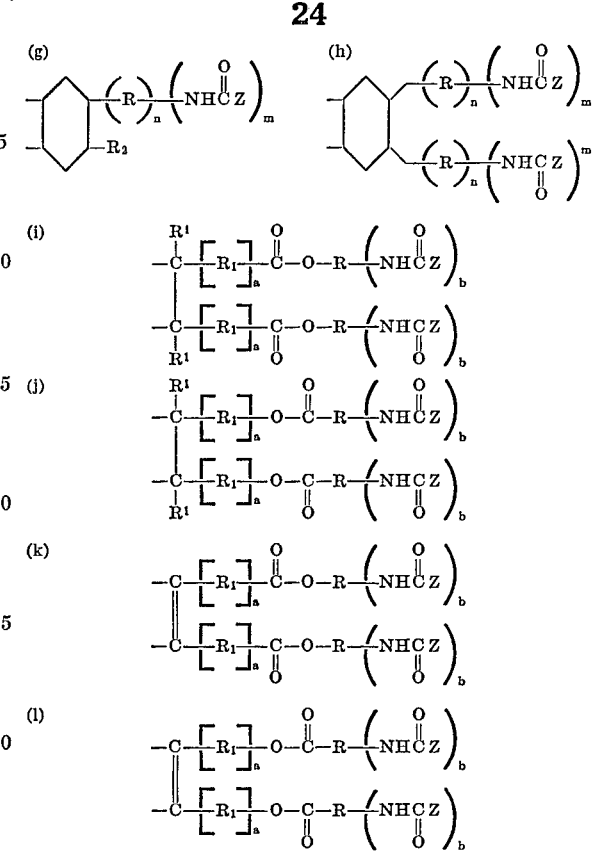

wherein R, R₂, R¹, R₁, a, b, n, and m have the meanings (as well as the provisos) set out in Formula I supra; and wherein Z is an abbreviated form for the monofunctional active organic compounds sans the active hydrogen atom. Illustrative Z radicals include those which result from the reaction of, for example, stoichiometric quantities of the novel isocyanates of Formula I supra with monofunctional active organic compounds as illustrated by primary amines, secondary amines, primary alcohols, secondary alcohols, phenols, primary thiols, secondary thiols, imines, amides, ureas, etc. The scope of Z is readily apparent from the description re the active hydrogen compounds as well as from a consideration of Equation II supra. Moreover, by employing, for example, less than stoichiometric quantities of monofunctional active organic compound to novel isocyanate, i.e., less than one equivalent of active hydrogen substituent per equivalent of isocyanato group, there are obtained novel "partially blocked" isocyanate compounds. These "partially blocked" compounds will contain both —NCO and

groupings. Preferred compounds include the novel "blocked" and "partially blocked" bis(isocyanatoalkyl) 5-norbornene-2,3-dicarboxylates, e.g., bis(2-isocyanatoethyl) 5-norbornene-2,3-dicarboxylates; the hexachlorinated bis(isocyanatoalkyl) 5-norbornene-2,3-dicarboxylates, e.g., bis(2-isocyanatoethyl) 1,4,5,6,7,7 - hexachloro-5-norbornene-2,3-dicarboxylate; and the like.

Useful and interesting polymeric products are obtained by the vinyl polymerization of an admixture comprising the polymerizable "blocked" (and/or the "partially blocked") isocyanates of Formula III and an ethylenically unsaturated organic compound.

A particular desirable class of novel polyurethane diols which are contemplated within the scope of the teachings of this specification are those which result from the reaction of a dihydroxy compound such as those illustrated previously, with a molar deficiency, i.e., a stoichiometric deficiency, of the novel diisocyanates which fall within Formula I supra. The highly preferred dihydroxy compounds are the alkylene glycols, the polyether glycols, the polyoxyalkylated diols, the polyester diols, and the initiated lactone polyester diols, especially those dihydroxy compounds which have average molecular weights as low as about 60 and as high as about 7000, and higher. A preferred average molecular weight range is from about 300 to about 5000. The initiated lactone polyester diols which have an average molecular weight of from about 500 to about 4000 are eminently preferred since within this molecular weight range there can be prepared, for example, polyurethane products such as cast resins and thermoplastic products. Equation IV below illustrates the linear extension reaction involved:

IV   HO—A—OH + deficient Q(NCO)$_2$ →

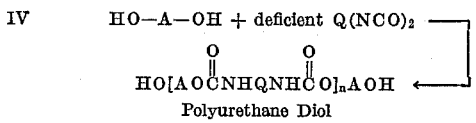
Polyurethane Diol wherein HO—A—OH is an abbreviated representation of the organic dihydroxy compounds, the variable A being an organic divalent aliphatic radical such as those illustrated previously; wherein Q(NCO)$_2$ is an abbreviated representation for the novel diisocyanates encompassed within the scope of Formula I supra; and wherein $n$ is a number having an average value of at least one.

It will be noted from Equation IV that the degree of linear extension is realistically controlled by the amount of the reactants employed. If the proportions of diol and diisocyanate are chosen so that the number of reactive hydroxyl groups on the diol are equal to the number of reactive isocyanate groups on the diisocyanate, then relatively long, high molecular weight chains can be formed. In general, one can employ such relative amounts so that there is provided slightly greater than one equivalent of hydroxyl group from the diol per equivalent of isocyanato group from the diisocyanate. It is desirable, however, to employ amounts of diol and organic diisocyanate (in Equation IV) so that there is provided a ratio of from about 1.1 to about 2.2 equivalents, and higher, of hydroxyl group per equivalent of isocyanato group, and preferably from about 1.3 to about 2 equivalents of hydroxyl group per equivalent of isocyanato group.

It is to be understood that in lieu of the dihydroxy compounds employed in Equation IV one can employ higher functional polyols such as the triols, tetrols, etc., and obtain novel polyurethane triols, tetrols, etc. In addition, admixtures of dihydroxy compounds, or dihydroxy compounds plus higher functional hydroxy compounds, can be employed.

An eminently preferred class of novel polyurethane diisocyanates which are contemplated are those which result from the reaction of a dihydroxy compound exemplified previously, with a molar excess of the novel diisocyanates of Formula I supra. The highly preferred dihydroxy compounds which can be employed include those illustrated in the discussion re Equation IV supra as well as the resulting polyurethane diol products (of Equation IV). Equation V below illustrates this linear extension reaction involved:

V   HO—A—OH + excess Q(NCO)$_2$ →

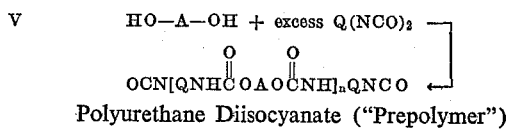
Polyurethane Diisocyanate ("Prepolymer")

wherein all the variables of Equation V have the meanings set out in Equation IV previously.

It will be noted from Equation V that the use of an excess of diisocyanate provides an efficient means of control over the degree of linear extension of the polyurethane molecule. If the proportions of diol and diisocyanate are chosen so that the number of reactive terminal hydroxy groups on the diol are equal to the number of reactive isocyanate groups on the diisocyanate as indicated previously, relatively long, high molecular weight chains would be formed. It is desirable, for many applications, to employ amounts of diisocyanate and diol (in Equation V) so that there is provided a ratio of greater than about one equivalent of diisocyanate per equivalent of diol, preferably from about 1.05 to about 7 equivalents, and higher, of diisocyanate per equivalent of diol, and preferably still from about 1.2 to about 4 equivalents of diisocyanate per equivalent of diol.

During and after preparation of the isocyanato-terminated reaction products it is oftentimes desirable to stabilize said reaction products by the addition of retarders to slow down subsequent further polymerization or less desirable side-reactions such as, for example, allophanate formation. Retarders may be added to the diisocyanate, diol, and/or the aforesaid reaction products. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorous oxychloride, sulfuryl chloride, thionyl chloride, and sulfur dioxide.

In lieu of, or in conjunction with the dihydroxy reactants of Equation V, it is oftentimes desirable to employ higher functional polyols such as the triols, tetrols, etc., and obtain novel polyurethane triisocyanates, tetraisocyanates, etc.

Another particular desirable class of novel compounds which are contemplated are the novel polyurea diamines which are prepared via the reaction of a diamino compound (which contain two groups from the class of primary amino, secondary amino, and mixtures thereof) as illustrated previously with a molar deficiency of the novel diisocyanates. Equation VI below illustrates this linear extension reaction involved:

VI  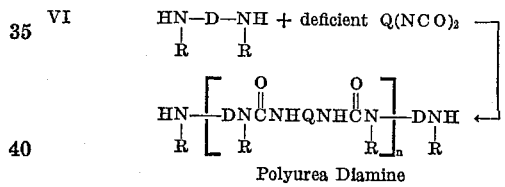
Polyurea Diamine wherein

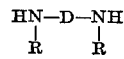

is an abbreviated representation of a diamine compound (the R variables representing hydrogen; a monovalent hydrocarbon or azahydrocarbon radical, e.g., alkyl, aryl, aralkyl, azaalkyl, and the like; and D representing a divalent organic radical, e.g., a divalent aliphatic, alicylic, aromatic, or heterocyclic radical), and wherein Q(NCO)$_2$ and $n$ have the meanings set forth in Equation IV supra. In general, one can employ slightly greater than about one and upwards to about two, and higher, equivalents of amino group per equivalent of isocyanato group. In lieu of, or in conjunction with, the diamino reactants of Equation VI, it is oftentimes desirable to employ higher functional polyamines such as the triamines, tetraamines, etc., and obtain novel polyurea triamines, polyurea tetraamines, etc.

On the other hand, the use of a molar excess of diisocyanate with relation to the diamino compound produces novel polyurea diisocyanates as illustrated by Equation VII:

VII 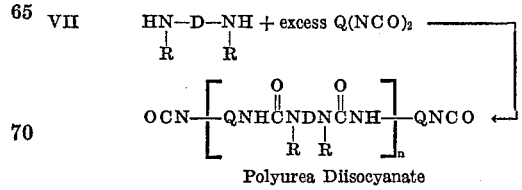
Polyurea Diisocyanate

In the reaction exemplified by Equation VII supra, there can be employed silghtly greater than about one and upwards to about 3, and higher, equivalents of isocyanato group per equivalent of amino group. Higher functional polyamines can be employed instead of, or admixed with, the diamines, to thus yield novel polyurea triisocyanates, polyurea tetraisocyanates, etc.

If desired, the preceding novel linear extension reactions can be carried out in the presence of essentially inert normally-liquid organic vehicles such as various organic solvents, depending upon the further application which may be intended for said reaction products.

In another aspect, the invention is directed to the preparation of cast polyurethane systems. Highly useful rigid to flexible, polyurethane resins which can range from slightly crosslinked products to highly crosslinked products can be prepared by the novel polyisocyanates of Formula I supra and/or the polyurethane polyisocyanto reaction products discussed in the section re Equation V with a polyfunctional chain extender whih contains at least two functional groups that are primary amino (—$NH_2$), secondary amino (—NHR), hydroxyl (—OH), or mixtures thereof. The polyisocyanate and polyfunctional chain extender are employed in such relative amounts that there is provided at least about one equivalent (group) of isocyanato (—NCO) from the polyisocyanate per equivalent (group) of functional group (hydroxyl and/or amino) from the polyfunctional compounds. When employing solely difunctional compounds as the chain extender(s), it is desirable to employ such relative amounts that result in greater than about one equivalent of —NCO, e.g., at least about 1.02 equivalents of —NCO, from the polyisocyanate per functional group from the difunctional compound. However, it is oftentimes highly satisfactory when employing polyfunctional chain extenders which contain 3 or more functional groups, alone or in admixture with difunctional chain extenders, to employ such relative amounts so that there is provided at least about one equivalent of —NCO from the polyisocyanate per equivalent of functional group from the chain extender(s). Cast polyurethane resins having special utility as printing ink rollers, cast solid urethane industrial tires, mechanical goods such as seals, O-rings, gears, etc., ladies shoe heels, and the like, can be prepared from castable formulations which provide from about 1.02 to aobut 1.6 equivalents of —NCO from the polyisocyanate per equivalent of functional group from the polyfunctional chain extender. Optimum properties result from the highly preferred castable formulations which provide from about 1.05 to about 1.4 equivalents of —NCO per equivalent of functional group.

It is further highly desirable that the aforesaid polyisocyanate be a prepolymer as defined in Equation V supra. It is observed that such prepolymers will yield cast polyurethane resins which vary from exteremely soft flexible products to relatively hard plastic products. Prepolymers which result from the reaction of diisocyanate and the initiated lactone polyester polyols are eminently suitable since cast resins which possess high performance characteristics can be obtained.

Among the polyfunctional chain extenders which can be employed in the castable formulations are those organic compounds exemplified previously which have two or more hydroxyl or amino (primary and secondary) groups including mixtures of such groups such as the polyols, (diols, triols, tetrols, etc.), the polyamines (diamines, triamines, etc.), amino alcohols, and the like. Among the polyfunctional chain extenders which deserve special mention because they result in especially useful cast polyurethane resins of high strength, high tear resistance, relatively low permanent set, good solvent resistance, and/or excellent abrasion resistance can be listed the following: 1,4-butanediol, 1,5-pentanediol, 1,6-hexanediol, quinitol, 1,4-bis(2-hydroxyethoxy)benzene, 4,4′-bis[(2-hydroxyethoxy)phenyl]isopropylidene, trimethylolpropane, triisopropanolamine, ethanolamine, p-aminophenylethyl alcohol, 2,4- and 2,6-toluenediamines, 3,3′-dichloro-4,4′diphenylenediamine, and 4,4′-methylene-bis(o-chloroaniline).

The preparation of the cast polyurethane products can take place over a wide temperature range, e.g., from about room temperature to about 200° C., and higher. The preferred temperature is in the range of from about 50° C. to about 150° C. A highly preferred temperature range is from about 60° C. to about 105° C. The upper limit of the reaction temperature, as indicated previously, is realistically controlled by the thermal stability of the reactants and reaction products whereas the lower limit is regulated, to a significant degree, by the reaction rate.

A valuable modifiation of the cast polyurethane aspect is the use of an admixture containing the polyols exemplified previously with/without the novel polyurethane diols (of Equation IV) plus the novel polyisocyanates (of Formula I) instead of, or in conjunction with, the prepolymer (of Equation V). It is preferred that the previously exemplified polyols be substantially linear hydroxyl-terminated polymers. It is highly preferred that these polymers have an average molecular weight of at least about 60 and upwards to 6000, and higher, and preferably from about 300 to about 5000. The hydroxyl-terminated polymers which are eminently suitable include the alkylene glycols, the polyether glycols, the polyester diols, the polyoxyalkylated diols, and the initiated lactone polyester diols. In this modifiation, the ratios of the equivalents of —NCO and the equivalents of functional groups are the same as set forth above. It is understood, of course, that these ratios will include all the —NCO groups and all the functional groups in the castable formulation regardless of the source. Thus, for example, if the formulation comprises novel polyurethane diol, novel diisocyanate, and alkanediol, one must take into consideration when computing the equivalents ratio of said formulation, the equivalents of —NCO from the diisocyanate with relation to the sum of the equivalents of the hydroxyl groups from the polyurethane diol plus alkanediol.

A further desirable modification of the cast polyurethane aspect is directed to the partial or incomplete reaction of the cast formulation to thus produce a thermoplastic reaction product mass which contains unreacted or free isocyanato groups. The aforesaid, thermoplastic mass is relatively stable or non-reactive at room temperature, e.g., about 20° C., but possesses the characteristic of being further cured as, for example, by curing same at an elevated temperature for a sufficient period of time. This curable, isocyanato-containing mass can be prepared by heating the cast formulation or system, e.g., to about 100° C., and higher, and thereafter quenching the resulting partial reaction products (which contain a minor proportion of unreacted isocyanato groups) with an inert fluid in which said reaction products are insoluble, e.g., an inert normally liquid organic non-solvent. The aforesaid curable, isocyanato-containing thermoplastic mass can be stored for relatively long periods of time or shipped to customers over great distances without undergoing any appreciable reaction at ambient conditions, e.g., about 20° C.

An extremely significant aspect is directed to the preparation of thermoplastic polyurethane resins including curable polyurethane systems. Such useful systems and/or resins can be prepared from formulations (which include the reactants, especially the difunctional reactants, reaction conditions, and modifications thereof) as set out in the preceding aspect (re the cast polyurethanes) with the exception that there is employed at least about one equivalent of functional group, e.g., hydroxyl, primary amino, secondary amino, or mixtures thereof, from the polyfunctional chain extender per equivalent of isocyanato (—NCO) from the isocyanate source. In general, a practical upper limit would be about 1.5 equivalents of functional group per equivalent of —NCO. Preferred formulations contain from about 1.02 to about 1.3 equivalents of functional group per equivalent of —NCO, preferably still from about 1.05 to about 1.15 equivalents of functional group per equivalent of —NCO. In other modifications, it is eminently preferred that the thermoplastic formulation contain about one equivalent of functional group per equivalent of isocyanato, especially to prepare thermoplastic elastomers which exhibit high performance characteristics.

The thermoplastic and curable polyurethane resins can be cured or crosslinked with an organic polyisocyanate. In this respect the novel polyisocyanates of Formula I supra, the novel polyisocyanato-containing polymers exemplified previously, and/or polyisocyanates well known in the literature can be employed, e.g., publication by Siefken [Annalen, 562, pages 122–135 (1949)]. Polyisocyanates such as those produced by the phosgenation of the reaction products of aniline and formaldehyde, or p,p',p''-triphenylmethane triisocyanate, represent further illustrations.

In general, the cure can be effected by using an amount of polyisocyanate which is in stoichiometric excess necessary to react with any free or unreacted functional group from the polyfunctional chain extender. In general, from about 1 to about 10 parts by weight of additional polyisocyanate per 100 parts by weight of curable polyurethane resin is adequate to accomplish the cure for most applications. A preferred range is from about 2.5 to about 6 parts by weight of polyisocyanate per 100 parts by weight of curable stock. The additional polyisocyanate can be admixed with the curable polyurethane stock on a conventional rubber mill or in any suitable mixing device and the resulting admixture is cured in the mold at an elevated temperature, e.g., from about 125°–160° C., in a relatively short period, e.g., a few minutes, or longer. In the mold, the cure is accomplished apparently by a reaction of excess amino or hydroxyl groups with the newly admixed polyisocyanate, and secondly by reaction of the remaining free terminal isocyanato groups with hydrogen atoms of the urea and urethane groups to form a crosslinked resin. By this procedure, there can be obtained cured polyurethane products which range from highly elastomeric materials possessing excellent tensile strength and exceptional low brittle temperature to tough, rigid rubbery materials.

Various modifying agents can be added to the castable or curable formulations among which can be listed fillers such as carbon blacks, various clays, zinc oxide, titanium dioxide, and the like; various dyes; plasticizers such as polyesters which do not ocntain any reactive end-groups, organic esters of stearic and other fatty acids, metal salts of fatty acids, dioctyl phthalate, tetrabutylthiodisuccinate; glass; asbestos; and the like.

A modification of the thermoplastic and curable polyurethane resins is the preparation of formulations using diisocyanates which are well known in the literature, and subsequently effecting the cure with the novel polyisocyanates of Formula I or V.

A particularly preferred aspect is directed to the preparation of elastomeric and relatively non-elastomeric products, especially elastomeric films and elastic fibers. It has been discovered quite surprisingly, indeed, that there can be prepared excellent elastic polyurethane films and fibers which are derived from substantially linear hydroxyl terminated polymers having an average molecular weight greater than about 500 and the novel diisocyanates, especially the non-halogenated diisocyanates, of Formula I supra. The elastic and relatively non-elastic films and fibers of this aspect are characterized by good resistance to sunlight degradation, good elongation, high resistance to fume aging, i.e., resistance to breakdown caused by nitrous oxide which is commonly found as an impurity in the atmosphere, good tensile and modulus properties, and/or good stability to oxidizing agents such as chlorine bleach.

These novel elastomeric and relatively non-elastomeric films and fibers can be prepared by first reacting the aforesaid substantially linear hydroxyl-terminated polymer with a molar excess of the novel diisocyanate (of Formula I) to produce a substantially linear isocyanato-terminated polyurethane product (known as a "prepolymer"). The chain extension reaction of said prepolymer with a bifunctional curing compound in accordance with, for instance, well known cast or spinning techniques results in films or fibers as may be the case. In a useful embodiment, the aforesaid substantially linear hydroxyl-terminated polymers can be linearly extended by reaction with a molar deficiency of an organic diisocyanate to yield substantially linear hydroxyl-terminated polyurethane products which products then can be reacted with a molar excess of the novel diisocyanates to obtain the prepolymer.

The substantially linear hydroxyl-terminated polymer possesses an average molecular weight of at least about 500, more suitably at least about 700, and preferably at least about 1500. The upper average molecular weight can be as high as 5000, and higher, a more suitable upper limit being about 4000. For many of the novel elastic fibers and films which exhibited a myriad of excellent characteristics, the average molecular weight of the starting hydroxyl terminal polymer did not exceed about 3800. In addition, the hydroxyl-terminated polymers possess a hydroxyl number below about 170, for example, from about 20 to about 170; and a melting point below about 70° C., and preferably below about 50° C.

Exemplary of the substantially linear hydroxyl-terminated polymers which are contemplated include the alkylene glycols, the polyether glycols, the polyoxyalkylated diols, the polyester diols, and the initiated lactone polyester diols. The initiated lactone polyester diols are eminently preferred since elastomeric films and elastic fibers exhibiting outstanding performance characteristics can be obtained. Of the highly preferred initiated lactone polyester diols are included those which are characterized by at least about 50 mol percent of carbonylpentamethyleneoxy units therein

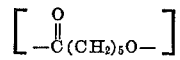

and which possess an average molecular weight of from about 500 to about 5000, particularly from about 600 to about 4000. The remaining portion of the molecule can be comprised of, in addition to the initiator, essentially linear units derived from a cyclic carbonate such as those illustrated previously, e.g., 4,4-dimethyl-2,6-dioxacyclohexanone, 4,4 - dicyanomethyl-2,6-dioxacyclohexanone, 4,4-dichloromethyl-2,6-dioxacyclohexanone, 4,4 - di(methoxymethyl)-2,6-dioxacyclohexanone, and the like; an oxirane compound especially ethylene oxide, 1,2-epoxypropane, the epoxybutanes, etc.; a mono-, di-, and/or trialkyl-epsilon-caprolactone such as the monomethyl-, dimethyl-, trimethyl-, monoethyl-, diethyl-, triethyl-epsilon-caprolactones, and others exemplified supra; an alpha, alpha-dialkyl-beta-propiolactone such as alpha, alpha-dimethyl-beta-propiolactone; an alpha, alpha-dihaloalkyl-beta-propiolactone as illustrated by alpha, alpha-dichloromethyl-beta-propiolactone; and others. Also highly preferred polymeric diols include the so-called initiated lactone homopolyester diols which are prepared via the reaction of an admixture of epsilon-caprolactone and an initiator which contains two groups from the class of hydroxyl, primary amino, secondary amino, and mixtures thereof, in the presence of a catalyst such as stannous dioctanoate or stannic tetraoctanoate.

Illustrative of the polyether glycols which are contemplated include those illustrated previously as well as those illustrated in column 7, lines 19 through 70 of U.S. Pat. No. 2,929,804 which patent is incorporated by reference into this disclosure. Many of the polyester diols which are encompassed have been exemplified previously. Others are set forth in columns 4–5 of U.S. Pat. No. 3,097,192 which patent is incorporated by reference into this disclosure. The initiated lactone polyester diols have been thoroughly illustrated previously; others are disclosed in U.S. Pat. Nos. 2,878,236, 2,890,208, 2,914,556, and 2,962,524 which patents are incorporated by reference into this disclosure. The polyurethane diols of Equation IV also represent a preferred group of substantially linear hydroxyl-terminated polymers.

The minimization or elimination of crystallinity, if present in the hydroxyl-terminated polymer, can be achieved, as oftentimes is desired, by introducing pendant groups and/or unsymmetrical groups in the polymeric chain as illustrated by lower alkyl groups, e.g., methyl, ethyl, isopropyl, etc.; halo, e.g., chloro, bromo, etc.; ortho-tolylene; and similar groups which do not interfere with the subsequent polymerization under the conditions used. As is readily apparent to those skilled in the art, the choice of the proper reactants will readily yield hydroxyl-terminated polymers with the desired quantity and type of pendant and/or unsymmetrical groups. Along this vein, polymers of desired molecular weight and melting point can thus be obtained. In addition, the polymer chain can be interrupted with divalent keto, urea, urethane, etc., groups.

The hydroxyl-terminated polymer and diisocyanate can be reacted in such proportions so as to produce either a hydroxyl-terminated polyurethane product or an isocyanato-terminated polyurethane product (prepolymer). A molar ratio of diol to diisocyanate greater than one will yield the hydroxyl-terminated polyurethane whereas a molar ratio less than one will result in the prepolymer.

As indicated previously, in a particularly useful embodiment, there is employed a sufficient molar excess of hydroxyl-terminated polymer, in particular, the initiated lactone polyester diols, with relation to the organic diisocyanate so that there results substantially linear hydroxyl-terminated polyurethane products which have average molecular weights of from about 1200 to about 5000, and preferably from about 1500 to about 3800.

The hydroxyl-terminated polymers or the abovesaid hydroxyl-terminated polyurethane products then are linearly extended preferably with the non-halogenated diisocyanates of Formula I. This reaction can be carried out by employing a molar ratio of diisocyanate to hydroxyl-terminated compound of from about 1.1:1 to about 5:1, preferably from about 1.5:1 to about 3.5:1, and more preferably from about 2:1 to 2.5:1.

In the preparation of the hydroxyl-terminated polyurethane products or the prepolymer, the reaction temperature can vary over a broad range such as noted for the isocyanato/active hydrogen (hydroxyl in this instance) section discussed previously. Of course, the optimum reaction temperature will depend, to a significant degree, upon several variables such as the choice of reactants, the use of a catalyst, the concentration of the reactants, etc. A suitable temperature range is from about 20° C. to about 125° C., and preferably from about 50° C. to about 100° C. The reaction time likewise is largely influenced by the correlation of the variables involved, and can vary from a few minutes to several hours, e.g., from about 0.5 to about 5 hours, and longer. The tertiary amine compounds and/or the organic metal compounds disclosed in the section which discusses the isocyanato/active hydrogen reactions can be employed as catalysts, if desired. The isocyanato/hydroxyl reactions are suitably carried out in the absence of an inert normally liquid organic vehicle, though one can be employed, if desired.

In the next step, the prepolymer which results from the above discussed isocyanato/hydroxyl reaction is reacted with a bifunctional curing compound which possesses two groups that are reactive with isocyanato groups. Examples of such curing compounds include diamines, diols, amino alcohols, hydrazino compounds, e.g., hydrazine, water, and the like. It is preferred that said curing compound have two reactive groups from the class of alcoholic hydroxyl, primary amino, and second amino. The most preferred reactive group is primary amino. It is to be understood that primary amino (—NH$_2$) and secondary amino (—NHR) include those compounds in which the nitrogen of these amino groups is bonded to a carbon atom as in, for example, ethylenediamine, as well as those compounds in which said nitrogen (of these amino groups) is bonded to another nitrogen atom as in, for instance, hydrazine.

The bifunctional curing compounds have been illustrated previously in the discussion of the active hydrogen compounds. Among the more desirable diamines (which term includes the mono- and polyalkylene polyamines which have two and only two primary and/or secondary amino groups) are such compounds as ethylenediamine, 1,2- and 1,3-propylenediamine, tetramethylenediamine, pentamethylenediamine, hexamethylenediamine, the cyclohexylenediamines, the phenylenediamines, the tolylenediamines, 4,4'-diaminodiphenylmethane, m- and p-xylylenediamine, 3,3' - dichloro - 4,4' - diaminophenylmethane, benzidine, 1,5 - diaminonaphthalene, piperazine, 1,4-bis (3-aminopropyl)piperazine, trans - 2,5 - dimethylpiperazine, and the like.

It is preferred that the diamine contain no groups other than the two reactive amino groups that are reactive with isocyanato. The said diamine can have various substituent groups including chloro, bromo, alkoxy, alkyl, and the like. Generally it is also preferred that the diamine have not more than 15 carbon atoms.

Illustrative of the various diols and amino alcohols include those exemplified previously and, in particular, ethylene glycol, propylene glycol, 2,2 - dimethyl - 1,3-propanediol, paradibenzyl alcohol, 1,4-butanediol, ethanolamine, isopropanolamine, and the like. Water and hydrazine are also useful bifunctional curing agents. The organic diamines are the preferred curing compounds, with the alkylenediamines being more preferred, and ethylenediamine being most preferred.

The ratio of reactants in the curing step can vary from about 0.8 to about 1.5 equivalents of isocyanato from the prepolymer per equivalent of functional group from the bifunctional curing compound. In many cases, it is desirable to employ approximate stoichiometric proportions of prepolymer and curing compound, i.e., in proportions such that there is present approximately one isocyanato group from the prepolymer per reactive group from the difunctional curing compound. Oftentimes, it is desirable to employ a slight stoichiometric deficiency or excess of prepolymer, e.g., slightly less than about or slightly greater than about one equivalent (and upwards to about 1.4 equivalents) of isocyanato per equivalent of functional group (from the bifunctional curing compound), and preferably from about one to about 1.2 equivalents of isocyanato per equivalent of functional group.

A preferred method for carrying out the reaction of prepolymer with curing compound is to effect the reaction in an inert normally liquid organic solvent and thus form a solution from which the fibers and films of the invention can be produced by conventional solution spinning and casting techniques. This can be done by dissolving the prepolymer in a solvent to make, for example, from about 5 to about 40 weight percent solid solution (percent based on total solution weight), and then adding the bifunctional curing compound to this solution. The addition will be facilitated if the curing compound is also dissolved in the same solvent. Many solvents can be used for this purpose. The essential requirement is that the solvent be non-reactive with the prepolymer and with the curing compound. Examples of useful solvents include acetone, dimethyl sulfoxide, N,N - dimethyformamide, N,N - dimethylacetamide, tetrahydrofuran, and the like. N,N-dimethylformamide is a preferred solvent. Acetone alone or in admixture with other organic vehicles such as those illustrated above represent the preferred solvents from commercial and economic standpoints. In this respect, it should be noted that commercial polyurethane fibers prepared from aromatic diisocyanates, e.g., bis(4-isocyanatophenyl)methane (MDI), as far as is known, are not spun or cast from an acetone ssytem. In lieu thereof, a universal solvent utilized in the preparation of the aforesaid commercial polyurethane fibers is the expensive dimethylformamide.

The reaction between the prepolymer and the curing compound can take place readily at room temperature. Therefore, the solution can be spun into a fiber or cast into a film within a relatively short period, e.g., a few minutes, after the curing compound has been added. For example, the solution can usually be cast or spun within 10 minutes after the addition of a diamine to the prepolymer when the reactants are at a temperature of about 25° C. In making fibers, the polymer solution can be wet spun into an aqueous bath, or dry spun, via conventional techniques. Liquids other than water can be employed in the bath, if desired, but water is generally preferred for economic reasons. Ethylene glcol, glycerol, dimethylformamide, and the like, alone or in admixture, with/without water, are illustrative of such other liquids. The temperature of the bath can be varied over a range of, for instance, 25° C. to 150° C. The fiber is recovered from the bath by conventional techniques, and can be given a post-cure to oftentimes enhance certain of the properties. A cure at elevated temperatures, for example, up to about 125° C., and higher, for periods ranging from several minutes to several hours may be desirable in many instances. For the preparation of fibers, the cure can be conducted for a period, for example, as long as five hours, and longer, whereas the cure can be increased to 16 hours, and longer, for the preparation of films. In any event, the cure, if desired, can be varied in duration to obtain the desired and optimum properties in the final product. Conventional solution casting techniques can be employed in making films.

If gelation should occur during the reaction between the prepolymer and the curing compound in the solvent, it is oftentimes desirable to add a small amount of acid to the prepolymer solution preferably before the curing compound is added. By so doing, the storage life of the solution containing the reaction product of prepolymer and curing compound can be increased significantly, for example, from a storage life in some cases of only a few minutes without the acid to a storage life of up to about several days with the acid. The acid is used in small amounts. For instance, from about 0.005, and lower, weight percent to about 0.6 weight percent of acid, and higher, based on the weight of the prepolymer, has been found to be suitable.

Among the acids and acid-forming compounds which are oftentimes useful for the purpose described in the preceding paragraph can be listed the following: phosphoric acid, phosphorous acid, hydrochloric acid, nitric acid, sulfuric acid, benzoyl chloride, benzene sulfonyl acid, benzenesulfonic acid, dichloroacetic acid, octylphenyl acid phosphate, stearyl acid phosphate, and boron trifluoride-etherate. It is to be noted that the pKa' of each of the above mentioned acids is less than about 2.5 (The term "pKa'" refers to the negative of the $\log_{10}$ of the hydrogen ion ionization constant in aqueous solution). The strong mineral acids which have a pKa' less than about 2.5 represent a preferred subclass. Phosphoric acid is the preferred species.

The characteristics of the novel fibers and films can be varied over a wide range depending, to a significant degree, on the choice and proportion of the hydroxyl terminated polymers (diol), the diisocyanate source, and bifunctional curing compound, the reaction conditions, etc. The novel fibers and films can range from relatively semi-elastic to highly elastic. The molecular weights of the resulting novel elastomeric fibers and films are somewhat difficult to ascertain with exactness. Nevertheless, they are sufficiently high enough so that significant semi-elastic and elastic properties in the film- and fiber-forming ranges result.

The novel elastic and semi-elastic polymers are highly useful compositions. For instance, in the form of fibers, the polymers can be used to make foundation garments, bathing suits, sporting clothes, elastic waist bands, hose, and the like. In the form of films, the polymers can be employed as elastic sheeting, as "rubber bands," and the like.

Another highly significant aspect of the invention is the use of the novel polyisocyanates of Formula I, and/or the novel prepolymers, and/or the novel polyisocyanato-containing polymers, to prepare foams, e.g., polyurethane foams, which can range from the extremely flexible to the highly rigid state. The prepolymers which are contemplated in this aspect are the polyisocyanato-containing reaction products which result from the reaction of polyfunctional compounds which contain two or more active hydrogen substituents as described previously, e.g., diols, triols, tetrols, diamines, triamines, amino alcohols, etc., with the novel polyisocyanates of Formula I. The proportions of the reactants are such that a sufficient stoichiometric excess of diisocyanates with relation to the polyfunctional compound is employed, i.e., the equivalents of —NCO from the diisocyanate with relation to the equivalents of active hydrogen substituent from the polyfunctional compound is greater than one to thus give non-crosslinked polyisocyanato-containing reaction products (containing at least two —NCO groups) which are soluble in various common organic vehicles, e.g., benzene. Eminently desirable, non-yellowing flexible foams can be prepared via the so-called "one step" method which involves reacting a polyhydroxy compound, preferably one that contains at least three alcoholic hydroxyl groups, with the above-illustrated novel polyisocyanates, especially the novel low molecular weight polymeric aliphatic multiisocyanates, in the presence of a blowing agent such as water, a liquefied gas, and the like. It is desirable to conduct the reaction in the presence of a catalyst and surfactant. The preparation of the flexible foams differs from the preparation of the rigid foams in that it is generally preferred to first prepare what is oftentimes referred to as a "quasi prepolymer," and subsequently add thereto the remainder of the polyhydroxy compound, blowing agent, and other ingredients, if employed, e.g., catalyst, surfactant, etc.

As indicated previously, the novel halogenated (especially the hexachlorinated) polyisocyanates can be employed in the preparation of flame-retardant foams, in particular rigid foams. Many of the foams have exhibited the characteristic of charring rather than dripping during the burning test. The novel hexachlorinated polyisocyanates, e.g., bis(2-isocyanatoethyl) 1,4,5,6,7,7-hexachloro-5-norbornene-2,3-dicarboxylate, in admixture with various polyisocyanates especially the monomethylene- and the polymethylene polyphenylene polyisocyanates (which are obtained by the phosgenation of the polyamine reaction products which result from the condensation of aniline with formaldehyde in the presence of a strong acid catalyst, e.g., hydrochloric acid, at elevated temperatures, e.g., 30° C.) represent a particularly preferred aspect of our contribution to the art. The aforesaid monomethylene- and polymethylene polyphenylene polyisocyanates which are eminently qualified are those which are a mixture of the diphenylmethane diisocyanates (MDI with/without the isomers thereof) with various higher polymeric polyisocyanates such as the tri- and tetraisocyanates. It will be readily appreciated that the composition of the methylene polyphenylene polyisocyanates is determined by the aniline to formaldehyde molar ratios used in the preparation of the polyamine reaction products. The use of an aniline to formaldehyde molar ratios of from about 1.3 to 1.0 to about 2.5 to 1.0 will yield products containing from about 25 to about 70 weight percent of the bis(aminophenyl)methanes, especially MDA, which upon phosgenation will yield the bis(isocyanatophenyl)methanes, especially MDI, in the same weight percent range. Thus, an admixture of the novel halogenated polyisocyanates as illustrated by HEDI with the monomethylene and polymethylene polyphenylene polyisocyanates which contain from about 25 to about 70 weight percent of the bis(isocyanatophenyl) methanes, in particular MDI, represent a preferred embodiment in the preparation of flame-retardant foams, especially the rigid type. An admixture which is extremely desirable is one in which the monomethylene- and the polymethylene polyphenylene polyisocyanate portion contains from about 40 to about 60 weight percent of the bis(isocyanatophenyl)methanes such as MDI, possesses average functionalities ranging from about 2.2 to about 3.0, an equivalent weight ranging from approximately 130 to 145, and a viscosity ranging from about 50 to 900 cps. at 25° C. The free NCO content can range from about 30 to about 31.5%. An extremely preferred admixture is one that contains (in addition to the novel halogenated polyisocyanate) a monomethylene- and polymethylene polyphenylene polyisocyanate fraction characterized by a MDI (including isomers thereof, if any) content of approximately 45 to 55 weight percent and an equivalent weight of about 134 to 142. The polyamine reaction products (precursor which is subjected to phosgenation) can be prepared by employing an aniline to formaldehyde molar ratio of about $1.8 \pm 0.2$ to 1.0 at a temperature in the range of from about 55° C. to 85° C. using hydrochloric acid as the condensation catalyst. U.S. Pat. No. 2,683,730 describes the preparation of monomethylene- and polymethylene polyphenylene polyisocyanates which contain up to 40 weight percent bis(isocyanatophenyl)methanes. The weight percent of the polyisocyanate admixture can vary over an extremely wide range, e.g., from about 10 to about 90% by weight of the novel polyisocyanate, based on the total weight of polyisocyanates. It is desirable, however, to employ at least about 50 weight percent of the monomethylene- and polymethylene polyphenylene polyisocyanates, e.g., from about 50 to about 85 weight percent, preferably from about 55 to about 80 weight percent, and up to about 50 weight percent of the novel halogenated polyisocyanates, e.g., from about 15 to about 50 weight percent, preferably from about 20 to about 45 weight percent. Such polyisocyanate admixture when employed as the isocyanate source in the preparation of rigid foams impart eminent characteristics thereto such as flame-retardancy, charring in lieu of dripping, good mechanical and dimensional stability, K-factor, etc.

A wide scope of polyhydroxy compounds can be employed in the preparation of the novel foams. The preferred polyhydroxy compound are those which contain three or more hydroxy groups. Illustrative polyhdroxy polyhydroxy compounds include the following classes of compounds (as wel las those illustrated previously in this specification):

(a) The polyhydroxy initiated lactone polyesters, and the alkylene oxide adducts thereof;

(b) The polyester polyols (including the polyester diols), and the alkylene oxide adducts thereof;

(c) The polyhyroxyalkanes and polyhydroxycycloalkanes, and the alkylene oxide adducts thereof;

(d) the trialkanolamines, and the alkylene oxide adducts thereof;

(e) the polyols derived from polyamines by the addition of alkylene oxide thereto;

(f) the non-reducing sugars and sugar derivatives, and the alkylene oxide adducts thereof;

(g) the alkylene oxide adducts of aromatic amine/phenol/aldehyde ternary condensation products;

(h) the alkylene oxide adducts of phosphorus and polyphosphorus acids, and various hydroxyl-terminated phosphites and phosphonates;

(i) the alkylene oxide adducts of polyphenols;

(j) the polytetramethylene glycols;

(k) the functional glycerides, such as castor oil;

(l) The polyhydroxyl-containing vinyl polymers; and the like.

The "preferred alkylene oxides" which term will be employed hereinafter include ethylene oxide, 1,2-epoxypropane, 1,2-epoxybutane, 2,3-epoxybutane, isobutylene oxide, epichlorohydrin, and mixtures thereof.

Illustrative polyhydroxyalkanes and polyhydroxycycloalkanes include, among others, ethylene glycol, propylene glycol, 1,3-dihydroxypropane, 1,3-dihydroxybutane, 1,4-dihydroxybutane, 1,4-, and 1,5-, and 1,6-dihydroxyhexane, 1,2-, 1,3-, 1,5-, 1,6- and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane pentaerythritol, xylitol, arabitol, sorbitol, mannitol, and the preferred alkylene oxide adducts thereof.

Examplary trialkanolamines include triethanolamine, triisopropanolamine, and the tributanolamines, and the preferred alkylene oxide adducts thereof.

Among the alkylene oxide adducts of polyamines can be listed the adducts of the preferred alkylene oxide with ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Illustrative of the resulting adducts which are of particular interest include, N,N,N',N'-tetrakis(2 - hydroxyethyl)ethylenediamine, N,N,N',N'-tetrakis(2 - hydroxypropyl)ethylenediamine, N,N,N',N',N''-pentakis(2-hydroxypropyl)diethylenetriamine, phenyldiisopropanolamine, and the like. Others which deserve particular mention are the preferred alkylene adducts of aniline/formaldehyde or substituted-aniline/formaldehyde condensation products.

Illustrative of the non-reducing sugars and sugar derivatives contemplated are sucrose; the alkyl glycosides such as methyl glucoside, ethyl glucoside, and the like; the polyol glycosides such as ethylene glycol glucoside, propylene glycol glucoside, glycerol glucoside, 1,2,6-hexanetriol glucoside, and the like; and the preferred alkylene oxide adducts thereof.

Preferred alkylene oxide adducts of polyphenols include those in which the polyphenol can be bisphenol A; bisphenol F; the condensation products of phenol and formaldehyde, more particularly the novolac resins; the condensation products of various phenolic compounds and acrolein, the simplest members of this class being the 1,1,3-tris(hydroxyphenyl)propanes; the condensation products of various phenolic compounds and glyoxal, glutaraldehyde, and other dialdehydes, the simplest members of this class being the 1,1,2,2-tetrakis(hydroxyphenyl) ethanes, and the like.

Another suitable class of polyhydroxy compounds include the preferred alkylene oxide adducts of aromatic amine/phenol/aldehyde ternary condensation products. The ternary condensation products are prepared by condensing an aromatic amine, for instance, aniline, toluidine, or the like; a phenol such as phenol, cresol, or the like; and an aldehyde preferably formaldehyde; at elevated temperatures in the range of, for example, from about 60° C. to 180° C. The condensation products are then recovered and reacted with said preferred alkylene oxide, using a basic catalyst (e.g., potassium hydroxide), if desired, to produce the polyols. The propylene oxide and mixed propylene-ethylene oxide adducts of aniline/phenol/formaldehyde ternary condensation products deserve particular mention.

The preferred alkylene oxide adducts of phosphorus and polyphosphorus acids are another useful class of polyols. Phosphoric acid, phosphorous acid, the polyphosphoric acids such as tripolyphosphoric acid, and the like, are desirable for use in this connection. Also useful are phosphites such as tris-(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol [for instance, 2,2-bis(4-hydroxyphenyl)-propane] with epichlorohydrin in the presence of sodium hydroxide, such as the polymers disclosed in U.S. Pat. No. 2,602,075.

The polyhydroxy compound, including mixtures thereof, employed in the foam formulation can have hydroxyl numbers which vary over a wide range. In general, the hydroxyl numbers of these polyols can range from about 20, and lower, to about 1000, and higher, preferably from about 30 to about 600, and more preferably from about 35 to about 450.

The functionality and the hydroxyl number of the polyhydroxy compound are significant factors which enter into consideration in the preparation of foams. Thus, the polyol preferably possesses a hydroxyl number of from about 200 to about 800 when employed in rigid foam formulations, from about 50 to about 250 for semi-flexible foams, and from about 20 to about 70, or more, when employed in flexible foam formulations. Such limits are not intended to be restrictive, but are merely illustrative of the large number of possible combinations.

In general, it is desirable to employ at least about one —NCO equivalent (group) per hydroxyl equivalent (group) in the preparation of the urethane foamed product. As a practical matter, a slight excess of —NCO equivalents with relation to the hydroxyl equivalents is oftentimes employed. For optimum properties, those skilled in the art can readily determine the desired concentration of the reactants. Factors which will influence the concentration are the choice and functionality of the reactants, the end product—whether flexible or rigid, the choice of the blowing agent, the use of a catalyst and/or surfactant, and other considerations.

As indicated previously, various blowing agents such as water and halogenated hydrocarbons can be employed in the preparation of the foams. The preferred blowing agents are water and certain halogen-substituted aliphatic hydrocarbons which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro - 1,2,2-trichloroethane, chloropentafluoroethane, 1 - chloro - 1 - fluoroethane, 1-chloro-2-fluoroethane, 1,1,2 - trichloro - 1,2,2-trifluoroethane, 1,1,1-trichloro-2,2,2 - trifluoroethane, 2 - chloro-1,1,1,2,3,3,4,4,4-nonafluorobutane, hexafluorocyclobutane, and octafluorocyclobutane. Other useful blowing agents include low-boiling hydrocarbons such as butane, pentane, hexane, cyclohexane, and the like. Many other compounds easily volatilized by the exotherm of the isocyanato-hydroxyl reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanato/reactive hydrogen ratio of about 1.1, about 0.005 to 0.3 mol of gas are used to provide densities ranging from 30 to 1 pounds per cubic foot, respectively.

In producing foamed reaction products, it also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymers and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers, such as those described in U.S. 2,846,458. This class of compounds differs from the above-mentioned polysiloxane-polyoloxayalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicon oil, polyethoxylated vegetable oils commercially available as "Selectrofoam 6903," "Emulphor EL-720," and others. Although the use of an emulsifier is desirable to influence the type of foam structure that is formed, the foam products of the invention can be prepared without emulsifiers in some cases.

The use of catalysts is generally desirable in the preparation of the novel foamed compositions. Among the catalysts which are contemplated include the tertiary amines, the phosphines, the organic metal compounds, and mixtures thereof, discussed supra with regard to the catalysts of the isocyanto/active hydrogen reactions. It is extremely advantageous to employ a combination of the tertiary amine compound and the organic tin compound as catalysts in the foam formulation. The catalyst is used in catalytically significant quantities. For instance, concentrations in the range of from about 0.001 weight percent, and lower, to about 2 weight percent, and higher, based on the total foam ingredients, have been found useful.

The techniques for producing polyurethane foams by the one shot, prepolymer, or semi-prepolymer methods are well known in the art, as in exemplified by the Saunders, et al. text, cited above.

In some cases it is desirable to add a small quantity, e.g., up to 5 parts per 100 parts by weight of polyol, of a dipolar aprotic solvent such as formamide, N,N-dimethylformamide, or dimethyl sulfoxide to the foaming formulation. This serves to "open up" the cell structure when there is an undesired tendency to form closed-cell foams.

A further aspect of the invention is directed to the preparation of novel laminates and/or reinforced plastic materials which exhibit outstanding and extraordinary characteristics. The novel laminates and reinforced plastic materials exhibit high impact resistance, superior weathering properties, good dye respectively, etc. Moreover, the novel laminates, in many respects, exhibit superior properties at elevated temperatures than those prepared from conventional polyesters. Though reinforced plastic prepared from such conventional polyesters enjoy commercial success, the use of polyurethane and/or polyurea systems in the subject field represents relatively new technology that does not appear to have been successfully commercialized to any noticeable extent.

The most common reinforcing material is glass, generally in the form of chopped fibers or as a woven glass cloth. The invention pertains, also to other reinforcing material which are set forth in the well documented polyester laminating art. In general, a glass fiber or mat is placed in the reinforcing formulation explained hereinafter in such a manner to essentially eliminate all trapped gases. The glass mat is often placed layer upon layer whereas the glass fiber can be dispersed in a predetermined set pattern, if desired. The formulation then can be cured in a heated mold, generally at superatmospheric pressure.

The reinforcing formulation can comprise (1) the novel polyisocyanates illustrated and/or discussed in the sections pertaining to Formulas I, III, V, and VII, and (2) a polyfunctional active hydrogen compound (especially those which contain at least two groups from the class of hydroxyl, primary amino, and secondary amino, or mixtures of such groups). When employing a novel polyisocyanate which contains a polymerizable carbon-to-carbon double bond and/or polyfunctional active hydrogen compound which contains a polymerizable carbon-to-carbon double bond, there can be incorporated into the formulation a polymerizable ethylenically unsaturated organic compound, preferably those which are free of reactive hydrogen atoms, e.g., styrene, ethylene, propylene, vinyl chloride, vinyl acetate, acrylonitrile, vinylidene chloride, butadiene, etc., and if desired, a conventional vinyl polymerization catalyst, e.g., the dihydrocarbyl peroxides, the hydrocarbyl hydroperoxides, the peralkanoic acids, and the azo-compounds. The properties of the ingredients are such that the formulation will result in a cross-linked resin under the curing conditions. The conditions and techniques employed in the conventional polyester laminating art are translatable in this respect. The above ingredients as well as the proportion of the ingredients have been illustrated throughout the specification.

The afore-described novel reinforcing formulation is, of course, useful per se, that is, without the incorporation of the filler such as glass, stone, cork, carbon black, lamp black, sand, titanium dioxide, metal turnings, ceramic, various colored pigments, and a host of other essentially inert material. Curing the reinforcing formulation results in novel urea and/or urethane products. These products (depending upon whether or not and what kind of filler is employed) can be used as sealants, gaskets, O-ring, floor and wall tile, ceramic facing on the exterior of buildings, etc. They can be machined, molded, extruded, fabricated, etc., into various shapes depending upon the type of ingredients employed. The curing of the novel "reinforcing formulation" can be conducted over a wide temperature range by employing the operative conditions noted in the discussion re the active hydrogen section supra. The ratio of the NCO/active hydrogen can be varied as discussed previously in the NCO/active hydrogen section.

Another aspect of the invention is directed to the preparation of novel adhesive formulations which exhibit superior bond strength, no discernible "creeping," etc. These adhesive formulations can be used to bond metal to metal surfaces, fiber to rubber surfaces (such as in tire cords), cellulosic (such as wood) to cellulosic surfaces, cellulosic to metal surfaces, cellulosic to rubber surfaces, and others.

In general, it should be noted that practically all of the novel aspects or embodiments described herein can be employed as adhesives when properly applied. The application of adhesive formulations is adequately covered in the literature; however, illustrative general procedures are as follows: (1) A solution comprising the novel polyisocyanate with/without rubber in an inert normally-liquid organic vehicle is coated on the metal, fabric, wood, etc. surface. Curing is then effected at room temperature. (2) A solution comprising the prepolymers, polyisocyanato polymeric products, etc. in an inert normally-liquid organic vehicle is applied to the surface to be bonded and then exposed to air for several minutes, e.g., 10 to 15 minutes. The vehicle thus evaporates and moisture from the air initiates the cure. The surfaces then are joined under moderate pressure and cured at room tempertaure or temperatures up to 200° C. (3) A solution comprising the products illustrated by Formulas V to VII contained in an inert normally liquid organic vehicle are supplied to the surface(s) to be bonded. The solvent is allowed to evaporate to form a slight tacky surface. Thereafter the cure is effected under pressure and/or elevated temperatures.

Extremely useful aspects of the invention are directed to the preparation of novel coatings. Such coatings include the one package moisture cure, the two package heat cure, the blocked isocyanates, and isocyanate modified drying oils.

In the one package moisture cure, there is dissolved in an inert normally-liquid organic vehicle a novel polyisocyanate such as illustrated by Formulas I, V, and VII. The resulting solution then is painted on the substrate to be coated. Curing is effected by reaction of the isocyanate group with moisture from the air to form urea linkages. The carbon dioxide which is formed is diffused through the thin coating. The coating can be either tightly or loosely cross-linked, depending on the mechanical properties desired. The quantity of polyisocyanate in the vehicle is readily controlled by the formulator. A prepolymer system is preferred.

In the two-package heat cure, the novel polyisocyanates described throughout this specification are reacted, either in an inert normally-liquid organic vehicle or neat, with a polyfunctional compound which preferably contains hydroxyl, primary amino, and/or secondary amino groups. The polyfunctional compounds which contain at least two hydroxyl groups are preferred. Such compounds encompass, for example, the polyols exemplified previously including the initiated lactone polyester polyols, the polyester polyols, the polyoxyalkylated polyols, the polyether polyols, the alkylene polyols, castor oil, etc. The ratio of NCO/active hydrogen is generally about one, although it can be greater than or less than one, e.g., about 0.8, and lower, to about 1.2, and higher. When the NCO/active hydrogen ratio is greater than one, the excess NCO reacts especially at elevated temperatures, or in the presence of a catalyst such as dibutyltin dilaurate, with the urethane or urea groups in the molecule to form allophanate or biuret groups respectively. The characteristics of the ultimate coating or film depend, to a significant degree, on (1) the ratio of NCO/OH, (2) the cure temperature, (3) the use of catalysts, if any, (4) the characteristics of the polyisocyanate source and the polyfunctional compound, e.g., molecular weight, functionality, etc., (5) the quantity of urethane and urea groups in the polymer chain as well as the distribution of said groups, and the like.

The two package heat cure systems get their name from the obvious fact that the art employs two packages. Thus, one package can comprise the polyisocyanate source, such as the novel prepolymers, generally contained in an inert normally liquid organic vehicle, whereas the second package can contain, for example, the polyol source in the inert vehicle. Either package could contain other ingredients such as catalyst, etc. Any of the novel polyisocyanates described previously can be employed in the two package coating systems. The polyfunctional compounds, especially the preferred polyhydroxy compounds, have been adequately illustrated supra. In addition, ethylenically unsautrated organic compounds can be employed when the polyisocyanate and/or the polyfunctional compound contain a polymerizable double bond. In such cases, the vinyl polymerization can be effected during the isocyanato/active hydrogen reaction or cure. Alternatively, the vinyl polymerization can be conducted first, followed by reacting the resultant poly(vinyl isocyanate) with the polyfunctional compounds. Of course, typical vinyl polymerization catalysts are employed if desired.

In the so-called "blocked isocyanate" systems, a "blocked isocyanate" as illustrated in the discussion re Formula III is admixed with a polyfunctional compound as illustrated in the two package system to form a solution which is stable at room temperature or slightly higher than room temperature. At elevated temperatures, e.g., about 165° C., the blocked isocyanate can be visualized as "unblocking" itself and reacting with the polyfunctional compound to thus form the coating.

The novel polyisocyanates are extremely valuable in the preparation of oil-modified polyurethanes. These systems can be prepared by reacting the novel polyisocyanates, e.g., HEDI, with hydroxyl-containing drying oil derivatives or esters. The hydroxyl bearing compounds which contain at at least one drying oil moiety (an ethylenically unsaturated fatty acid group sans the carboxyl hydrogen) can be prepared via several routes, e.g., alcoholysis, transesterification, direct esterification, etc. For instance, the transesterification of an ethylenically unsaturated glyceride with a polyol such as those illustrated previously, e.g., glycerol, 1,2,6-hexanetriol, pentaerythritol, erythritol, 1,2,4-butanetriol, sorbitol, etc., will result in a mixture of hydroxy esters. Of course, the glyceride/polyol ratio will realistically control the average number of hydroxyl groups per molecule in the resulting mixed hydroxy esters. A base, e.g., NaOH, is oftentimes used to catalyze the transesterification reaction. The mixed hydroxy esters, i.e., the hydroxyl containing oil derivatives, are neutralized with a base, e.g., NaOH, prior to reaction with the novel polyisocyanates. Another route involves the direct esterification of an ethylenically unsaturated monocarboxylic acid especially those derived from natural sources with a polyol as exemplified previously. Again the proportions are such that a compound containing both hydroxyl group(s) and drying oil group(s) will result.

In general, the oil-modified polyurethanes (known also as urethane oils) are prepared by employing an NCO/OH ratio of about one, or lower. Of course, an NCO/OH ratio greater than one results in a urethane-ester drying oil which contains isocyanato groups as well as drying oil groups. The urethane-ester drying oil can be moisture-cured through the isocyanato group(s) and/or cured with well known metal driers such as the lead, manganese, and cobalt naphthenates. It is preferred that the NCO/OH ratio be about one, or slightly lower. Apparently, the final cure centers about an oxidative mechanism or polymerization which involves the double bond(s) or the methylene group(s) adjacent to the double bond(s) of the dry oil fatty acid moiety.

The operative conditions for the preparation of the oil-modified polyurethanes as well as the numerous driers that can be employed are well documented in the literature. The arithmetical calculations involved in the determination of the aforesaid proportions are readily apparent to the routineer having ordinary skill in this art. The oil modified urethane, contained as a solution in an inert normally liquid organic vehicle as illustrated previously, generally with a catalyst such as the well known metallic driers included therein, is applied as the coating to the surface.

Illustrative of the ethylenically unsaturated aliphatic monocarboxylic acids which can be employed include, for example, oleic acid, linoleic acid. licanic acid, ricinoleic acid, hexenoic acid, hexadienoic acid, octenoic acid. Aids derived from natural sources such as, for example, castor oil, dehydrated castor oil, coconut oil, cottonseed oil, oiticaca oil, perilla oil, olive oil, safflower oil, sardine oil, soyabean oil, tall oil, linseed oil, sunflower seed oil, walnut oil, menhaden oil, poppyseed oil, tung oil, and mixtures thereof, are advantageous both from an economy standpoint and since highly useful oil modified polyurethanes result therefrom. Illustrative esters would include the esters of the preceding exemplified acids especially the glycerides of the same. Additional fatty acids and fatty oils which are contemplated are set forth in the text "Encyclopedia of Chemical Technology," Kirk-Othmer, volume 6, pages 140–298 (1951), The Interscience Encyclopedia, Inc., New York, N.Y., the appropriate portions of said text being incorporated into this specification.

In various aspects, the novel polyisocyanate compounds as well as the novel "blocked isocyanates" and the "partially blocked isocyanates" (such as would occur via the reaction of equimolar amounts of the polyisocyanate of Formula I with a monofunctional compound) with/without active hydrogen-containing compounds can be employed to treat textiles. Such treatment imparts to the treated textile a host of desirable characteristics among which the following should be noted: (1) water repellency, (2) improve wet strength, (3) reduce shrinkage, (4) improve dye-receptivity, (5) induce flame-proofing, (6) modification of cellulose and cellulosic derivatives (a) to improve water resistance, and (b) to raise softening point, and/or (7) improve resistance.

Two methods can be employed in the treatment of textiles, namely the so-called "emulsion" treatment and the "solution" treatment. In the "emulsion" method, the isocyanate-containing compound, and emulsifier, and water are mixed to form an emulsion. The textile to be treated is imersed in this emulsion, excess emulsion is then squeezed out, and the treated textile cured at elevated temperatures. In the "solution" method the textile is immersed in a solution of the isocyanate containing compound in an inert normally liquid organic vehicle, e.g., toluene, followed by air drying and curing at elevated temperatures, e.g., about 100° to 150° C. If it is desired to use an active hyddrogen compound, the textile is usually impregnated with said compound prior to immersion in the isocyanate-containing bath. In the case of monomeric isocyanates such as those exemplified by Formula I supra, the "solution" method is preferred. Flame proofing of the textile fabric can be induced through the use of the novel polyisocyanates and hydroxyl-containing phosphorus compound.

Improvement of abrasion resistance can be accomplished by the use of "blocked isocyanates" (of Formula III). The textile (e.g., fabric or yarn) to be treated is dipped into an inert solution containing the "blocked isocyanate" which can be maintained, for example, at temperatures in excess of unblocking temperature. The unblocked isocyanate then reacts with active hydrogen-containing material within the fabric or yarn, or else an active hydrogen-containing material can be included in the solution and the unblocked isocyanate reacts with it to form a coating. Of course, the novel polyisocyanates with/without an active hydrogen compound contained in an inert normally-liquid organic vehicle can be employed in this respect.

Various terms, abbreviations, designations, properties, etc., used in this specification are explained hereinbelow:

HEDI represents bis(2-isocyanatoethyl) 1,4,5,6,7,7-hexachloro-5-norbornene-2,3-dicarboxylate.
MOCA represents 4,4'-methylenebis(2-chloroaniline).
TDI represents an 80/20 mixture (by weight) of 2,4-and 2,6-tolylenediisocyanate.
DMF represents N,N-dimethylformamide.
EDA represents ethylenediamine.
Shore D hardness Shore A–2 hardness—Determined according to ASTM D1706–59T. Instruments were Shore Durometers D and A–2.

Impact resistance was determined by the Gardner Bump Test Method. The Gardner Bump Test consists of a weight which can be dropped onto a plunger from a measured height. The plunger rest on the material to be tested—the test sample being placed over a circular opening. Samples were tested at about 26° C. and were generally ¼" in thickness. The test was repeated, at a different point on the sample each time, until the sample either cracked, broke into pieces, or the limits of the weights were attained. Impact resistance was calculated by multiplying the weight by the distance dropped and recorded in "inch pounds."

Stiffness modulus—A secant modulus measure determined in the following manner. A sample in an Instron at 26° C. is extended to one percent of its original length at 0.1 inch/min. for 1 inch gauge length. The stress in p.s.i. necessary to extend the sample one percent is determined and the Stiffness Modulus determined by dividing this stress in p.s.i. by 0.01, to wit:

$$\frac{\text{P.s.i. at 1\% extension}}{0.01} = \text{Stiffness Modulus, p.s.}$$

Fadeometer test—Light source is a violet Carbon Arc Lamp which produces a spectrum from $270\mu$ through 2000 m$\mu$. Sample is rotated in the presence of said light source at 63° C. and 35 percent relative humidity. Exposed sample is compared with unexposed sample.

Standard amine analysis for isocyanate—The isocyanato-containing compound to be analyzed is weighed into a measured amount (excesses) of di-n-butylamine solution in dry toluene (in solution), and allowed to stand for 30 minutes at about 26° C. with occasional swirling. Isopropanol then is added and the excess amine is titrated with standard NCl to the bromophenol blue end point.

Hydroxyl number—The minimum number of milligrams of KOH that is required to neutralize the acid which is generated by the reaction of one gram of the hydroxy-containing compound with anhydride, e.g., acetic anhydride, or its halide. The following equation illustrates the foregoing:

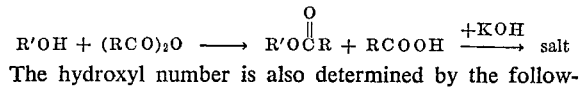

The hydroxyl number is also determined by the following equation:

$$\text{OH} = \frac{56.1 \times 1000 \times F}{M.W.}$$

wherein OH is the hydroxyl number, wherein F is the functionality, i.e., number of hydroxyl groups, of the hydroxyl-containing compound, and wherein M.W. is the molecular weight of the hydroxyl-containing compound.

Polyol A—The propylene oxide adduct of 1,2,6-hexanetriol having a hydroxyl number of 240. Preparation is as follows: 1,2,6-hexanetriol (1072 grams, 8.0 mols) are mixed with 3.0 grams of KOH, heated to 105° C., and then propylene oxide (4510 grams, 72.8 mols) are added over a period of about 4 hours, the temperature being maintained between 105° and 130° C. Magnesium silicate then is added to the resulting mixture, followed by stirring at 120° C. for 4 hours. After filtration, the filtrate is stripped at 120° C. under 12 mm. of Hg. The product has the following characteristics:

Hydroxyl No.: 240
Propyleneoxy groups per chain (aver.): 3.67

Polyol B—The propylene oxide adduct of 1,1,3-tris-(hydroxyphenyl)propane having a hydroxyl number of 245. Preparation is as follows: 1,1,3-tris(hydroxyphenyl)propane (320 grams) are mixed with 1.6 grams of NaOH, heated to about 165° C., and then propylene oxide (522 grams, 9.0 mols) are added over a period of about 25.5 hours, the temperature being maintained at about 165° C. 407 grams of the reaction product is dissolved in 800 cc. of neutral 1,4-dioxane and allowed to flow by gravity through a 35 mm. diameter x 1 foot long tube of Dowex 50–X8 cation exchange resin. The neutralized dioxane solution is stripped up to a temperature of 160° C. at a pressure of 3 millimeters of mercury. The product analyzes as follows:

Hydroxyl number: 245
Propyleneoxy groups per chain (average): 2.68

Polyol C—The propylene oxide adduct of 1,1,1-trimethylolpropane having a hydroxyl number of 359. Preparation is as follows: 1,1,1-trimethylolpropane (536 grams, 4 mols) are mixed with 1.0 gram of KOH, heated to between 75°–120° C., and then propylene oxide (1336 grams, 23 mols) are added over a period of about 54 hours, the temperature being maintained at about 110° C. The resulting reaction product mixture is treated with Amberlite IR–200 and Nalcite HCR ion exchange resins to remove KOH therefrom, followed by stripping the same to 110° C. at 9 mm. of Hg. The product analyzes as follows:

Hydroxyl No.: 359
Propyleneoxy groups per chain (average): 1.92

Polyol D—The propylene oxide adduct of sorbitol having a hydroxyl number of about 381. Preparation is as follows: Sorbitol (910 grams, 5 mols) are mixed with 2.0 grams of KOH, heated at 120° C., and then propylene oxide (3492 grams, 60.3 mols) are added over a period of about 24 hours. The resulting reaction mixture is treated with Amberlite IR–120 and Nalcite HCR ion exchange resins to remove KOH therefrom, followed by stripping the same to 130° C. at 10 mm. of Hg. The product analyzes as follows:

Hydroxyl No.: 381
Propyleneoxy groups per chain (average): 2.02

Polyol E—The propylene oxide adduct of glycerol having a hydroxyl number of 382. Preparation is as follows: Glycerol (368.4 grams, 4.0 mols) are mixed with 0.75 gram of KOH, heated to between 95°–130° C., and then propylene oxide (1393.6 grams, 24.1 mols) are added over a period of about 60 hours. The resulting reaction product is neutralized to give a propylene oxide adduct of glycerol which analyzes as follows:

Hydroxy No.: 382
Propyleneoxy groups per chain (average): 2.0

Polyol F—Polypropylene glycol having an average molecular weight of 425 (known as PPG–425).

Polyol G—Polypropylene glycol having an average molecular weight of 2025 (known as PPG–2025).

Polyol H—A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380. Preparation of this blend is as follows.

8900 grams (94.7 moles) of phenol and 23.6 grams of a 1:1 molar complex of boric and oxalic acids are charged to a reaction kettle and heated to 70° C. 556 grams (9.47 moles) of acrolein is fed into the kettle over a period of one hour while stirring at 70° C. The temperature of the reaction mixture is increased to 120° C. for one half hour. The temperature is then increased to 180° C., at atmospheric pressure to destory the acid catalyst complex. After one hour at 180° C. the pressure is gradually lowered to distill the remaining water and excess phenol. The temperature is held at 180° C. at a low pressure after phenol distillation is completed. Upon cooling a red-brown glassy product is recovered. The molecular weight of the product is 411.

1960 grams (4.77 mols) of the pulverized product from above is heated to 150° C. 4.5 grams of KOH pellets is added and after fifteen minutes stirring the propylene oxide feed is started. 2365 grams (40.8 mols) of propylene oxide is fed over a period of 24 hours at a temperature between 140° C. to 177° C. An additional 5.0 grams of KOH is added during the addition period to accelerate the reaction rate. The polyether product has a hydroxyl number of 255.

4013 grams of the above polyol is blended with 1837 grams of a propylene oxide adduct of glycerol having a hydroxyl number of 653. After removal of ionic impurities by means of ion exchange resins, the resulting polyol blend has a hydroxyl number of 380.

Polyol J—Polypropylene glycol having an average molecular weight of 1025 (known as PPG–1025).

Polyol K—The propylene oxide adduct of glycerol having a hydroxyl number of 623. Preparation is similar to that set forth in the discussion of Polyol E supra except 712 grams (12.25 mols) of propylene oxide are employed. The resulting adduct averages 1.02 propyleneoxy groups per chain.

Polyol L—The propylene oxide adduct of sorbitol having a hydroxyl number of 509. Preparation is similar to that set forth in the discussion of Polyol D supra except 2380 grams (41.1 mols) of propylene oxide are employed. The resulting adduct averages 1.37 propyleneoxy groups per chain.

Polyol N—Poly(tetramethyleneoxy)glycol prepared by polymerizing tetrahydrofuran to an average molecular weight of 3000 (known as Teracol–30).

Polyol P—The propylene oxide adduct of sucrose having a hydroxyl number of 481. Preparation is as follows: Sucrose (1710 grams, 5.0 mols) are mixed with 3 grams of KOH, heated to 195° C., and then propylene oxide (2950 grams, 50.7 mols) are added over a period of about 48 hours. The resulting reaction product is neutralized to give a propylene oxide adduct of sucrose which analyzes as follows:

Hydroxyl No.: 491.
Propyleneoxy groups per chain (average): 1.27.

Polyol R—A polyol prepared in the same manner as Polyol E except that sufficient propylene oxide is employed to give a final product which has a hydroxyl number of 56.

Polyol S—A polyol prepared by blending (a) 80 parts by weight of the propylene oxide adduct of the reaction product of aniline-phenol-formaldehyde condensation to a hydroxyl number of about 320, (b) 16 parts by weight of the propylene oxide adduct of polyphosphoric acid to a hydroxyl number of about 300, and (c) 4 parts by weight of tris(dipropylene glycol) phosphite having a hydroxyl number of about 390.

Polyol T—The propylene oxide adduct of sorbitol having a hydroxyl number of about 650.

Polyol U—A polyol prepared by blending (a) 40 parts by weight of the propylene oxide adduct of the reaction product of aniline-phenol-formaldehyde condensation to a hydroxyl number of about 320, (b) 40 parts by weight of the propylene oxide adduct of sorbitol having a hydroxyl number of about 490, and (c) 20 parts by weight of tris(dipropylene glycol) phosphite having a hydroxyl number of about 390.

Polyol V—Diethyl bis(2 - hydroxyethyl)aminoethylphosphonate having a hydroxyl number of about 440.

Polyol W—A blend of Polyol T and Polyol V in a weight ratio of 8:2 (Polyol T/Polyol V).

TMBDA—N,N,N',N'-tetramethyl-1,3-butanediamine.
DBTDA—Dibutyltin diacetate.
Ucon A—Trichlorofluoromethane.
Surfactant A—A non-hydrolyzable siloxane of the formula:

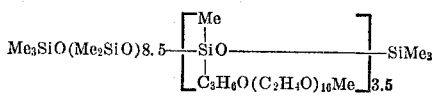

MDI—Bis(4-isocyanatophenyl)methane.
MDA—Bis(4-aminophenyl)methane.

Rigid foam test methods

Density: Measured in pounds per cubic foot (p.c.f.) of foamed material. Equipment includes a thickness gage (exerting 0.025 p.s.i. pressure on the foam) and an analytical balance. Ordinarily, skin-free two-inch cubes are tested in accord with SPI and ASTM D1622. Each dimension is measured to 0.01 inch and each specimen is weighed to 0.01 gram. Density is calculated from these values to 0.01 p.c.f. for each specimen, but is averaged to the closest 0.1 p.c.f. for the overall sample from which the specimens were taken.

Compressivve Strength: Mechanical properties are represented by the easily measured compressive yield strengths of products. Since foams are normally orthotropic, strengths are regularly measured both parallel ($\parallel$) and perpendicular ($\perp$) to the "grain" or direction of rise. Strengths are measured routinely at room and elevated temperatures and are determined occasionally at reduced temperatures.

The apparatus consists of a standard floor-model Instron testing machine with accessories, a forced-circulation cabinet which maintains desired temperatures at the machine's working area, a pair of metal stirrups to transmit forces from the Instron to the cabinet interior, and a forced-draft oven for preconditioning specimens at selected temperatures.

The skin-free two-inch cubes described previously are processed in a method based on SPI and ASTM D1621. The specimen is placed between the parallel loading plates of the Instron. As these plates approach each other (0.2 inch per minute) load and deflection are recorded automatically. Compressive strength is calculated as the maximum pounds per square inch (p.s.i.) of stress occurring below an indicated strain of 10%. Individual results are determined to the closest 0.1 p.s.i. but are averaged to whole values during analysis. This procedure applies also to the other mechanical strengths.

At room temperature (23° C.) specimens merely rest overnight in the air-conditioned test lab. At other temperatures, normally 85° C., specimens are preheated for at least 1 hour. The cabinet on the machine prevents cooling of specimens during testing.

Tensile Strength—Where actual figures are desired to study end-use problems, tensile strength can be determined at room temperature. Measurements are duplicated both $\parallel$ and $\perp$ to the rise.

Equipment includes the floor-model Instron tester with suitable load-transmitting devices, a thickness gage, red oak cubes which serve as specimens loading blocks, epoxy cement, and jigs to align specimens during assembly. Tensile methods are discussed by SPI, and in ATSM C297 and ASTM D1623.

Specimens are normally skin-free 2 x 1 x 1-inch rectangular blocks. The oak cubes are cemented to their ends after dimensions are measured in mils on the dial gage. These assemblies are placed in the machine's loading brackets and strained to rupture (at a rate of 0.2 inch per minute). Maximum tensile strength is calculated in p.s.i. from the load-deflection curve and the minimum cross-section of the specimen. This latter figure is approximately 1 square inch.

Shear Strength: ASTM–C273
Creep: ASTM–D674
Water Vapor Permeability: ASTM–C355 at 23° C.

Flammability: According to ASTM–D1692 and Underwriters' Laboratories Burning Test for Foamed Plastics, Subject 94 (December 1959).

Durability: Most uses of rigid foams require that their service life extend over a number of years. Products must therefore resist changes during aging in many possible environments. A number of accelerated tests may be employed as a check on durability and three have been selected for local use (no standard methods are known). These complement such considerations as creep and heat transfer after aging since they emphasize severe environments. In all cases, volume change and compressive strength changes (23° C. $\parallel$) reversal the effects of exposure.

The selected atmospheres are: 70° C. and 5% relative humidity for 2 weeks (dry aged), ASTM–D2126E ($\Delta$Vd); 70° C. and nearly 100% relative humidity for 4 weeks (humid aged), ASTM–D2126F (ΔVh); and —25° F. for 2 weeks (cold aged), ASTM–D–2126B (ΔVc).

Apparatus includes suitably controlled environmental test chambers, thickness gages and a water displacement apparatus for determining induced volume changes, the compressive strength equipment, and an analytical balance. The last is used both in conjunction with the displacement cup and for following weight changes of specimens in the humid oven.

Dimensional stability—Specimens of known volume are placed in the proper chamber. They are removed on completion of the cold and dry aging periods, but after 1 and 2 weeks as well as at the end of the humid test. Where the faces of specimens remain flat, average dimensions are measured on the dial indicator. Where faces warp, the weight of water displaced by aged specimens is measured. In either case, the new specimen volume is computed and "percent increase in volume" is calculated by comparison with the original value. Naturally, shrinkage is reflected by negative results.

The weight change of humid aged specimens can be reported together with volume change. Calculations are identical except that weights are substituted for volumes. Standard Enclosed Cells: ASTM–D1940.

EXAMPLE 1

Bis(2-aminoethyl) fumarate and dihydrochloride salt

A mixture containing 97 grams (1.0 mol) of monoethanolamine hydrochloride, 49 grams (0.5 mol) of maleic anhydride in 436 grams of xylene was maintained at reflux temperature, i.e., about 138° C., while anhydrous hydrogen chloride was sparged through the mixture at a rate of 0.6 mol of hydrogen chloride per mol of anhydride per hour and by-product water was removed overhead. The theoretical quantity of water (9.0 cubic centimeters) was collected over a period of 15 hours and the residue product, bis(2-aminoethyl) fumarate dihydrochloride, isolated by filtration, washed with ether and methanol, and finally dried. 46 grams of the refined product was obtained which represented a 33 percent yield of the theoretical value. The bis-(2-aminoethyl) gumarate dihydrochloride had a melting point of 197° C. and exhibited an infrared spectrum in agreement with that of the assigned structure.

Upon basification of the bis(2-aminoethyl) fumarate dihydrochloride, the free ester diamine is obtained.

EXAMPLE 2

Bis(2-isocyanatoethyl) fumarate

Phosgene was sparged through a slurry of 1067 grams (3.7 mols) of bis(2-aminoethyl) fumarate dihydrochloride in 9962 grams of ortho-dichlorobenzene at a rate of one mole per hour per mol of hydrochloride for a period of six hours. The temperature of the mixture was maintained at 140°–160° C. throughout the addition of the phosgene. Thereafter, the ortho-dichlorobenzene solvent was removed by distillation from the resultant clear solution and 937 grams of crude residue product, which represented 99 percent of the theoretical value, further refined by distillation. 800 grams of refined bis(2-isocyanatoethyl) fumarate was recovered which represented 85 percent of the theoretical value. The product had a boiling point of 147° C. at a pressure of 0.05 millimeters of mercury. Upon analysis the product had the following properties: Calculated for $C_{10}H_{10}O_6N_2$ (percent): C, 47.25; H, 3.94. Found (percent): C, 46.84; H, 4.07. Infrared spectrum was in agreement with that of the assigned structure with absorption maxima at 2.87μ (overtone of 5.85μ C=O); 3.25μ (=CH—); 4.4μ

(N=C=O)

5.85μ (ester C=O); 6.08μ (C=C); and 7.85μ and 8.05μ (ester C—O).

EXAMPLE 3

Bis(2-isocyanatoethyl)-1,4,5,6,7,7-hexachloro-5-norbornene-2,3-dicarboxylate

To a 1-liter glass kettle equipped with a stirrer, condenser, thermowell and nitrogen gas inlet was charged a mixture of 164 grams of hexachlorocyclopentadiene and 76.2 grams of bis(2-isocyanatoethyl) fumarate. The mixture was heated at 170° C. for 26 hours under a nitrogen blanket. Following completion of the heating period the charge was stripped to a kettle temperature of 160° C. at a pressure of 0.2 millimeter of mercury. The kettle residue (138 grams) was then evaporatively distilled at 190° C. at a pressure of 0.04 millimeter of mercury through a turbofilm evaporator, 58 grams of distillate being obtained. The distillate was then refined by vacuum distillation through a goose-neck still head. After removing the forefraction of 13.5 grams, 40 grams of a viscous yellow liquid was obtained which represented 25.3 percent of the theoretical yield. The product had a boiling point of 178–203° C. at a pressure of 0.06–0.12 millimeter of mercury, a refractive index, $n^{30}_D$ 1.5329, and an equivalent weight by isocyanate analysis of 256.5 (263.5 being the theoretical value for the product). An analytical sample was prepared by one further vacuum distillation. Upon analysis the product had the following composition: Calculated for $C_{15}H_{10}N_2O_6Cl_6$ (percent): C, 34.15; H, 1.89; N, 5.31. Found (percent): C, 34.19; H, 1.74; N, 4.86.

An ethereal solution of this diisocyanate reacted exothermally with an ethereal solution of n-butylamine to form a solid derivative having a melting point of 147–150° C. Recrystallization from ethanol-ethyl acetate mixture afforded pure bis[2-(butylureylene)ethyl] 1,4,5,6,7,7-hexachloro - 5 - norbornene-2,3-dicarboxylate, having a melting point of 152°–153° C. Upon analysis the derivative had the following composition: Calculated for $C_{23}H_{32}N_4O_6Cl_6$ (percent): C, 41.02; H, 4.75; N, 8.33. Found (percent): C, 41.06; H, 4.85; N, 8.34.

EXAMPLE 4

2-(1,4,5,6,7,7-hexachloro-5-norbornenyl)methyl 2,4-diisocyanatophenyl ether

To a 1000 cubic centimeter stainless steel rocking-type Parr bomb was charged a mixture of 200 milliliters glacial acetic acid, 0.75 gram platinum oxide and 25 grams 2-(1,4,5,6,7,7-hexachloro - 5 - norbornenyl)methyl 2,4-dinitrophenyl ether. At a hydrogen pressure of 30 pounds per square inch gauge and an initial temperature of 25° C., 133 pounds of hydrogen were taken up in less than 30 minutes. The crude mixture was filtered to remove catalyst and the acetic acid stripped off at reduced pressure. The residual material was neutralized with aqueous caustic soda and extracted into o-dichlorobenzene. Traces of water in the organic phase were then removed by rotary vacuum evaporation. The dried solution was then added dropwise at —5° C. to a stirred solution of 116 grams of phosgene in 200 milliliters of o-dichlorobenzene. Phosgenation was completed at 135° C. by sparging phosgene through the hot solution until the evolution of hydrogen chloride ceased. Following removal of excess phosgene and stripping of the solvent dichlorobenzene, 19 grams of a light brown solid, melting point 90°–104° C. were obtained. Evaporative distillation through a falling film evaporator operated at 230° C. and a pressure of 0.05 millimeter of mercury afforded 8 grams of yellow solid melting from 110°–1190 C. Recrystallization from n-heptane provided a pure product as glistening light yellow plates, melting point 119.5–121° C. The infrared spectrum in Nujol showed a very strong band at 4.45μ (—NCO). Upon analysis the product had the following composition: Calculated for $C_{16}H_{18}N_2C_3Cl_6$ (percent): C, 39.27; H, 1.64; N, 5.72; Cl, 43.56. Found (percent): C, 39.50; H, 1.39; N, 5.65; Cl, 43.59.

EXAMPLE 5

2-(2,4-diisocyanatophenyl)-1,4,5,6,7,7-hexachloro-5-norbornene

In an apparatus similar to that described in the previous example, 25 grams of 2-(2,4-dinitrophenyl)-1,4,5,6,7,7-hexachloro-5-norbornene was reduced in 200 milliliters of glacial acetic acid, 0.75 gram of platinum oxide being employed as catalyst. Work-up of the reduction product as described above followed by phosgenation produced a crude, brown solid product which was refined by evaporative distillation at 230° C. and a pressure of 0.1 millimeter of mercury. The distillate (11 grams) crystallized on standing to a hard, white solid, melting point 109°–115° C. This material absorbed strongly at 4.45$\mu$ (—NCO) in the infrared and analyzed at 89.6 percent apparent purity by isocyanate equivalency. Upon analysis the product had the following composition: Calculated for $C_{15}H_6N_2O_2Cl_6$ (percent): C, 39.22; H, 1.31; N, 6.10; Cl, 46.38. Found (percent): C, 39.69; H, 1.39; N, 5.87; Cl, 46.34.

EXAMPLE 6

1,4,5,6,7,7-hexachloro-5-norbornenyl-2-methyl 3,5-diisocyanatobenzoate

In a manner similar to that described in the previous two examples, 25 grams of 1,4,5,6,7,7-hexachloro-5-norbornen-2-yl-methyl 3,5-dinitrobenzoate was reduced in acetic acid solution using platinum oxide as catalyst. At a pressure of 30 pounds per square inch gauge, 12 pounds of hydrogen was absorbed in 20 minutes. Work-up of the reduction product and phosgenation in the manner described above produced, after stripping of the solvent, 21 grams of a viscous liquid residue. Turbo-film evaporative distillation of this residue at 235° C. and a produce of 0.05 millimeter of mercury afforded 7.5 grams of viscous yellow liquid which analyzed at 949. percent purity by isocyanate equivalent analysis and absorbed strongly at 4.45$\mu$ (—NCO) and at 5.82$\mu$ (Ester C=O) in the infrared. Upon analysis the product had the following composition: Calculated for $C_{17}H_8N_2O_4Cl_6$ (percent): C, 39.46; H, 11.55; N, 5.42; Cl, 41.21. Found (percent): C, 39.48; H, 1.48; N, 5.20; Cl, 41.33.

EXAMPLE 7

2-(p-isocyanatophenyl)1,4,5,6,7,7-hexachloronorborn-5-ene

To a 500 cubic centimeter 3-neck glass kettle equipped with a stirrer, thermometer, reflux condenser and gas sparging tube was charged at —10° C. a mixture of o-dichlorobenzene (300 cubic centimeters), phosgene (45 grams), and crude 2-(p-aminophenyl)-1,4,5,6,7,7-hexachloronorborn-5-ene which had been prepared from the catalytic hydrogenation of 49 grams of the precursor nitro compound. The charge was allowed to warmup to 23° C. slowly, then heat was applied and phosgene was sparged through the mixture until a clear solution was obtained at a temperature of 140–150° C. Excess phosgene was then removed by sparging with dry nitrogen and the solvent was stripped off by distillation under reduced pressure. The viscous residue (43 grams) was refined by evaporative distillation at 200° C. at a pressure of 0.05 millinmeter through a falling film-type evaporator. The distillate (34 grams) was further refined by distillation through a goose-neck still head. The refined product was obtained as a light yellow, viscous liquid having a boiling point of 146° C. at a pressure of 0.06 millimeter of mercury, which solidified on standing to a crystalline solid, having a melting point of 70–72° C. Upon analysis the product had the following composition: Calculated for $C_{14}H_7NOCl_6$ (percent): C, 40.23; H, 1.69; N, 3.35. Found (percent): C, 40.09; H, 1.71; N, 3.21.

EXAMPLE 8

1,4,5,6,7,7-hexachloronorborn-5-ene-2-methyl m-isocyanatobenzoate

In a manner similar to that described in Example 7, 15 grams of 1,4,5,6,7,7-hexachlorobicyclo[2.2.1]hept-5-enyl-methyl m-aminobenzoate was converted to the corresponding isocyanate by phosgenation. After removal of excess phosgene and stripping of the solvent, the residue (15 grams) was refined by distillation under reduced pressure. Following the removal of a fore-fraction (3.5 grams), the product was obtained as a colorless, odorless viscous liquid having a boiling point of 184–186° C. at a pressure of 0.1 millimeter of mercury and a refractive index, $n30/D$, of 1.5771. The yield was 9.6 grams. Upon analysis the product was found to have the following composition: Calculated for $C_{16}H_9NO_3Cl_6$ (percent): N, 2.94. Found (percent): N, 2.90.

EXAMPLE 9

8-(1,4,5,6,7,7-hexachloronorborn-5-en-2-yl) octyl iscoyanate

To a 100 cubic centimeter glass kettle equipped with a magnabar stirrer, a condenser and a thermometer was charged a mixture of 13.65 grams of hexachlorocyclopentadiene and 9.05 grams of 9-decenyl isocyanate. The temperature of the mixture was raised rapidly to 150–160° C. and then maintained for 3 hours, after which the crude product was stripped of low boilers by reducing the pressure to 1 millimeter of mercury while holding the temperature at 150° C. in the kettle. The residual material was refined by evaporative distillation at 190° C. and a pressure of 0.07 millimeter of mercury through a falling-film type evaporator. The distillate (16.4 grams, 72.1 percent) was further purified by vacuum distillation through a goose-neck still head. After the removal of a small heads cut, the refined material was obtained as a semi-viscous, orange-yellow liquid having a boiling point of 161–171° C. at a pressure of 0.05–0.1 millimeters of mercury, and a refractive index, $n30/D$, of 1.5230. Upon analysis the product was found to have the following composition: Calculated for $C_{16}H_{19}NOCl_5$ (percent): C, 42.32; H, 4.22; N, 3.09. Found (percent): C, 42.84; H, 4.19; N, 3.16.

EXAMPLE 10

8-(1,4,5,6-tetrachloro-7,7-dimethoxynorborn-5-en-2-yl)octyl isocyanate

In a manner similar to that described in Example 9, a mixture of 13.2 grams of 1,2,3,4-tetrachloro-5,5-dimethoxycyclopentadiene and 9.05 grams of 9-decenyl isocyanate was heated at 150–160° C. for 3 hours and then stripped of volatile materials by reducing the pressure on the system to 2–3 millimeters of mercury while maintaining a temperature of 160° C. in the kettle. The residue was purified by falling film evaporation at 210° C. at a pressure of 0.05 millimeter of mercury. The distillate (14.35 grams, 64.3 percent) was further refined by high vacuum distillation through a goose-neck still head. The refined material was obtained in the form of a mobile, yellow liquid having a boiling point of 161°–166° C. at a pressure of 0.05 millimeter of mercury and a refractive index, $n30/D$, 1.5075. Upon analysis the product had the following composition: Calculated for $C_{18}H_{25}NO_3Cl_4$ (percent): C, 48.56; H, 5.62; N, 3.14. Found (percent): C, 48.74; H, 5.55; N, 3.05.

EXAMPLE 11

Bis(2-isocyanatoethyl) 1,4,5,6-tetrachloro-7,7-dimethoxynorborn-5-ene-2,3-dicarboxylate To a 3-necked, 500 cubic centimeter glass kettle equipped with a stirrer, condenser, thermowell and nitrogen gas inlet was charged a mixture of 52.8 grams (0.2 mol) of 1,2,3,4-tetrachloro-5,5-dimethoxycyclopentadiene and 25.4 grams (0.1 mol) of bis (2-isocyanatoethyl) fumarate. The mixture was heated with stirring under a nitrogen blanket for 1.5 hours at 200° C., after which the crude product was stripped free of excess diene to a kettle temperature of 170° C. at 0.45 millimeters of mercury pressure. Distillation of the dark, viscous residue at 195° C. and at a pressure of 0.07 millimeter of mercury afforded 33 grams (64.4 percent) of a yellow-orange, viscous liquid having a refractive index, $n30/D$, of 1.5240. This liquid was further refined by high vacuum distillation through a gooseneck still-head. The refined product boiled at 205° C. at a pressure of 0.07 millimeter of mercury and had the following composition: Calculated for $C_{17}H_{16}N_2O_8Cl_{14}$ (percent): C, 39.38; H, 3.09; N, 5.41; Cl, 27.43. Found (percent): C, 39.09; H, 3.12; N, 4.92; Cl. 28.65.

EXAMPLE 12

5,6,7,8,9,9-hexachloro-1,2,3,4,4a,5,8,8a-octahydro-2-(isocyanatomethyl-1,4:5,8-dimethanonaphthalene To a 500 cubic centimeter 3-necked glass kettle equipped with a stirrer, condenser and thermometer was charged a mixture of 136.5 grams (0.5 mol) of hexachlorocyclopentadiene and 74.5 grams (0.5 mol) of 2-isocyanatomethylnorborn-5-ene. The temperature was raised rapidly to 140–150° C. and held there for 3.75 hours, a nitrogen atmosphere being maintained in the system throughout this period. On cooling the contents of the kettle solidified to a tacky mass. Thorough trituration of the solid mass with petroleum ether (60–70° C.) served to remove unreacted starting materials and to afford, after filtration, 99 grams (46.9 percent) of a light tan solid, having a melting point of 116–122° C. Recrystallization from ethyl acetate afforded fine white needles having a melting point of 123–125° C. Upon analysis the product had the following composition: Calculated for $C_{14}H_{11}NOCl_6$ (percent): C, 39.80; H, 2.61; N, 3.32; Cl, 50.47. Found (percent): C, 39.76; H, 2.71; N, 3.43; Cl. 50.39.

EXAMPLE 13

5,6,7,8 - tetrachloro-9,9-dimethoxy-1,2,3,4,4a,5,8,8a-octahydro - 2 - (isocyanatomethyl)-1,4:5,8-dimethanonaphthalene In equipment similar to that described in the previous example, a mixture of 39.6 grams (0.15 mol) of 1,2,3,4-tetrachloro - 5,5 - dimethoxycyclopentadiene, 22.35 grams (0.15 mol) of 2-isocyanatomethylnorborn-5-ene, and 50 grams of o-dichlorobenzene solvent was heated for 4 hours at 140–150° C. in a nitrogen atmosphere. Following removal of the solvent by reduced pressure distillation, unreacted starting materials were stripped from crude product by heating to a kettle temperature of 150° C. at full pump vacuum. The brown, viscous residue (43 grams) was purified by turbafilm evaporative distillation at 195° C. at a pressure of 0.03 millimeter of mercury. The refined product (37.4 grams, 60.4 percent) was obtained as a highly viscous, lemon yellow oil having a refractive index, $n30/D$, of 1.5441 and which had a purity of 97.2 percent by isocyanate titration. On standing, the oil crystallized to a solid having a melting point of 88–96° C. Upon analysis the product had the following composition: Calculated for $C_{16}H_{17}NO_3Cl_4$ (percent): C, 46.46; H, 4.12; N, 3.39; Cl, 34.37. Found (percent): C, 46.42; H, 4.29; N, 3.53; Cl, 34.56.

EXAMPLE 14

Bis(2 - isocyanatoethyl) 5,6,7,8,12,12-hexachloro-1,4:5,8-dimethano - 1,2,3,4,5,8,9,10 - octahydronaphthalene-2,3-dicraboxylate (A) Preparation of bis(2-isocyanatoethyl) 5-norbornene-2,3-dicarboxylate.—To a stainless-steel rocker-type autoclave of 1000 cubic centimeter capacity was charged a mixture of 132 grams of cyclopentadiene, 126 grams of bis(2-isocyanatoethyl) fumarate and 200 milliliters of toluene. Thereafter the autoclave temperature was raised rapidly to 170° C. and maintained at 170°–175° C. for 5 hours, during which period rocking action was employed to facilitate mixing of the reactants. A maximum pressure of 95 pounds per square inch developed within the autoclave during the heating period. After the reaction was completed the crude product was first stripped free of solvent at a pressure of 100 millimeters of mercury, and subsequently stripped to a kettle temperature of 100° C. at a pressure of 1 millimeter of mercury in order to insure the complete removal of cyclopentadiene. The residue, comprising 171 grams, was purified by evaporative distillation through a falling-film type evaporator operated at 200° C. and a pressure of 0.05 millimeter of mercury. The distillate, 132 grams, was subsequently refined by vacuum distillation to afford 126 grams, representing 78.7 percent of the theoretical yield, of a colorless, odorless, mobile liquid having a boiling point of 146°–151° C. at a pressure of 0.08–0.15 millimeter of mercury and a refractive index, $n20/D$ 1.4950. Upon analysis the product had the following composition: Calculated for $C_{15}H_{16}N_2O_6$ (percent): C, 56.25; H, 5.00; N, 8.75. Found (percent): C, 55.47; H, 5.11; N, 9.02. An ethereal solution of the isocyanate reacted exothermally with an ethereal solution of aniline to furnish a crude bis(phenylurea) derivative which, following recrystallization from aqueous methanol, melted at 169.5°–170° C. Upon analysis the derivative had the following composition: Calculated for $C_{27}H_{30}N_4O_6$ (percent): C, 64.03; H, 5.93; N, 11.08. Found (percent): C, 63.97; H, 6.02; N, 11.08.

(B) Preparation of the halogenated isocyanate.—In equipment similar to that described in Example 12, a mixture of 160 grams (0.6 mol) of bis(2-isocyanatoethyl) 5-norbornene-2,3-dicarboxylate and 273 grams (1.0 mol) of hexachlorocyclopentadiene was heated for 17 hours at 150° C. in an inert atmosphere. After removal of excess hexachlorocyclopentadiene by stripping in the manner described in Example 12, 302 grams of residue product remained. A 275 gram portion of this material was refined by evaporative distillation at 240° C. and a pressure of 0.06 millimeter of mercury through a falling film evaporator. In this manner there was obtained 140 grams (52.9 percent adjusted for the total residue product) of a viscous, orange liquid, having a refractive index, $n30/D$, 1.5410, and an indicated purity of 96.3 percent by isocyanate titration with dibutylamine. Upon analysis the product had the following composition: Calculated for $C_{20}H_{16}N_2O_6Cl_6$ (percent): C, 40.45; H, 2.70; N, 4.72. Found (percent): C, 41.03; H, 2.55; N, 4.98.

EXAMPLE 15

Bis(2 - isocyanatoethyl 5,6,7,8,11,11-hexachloro-5,8-methano - 1,2,3,4,5,8,9,10 - octahydronaphthalene-2,3-dicarboxylate (A) Preparation of bis(2-isocyanatoethyl) 4-cyclohexene - 2,3 - dicarboxylate.—To a 1000 cubic centimeter capacity stainless-steel rocker-type autoclave was charged a mixture of 140 grams of bis(2-isocyanatoethyl) fumarate, 94 grams of 1,3-butadiene and 200 milliliters of commercial xylene (mixed isomers). The autoclave temperature was raised rapidly to 150° C. and maintained at this temperature for a period of 5 hours, rocking action being maintained throughout. Following completion of the heating period, the solvent was removed by distillation at a pressure of 50 millimeters of mercury and the residue was subsequently stripped to a kettle temperature of 110° C. at a pressure of 1 millimeter of mercury. Evaporative distillation of the kettle residue through a falling-film evaporator operated at 190° C. at a pressure of 0.1 millimeter of mercury afforded 132 grams of a straw-colored, liquid product. Subsequent refining by vacuum distillation furnished 122 grams, representing 72.0 percent of the theoretical yield of a colorless, odorless liquid having a boiling point of 146°–151° C. at a pressure of 0.12 millimeter of mercury and a refractive index, $n30/D$ 1.4864. The infrared spectrum revealed bands at $3.25\mu$ (=CH—), $4.45\mu$ (—NCO), $5.8\mu$ (ester C=O), $6.06\mu$ (aliphatic C=C), 8.0 and $8.53\mu$ (ester C—O, and $15.2\mu$ (cis RCH=CHR). Upon analysis the product had the following composition: Calculated for $C_{14}H_{16}N_2O_6$ (percent): C, 54.54; H, 5.19; N, 9.08. Found (percent): C, 54.64; H, 5.29; N, 9.10.

(B) Preparation of the halogenated isocyanate.—To a 1-liter, 3-necked glass kettle equipped with a stirrer, condenser, thermometer, and nitrogen inlet was charged a mixture of 277 grams of bis(2-isocyanatoethyl) 4-cyclohexene-2,3-dicarboxylate and 491 grams of hexachlorocyclopenetadiene. Following an 18 hour reaction period at a temperature of 150° C. in a nitrogen atmosphere, excess hexachlorocyclopentadiene was removed by stripping to a kettle temperature of 125° C. at full pump vacuum. Turbafilm evaporative distilaltion at 230° C. at a pressure of 0.10 millimeters of mercury afforded 271 grams (51.9 percent) of a brown viscous oil having a refractive index, $n^{30}/D$, 1.5429, and an indicated purity of 99.1 percent by isocyanate titration. Upon analysis the product had the following composition: Calculated for $C_{19}H_{16}N_2O_6Cl_6$ (percent): C, 39.29; H, 2.76; N, 4.82; Cl, 36.65. Found (percent): C, 39.41; H, 2.84; N, 4.75; Cl, 36.91.

EXAMPLE 16

Bis[2-(n-butylureylene)ethyl]1,4,5,6,7,7-hexachloronorborn-5-ene-2,3-dicarboxylate To a stirred solution of 13.0 grams of bis(2-isocyanatoethyl) 1,4,5,6,7,7-hexachloronorborn - 5 - ene-2,3-dicarboxylate in 30 cc. tetrahydrofuran was added over a period of 10 minutes a solution of 4.0 grams of n-butylamine in 30 cc. of tetrahydrofuran. The reaction temperature rose from 24° to 55° C. during the addition. Following the 2-hour reflux, the solvent was removed by rotary vacuum evaporation. The syrupy residue turned solid when treated with a small quantity of ethyl acetate. The crude solid, without isolation, was dissolved in boiling ethyl acetate, filtered with decolorizing charcoal and allowed to cool slowly. There was obtained 10 grams (70.8 percent) of fine white needles melting from 152–153° C. Further recrystallization from ethyl acetate raised the melting point to 154–155° C.

Analysis.—Calculated for $C_{23}H_{32}N_4O_6Cl_6$: C, 41.02; H, 4.75; N, 8.33; Cl, 31.65. Found (percent): C, 41.16; H, 4.77; N, 8.34; Cl, 31.01.

EXAMPLE 17

Bis[2-(phenylureylene)ethyl]1,4,5,6,7,7-hexachloronorborn-5-ene-2,3-dicarboxylate To a stirred solution of 4.0 grams of aniline in 30 cc. of dry heptane was added dropwise over a 5-minute period a solution of 10.5 grams bis(2-isocyanatoethyl) 1,4,5,6,7,7 - hexachloronorborn-5-ene-2,3-dicarboxylate in 30 cc. of ethyl acetate. The mixture was then heated for 2 hours to a temperature range of 45–55° C. The crude product (14.0 grams, 98.5 percent) melted over a range of 127–132° C. Two recrystallizations from ethyl acetate raised the melting point to 143–145° C., after which it remained constant.

Analysis.—Calculated for $C_{27}H_{24}H_4O_6Cl_6$ (percent): C, 45.46; H, 3.37; N, 7.86; Cl, 29.87. Found (percent): C, 45.98; H, 3.47; N, 7.96; Cl, 28.39.

EXAMPLE 18

Bis[2-(morpholinoformamide)ethyl] 1,4,5,6,7,7-hexachloronorborn-5-ene-2,3-dicarboxylate To a stirred solution of 4.0 grams of morpholine in 50 cc. of tetrahydrofuran was added dropwise at ambient temperatures a solution of 10.5 grams of bis(2-isocyanatoethyl) 1,4,5,6,7,7-hexachloronorborn - 5 - ene-2,3-dicarboxylate in 30 cc. of tetrahydrofuran. The reaction exotherm carried the temperature to 45° C. at the completion of the feed period. After two hours of refluxing, the solvent was removed by rotary vacuum evaporation. The crude solid (14.0 grams) remaining was dissolved in hot chloroform and filtered with decolorizing charcoal. To the hot filtrate was added a quantity of 65–67° C. petroleum ether sufficient to produce a permanent cloudiness. The syrup which resulted crystallized on standing overnight to afford 10.5 grams (75.0 percent) of a tan solid melting over a range of 142–149° C. Two recrystallizations from ethyl acetate raised the melting point to 147–151° C.

Analysis.—Calculated for $C_{23}H_{28}N_4O_8Cl_6$ (percent): C, 39.37; H, 3.99; N, 7.99; Cl, 30.39. Found (percent): 39.88; H, 4.36; N, 7.69; Cl, 30.81.

EXAMPLE 19

Bis[2-(methyoxyformamido)ethyl] 1,4,5,6,7,7-hexachloronorborn-5-ene-2,3-dicarboxylate To a stirred solution of 1.6 grams of methanol and 3 drops of dibutyltin dilaurate in 50 cc. of tetrahydrofuran was added dropwise a solution of 10.5 grams of bis(2-isocyanatoethyl) 1,4,5,6,7,7-hexachloronorborn-5-ene-2,3-dicarboxylate in 20 cc. of tetrahydrofuran. The reaction temperature reached 32° C. at the completion of the feed period. After a 2-hour reflux, the tetrahydrofuran was evaporated, chloroform was added to the resdiue, and the hot chloroform solution was filtered with charcoal. Evaporation of the chloroform left a viscous syrup (approximately 10 grams, 84.7 percent) which solidified upon removal of the last traces of chloroform in a drying pistol. The crude white product, melting range 96–102° C., was recrystallized from isopropyl ether-ethyl acetate mixture to afford fine white needles melting from 111–113° C. Further recrystallization from the same mixed solvent raised the melting point to 113.5–115° C., after which it remained constant.

Analysis.—Calculated for $C_{17}H_{18}N_2O_8Cl_6$ (percent): C, 34.52; H, 3.05; N, 4.7; Cl, 36.05. Found (percent): C, 34.72; H, 3.00; N, 4.89; Cl, 35.93.

EXAMPLE 20

Bis[2-(thioethoxyformamido)ethyl] 1,4,5,6,7,7-hexachloronorborn-5-ene-2,3-dicarboxylate To a stirred solution of 10.5 grams of bis(2-isocyanatoethyl) 1,4,5,6,7,7-hexachloronorborn - 5 - ene-2,3-dicarboxylate in 50 cc. of tetrahydrofuran was added in one portion 2.0 grams of ethylmercaptan in 10 cc. of tetrahydrofuran. After the addition of two drops of triethylamine catalyst, the mixture was refluxed for 1 hour. The dark brown solution was evaporated to dryness, the residue taken up in diethyl ether, decolorized and filtered. After evaporation of the ether, the residual syrup was chilled until solidification occurred. Thorough drying in vacuum afforded 8.5 grams (65.4 percent) of a fine white product melting over a range of 87–92° C. Since no suitable solvent for recrystallization could be found, analysis was obtained on the crude product.

Analysis.—Calculated for $C_{18}H_{22}N_2O_6S_2Cl_6$ (percent): C, 35.05; H, 3.38; N, 4.30; Cl, 32.82. Found (percent): C, 35.14; H, 3.21; N, 4.63; Cl, 33.81.

EXAMPLE 21

Bis[2-(bicyclohept-5-enylmethylureylene)ethyl] 1,4,5,6,7,7-Hexachloronorborn-5-ene-2,3-dicarboxylate To a stirred solution of 3.0 grams of bicyclohept-5-enylmethylamine in 55 cc. of tetrahydrofuran was added dropwise at ambient temperatures over a period of 10 minutes a solution of 5.5 grams of bis(2-isocyanatoethyl) 1,4,5,6,7,7-hexachloronorborn-5-ene-2,3-dicarboxylate in 20 cc. of tetrahydrofuran. The reaction exotherm carried the temperature to 41° C., after which the charge was refluxed for 1 hour. The white solid which separated on standing overnight was collected by filtration, washed with 183° C. Evaporation of the mother liquors afforded a second crop of solid (.5 grams; total 8.0 grams, 98.7 percent) which melted over a range of 167°–173° C. after recrystallization from tetrahydrofuran-water. This material was combined with crop one for further purification. Two additional recrystallizations from aqueous tetrahydrofuran afforded a pure product as fine white crysatls, melting point 181.5–183° C.

Analysis.—Calculated for $C_{31}H_{36}N_4O_6Cl_6$ (percent): C. 48.14; H, 4.66; N, 7.24. Found (percent): C, 47.79; H, 4.75; N, 7.04.

EXAMPLE 22

Bis[(2-thiophenoxyformamido)ethyl] 1,,5,6,7,7-hexachloronorborn-5-ene-2,3-dicarboxylate A solution of 18.5 grams of bis(2-isocyanatoethyl) 1,4,5,6,7,7-hexachloronorborn-5-ene-2,3-dicarboxylate in 50 cc. of diethyl ether was added in one portion to a stirred solution of 5.0 grams of thiophenol in 50 cc. of diethyl ether. After the addition of 2 drops of triethylamine catalyst, the charge was refluxed for 3 hours. The ether was then evaporated in vacuo and the residual syrup chilled until solidification occurred. There was obtained in htis manner 14.5 grams (97.3 percent) of a light tan solid, melting point 105–113° C. Recrystallization from toluene-heptane afforded a white, powdery solid melting from 111–115° C.

Analysis.—Calculated for $C_{27}H_{22}N_2O_6S_2Cl_6$ (percent): C, 43.38; H, 2.95; N, 3.75; Cl, 28.5; Found (percent): C, 43.45; H, 2.83; N, 4.01; Cl, 28.39.

EXAMPLE 23

Bis[(2-allylureylene)ethyl)] 1,4,5,6,7,7-hexachloronor-born-5-ene-2,3-dicarboxylate To a stirred solution of 4 cc. of allylamine in 50 cc. of tetrahydrofuran was added dropwise a solution of 10.5 grams of bis(2-isocyanatoethyl) 1,4,5,6,7,7-hexachoronorborn-5-ene-2,3-dicarboxylate in 30 cc. of tetrahydrofuran. The reaction temperature rose from 24 to 45° C. during the course of the addition. After about 15 minutes of heating at reflux, a solid began to separate from the solution. After 45 minutes of refluxing the charge was cooled and the solid product was collected by filtration. The yield was 11.0 grams (85.9 percent), melting at 182–183° C. Recrystallization from aqueous tetrahydrofuran provided glistening while needles of melting point 183–184° C.

Analysis.—Calculated for $C_{21}H_{24}N_4O_6Cl_6$ (percent): C, 39.34; H, 3.77; N, 8.73; Cl, 33.21. Found (percent): C, 39.60; H, 4.00; N, 8.61; Cl, 33.29.

EXAMPLE 24

Bis{2-[3-(p-carboxyphenyl)ureido]ethyl} 1,4,5,6,7,7-hexachloro-5-norbornene-2,3-dicarboxylate An ethyl acetate (50 mls.) slurry of p-aminobenzoic acid (29.4 grams, 0.20 mol) was fed to an ethyl acetate (200 mls.) solution of bis(2-isocyanatoethyl) 1,4,5,6,7,7-hexachloro-5-norbornene-2,3-dicarboxylate (52.5 grams, 0.1 mol) at a temperature of 26° C. The mixture was stirred for an additional hour at 26° C., filtered, washed well with ethyl acetate and dried to give 48 grams (64 percent of theory) of a light tan solid.

Analysis.—Calculated for $C_{29}H_{22}N_4O_{10}Cl_6$ (percent): Cl, 28.35. Found (percent): Cl, 28.70.

Infrared spectrum was in agreement with that of the proposed structure with maxima at 3.02µ (NH); 3.41µ (—CH$_2$—); 3.82 and 4.0µ (acid OH); 5.8µ (ester C=O); 5.97µ (conj. acid C=O; 6.1µ (secondary urea C=O); 6.45µ (secondary urea NH; 6.25µ (—C=C—); 8.13µ (acid C—O).

EXAMPLE 25

Bis(2 - isocyanatoethyl) 1,4,5,6,7,7 - hexachloro-5-norbornene-2,3-dicarboxylate (26.35 grams, 0.05 mol) and polypropylene glycol of molecular weight 2025 (49.8 grams; 0.025 mol) were mixed and heated at 100° C. for 3 hours. A light brown, viscous liquid was obtained which had an equivalent weight of 1970.11 by the standard amine titration for isocyanate.

Infrared spectrum was in agreement with that for the proposed structure with maxima at 2.97µ NH; 4.35µ, NCO; 5.75µ, ester C=O; 5.80µ, carbamate C=O; 6.22µ,

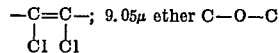

EXAMPLE 26

A solution of bis(2-isocyanatoethyl) 1,4,5,6,7,7-hexachloro-5-norbornene-2,3-dicarboxylate (25.87 grams, 0.05 mol) and polypropylene glycol of molecular weight 425 (10.6 grams, 0.025 mole) in toluene (36.47 grams, to form a 50 percent solids solution) was heated to 100° C. under an atmosphere of nirogen and maintained at this temperature for 3 hours. The amber colored solution had an equivalent weight of 774 by the standard amine titration for isocyanate.

Infrared spectrum was in agreement with the proposed structure with maxima at 3.0µ, NH; 4.4µ, NCO; 5.75µ, ester C=O; 5.8µ, carbamate C=O; 9.05µ, ether C—O—C.

EXAMPLE 27

In the same manner as Example 26, bis(2-isocyanatoethyl) 1,4,5,6,7,7-hexachloro-5-norbornene-2,3-dicarboxylate (25.87 grams; 0.05 mol), poly(tetramethyleneoxy) glycol of molecular weight 3000, (75.0 grams, 0.025 mol), and toluene (100.9 grams; to make a 50% solids solution) were heated at 100° C. for 2 hours with agitation. The pale amber colored solution had an equivalent weight of 2055 by the standard amine titration for isocyanate.

Infrared spectrum was consistent with the proposed structure.

EXAMPLE 28

In the same manner as Example 26, bis(2-isocyanatoethyl) 1,4,5,6,7,7-hexahydro-5-norbornene-2,3-dicarboxylate (25.87 grams, 0.05 mol), a poly-epsilon-caprolactone diol having an average molecular weight of about 2050 and prepared by the reaction of epsilon-caprolactone and ethylene glycol as the initiator therefor (51.4 grams; 0.025 mol), and toluene (77.3 grams; to prepare a 50 percent solids solution) were heated at 100° C. for 4.5 hours. The equivalent weight of the resulting moderately amber colored product was 1538.9 by standard amine titration for isocyanate.

Infrared data was consistent with the proposed structure.

EXAMPLE 29

Bis(2 - isocyanatoethyl) 1,4,5,6,7,7 - hexachloro-5-norbornene-2,3-dicarboxylate (25.87 grams; 0.05 mol), 1,4-cyclohexanedimethanol (3.6 grams; 0.025 mol), and toluene (29.5 grams; to prepare a 50 percent solids solution) were agitated and heated at 100° C. for 3 hours. The equivalent weight of the isocyanate was 589.9 by standard amine analysis for isocyanate.

Evaporation of the toluene gave a light tan, brittle solid. Infrared spectrum of this material was consistent with the proposed structure.

Analysis.—Calculated for $C_{38}H_{36}N_4O_{14}Cl_{12}$ (percent): N, 4.67; Found (percent): N, 4.70.

EXAMPLE 30

Bis(2 - isocyanatoethyl) 1,4,5,6,7,7 - hexachloro-5-norbornene-2,3-dicarboxylate (14.0 grams; 0.05 equivalent) and Polyol K (4.4. grams; 0.05 equivalent) were mixed well and dissolved gases removed under reduced pressure. The solution was then poured into an aluminum dish and placed in a circulating air oven for 2 hours at 100° C.

The resulting casting was dark amber colored, hard, and free of bubbles.

EXAMPLES 31-37

In the same manner as above, bis(2-isocyanatoethyl) 1,4,5,6,7,7 - hexachloro - 5-norbornene-2,3-dicarboxylate was reacted with various active hydrogen-containing compounds to give the polyurethanes noted in Table I.

TABLE I

| Ex. No. | HEDI Gms. | HEDI Eq. | Active H containing material Name | Grams | Eq. | Physical properties Shore D Hardness | Impact, inch lbs. |
|---|---|---|---|---|---|---|---|
| 31 [a] | 27.3 | 0.1 | Polyol K | 8.8 | 0.1 | 83 | 12 |
| 32 | 27.3 | 0.1 | Polyol B | 22.9 | 0.1 | 85 | 40 |
| 33 | 30.0 | 0.1 | Polyol H | 14.6 | 0.1 | 80 | |
| 34 | 15.0 | 0.05 | Polyol A | 11.55 | 0.1 | 78 (A-2) | |
| 35 | 30.0 | 0.1 | Polyol L | 10.0 | 0.01 | 84 | |
| 36 | 6.0 | 0.02 | Polyol N | 30.0 | 0.02 | 29 | |
| 37 | 6.0 | 0.02 | [b] | 20.6 | 0.02 | 37 | |

[a] Crude HEDI was used which accounts for the difference in weight.
[b] Poly-epsilon-caprolactone diol of Example 28 supra.

EXAMPLE 38

HEDI—Polyol G prepolymer (19.7 grams; 0.01 equivalent; obtained by reacting HEDI and Polyol G in such relative amounts so as to give an NCO/OH ratio of 2.0) was degassed under reduced pressure and molten MOCA (1.025 grams; 0.008 equivalent) (NCO/NH$_2$=1.3/1.0) was added and stirred in well. The resulting solution was degassed under reduced pressure and poured into Teflon coated aluminum boats. The boats were covered loosely and maintained at 100° C. in a circulating-air oven for 3 hours. The resulting elastomer was yellow, soft, and tacky. It adhered very tightly to the tray.

EXAMPLES 39-42

In the same manner as Example 38 above, the following urethane products noted in Table II below were prepared.

TABLE II

| Ex. No. | Prepolymer [a] Grams | Prepolymer [a] Equivalent | Curing agent | Grams | Equivalent | NCO active H | Description |
|---|---|---|---|---|---|---|---|
| 39 | 19.7 HEDI-polyol G | 0.01 | Poly H | 1.47 | 0.01 | 1/1 | Light yellow, soft, sticky. |
| 40 | 19.7 (HEDI-polyol G) | 0.01 | MOCA | 1.22 | 0.009 | 1.1/1 | Dark yellow, soft, sticky. |
| 41 | 15.07 Poly-(-caprolactone Diol-HEDI [b] | 0.005 | MOCA | 0.52 | 0.0038 | 1.3/1 | Tough, strong slick surface. |
| 42 | 15.07 Poly-(-caprolactone Diol-HEDI [b] | 0.005 | Polyol H | 0.73 | 0.005 | 1/1 | Do. |

[a] Prepolymer prepared by using a NCO/OH equal to 2.
[b] Poly-epsilon-caprolactone diol of Example 29 spura.

EXAMPLES 43-46

Four rigid foams were prepared via the one-shot technique using various polyols, surfactant A, N,N,N',N'-tetramethyl-1,3-butanediamine, dibutyltin diacetate, trichlorofluoromethane, and a five percent stoichiometric excess of various blends of HEDI and a polyisocyanate mixture X which was prepared by the phosgenation of the polyamine reaction products obtained via the condensation of aniline with formaldehyde at a molar ratio of approximately 1.7 to one (aniline/formaldehyde) at a temperature of from about 60°-80° C. using hydrochloric acid (about one mol per mol of formaldehyde) as the condensation catalyst. The polyisocyanate mixture X possessed an equivalent weight of approximately 137 and an MDI content of approximately 50 weight percent, the remainder being higher polymeric polyisocyanates such as the tri- and tetraisocyanates.

The four foams were oven cured at 70° C. for 20 minutes and aged at least 3 days at ambient conditions, i.e., at 23° C., before testing. The pertinent data are recorded in Table III below.

TABLE III

| Example | 43 | 44 | 45 | 46 |
|---|---|---|---|---|
| Polyol (100 parts by wt.) | S | T | U | W |
| Surfactant A [1] | 1.5 | 2.0 | 1.5 | 2.0 |
| TMBDA [1] | 0.4 | 1.0 | 1.0 | 1.0 |
| DBTDA [1] | 0.4 | 1.0 | 1.0 | 0.5 |
| Ucon A [1] | 40 | 52 | 42 | 52 |
| Polyisocyante X/HEDI: | | | | |
| Blend | 75/25 | 63/37 | 60/40 | 63/37 |
| Phr | 106 | 236 | 155 | 222 |
| Cream time sec | 13 | 20 | 15 | 15 |
| Rise time, sec | 60 | 60 | 55 | 70 |
| Tack time, sec | 45 | 55 | 40 | 60 |
| Density, p.c.f. | 1.97 | 2.05 | 2.03 | 1.95 |
| Closed cells, percent | 89 | 90 | 90 | 92 |
| Compressive strength, p.s.i.: | | | | |
| 25° C., W | 21 | 30 | 32 | 45 |
| 25° C., W | 11 | 11 | 10 | 12 |
| 85° C., W | 18 | 27 | 31 | 34 |
| 85° C., W | 11 | 12 | 10 | 13 |
| 100° C., W | 13 | 21 | 25 | 32 |
| 100° C., W | 10 | 12 | 10 | 13 |
| 120° C., W | 7 | 22 | 6 | 28 |
| 120° C., W | 4 | 11 | 3 | 12 |
| 130° C., W | 5 | 20 | 3 | |
| 130° C., W | 4 | 13 | 1 | |
| 140° C., W | | 17 | | 20 |
| 140° C., W | | 11 | | 8 |
| Percent Vd, 2 weeks | 6 | 3 | 7 | 4 |
| Percent Vh: | | | | |
| 1 week | 26 | 8 | 31 | 13 |
| 2 weeks | 36 | 10 | 40 | 15 |
| 4 weeks | 48 | 12 | 52 | 19 |
| Percent Wd, 2 weeks | 1 | 0 | 1 | 0 |
| Percent Wh: | | | | |
| 1 week | 0 | 1 | 0 | 0 |
| 2 weeks | 0 | 1 | 0. | 0 |
| 4 weeks | −1 | 1 | 1 | 1 |
| Aged 11 comp. p.s.i.: | | | | |
| Cold | | 45 | 27 | 44 |
| Dry | 47 | 48 | | 49 |
| Humid | 16 | 42 | 17 | 34 |
| Flammability: | | | | |
| Density, p.c.f. | | 2.0 | 1.94 | 1.87 |
| Ignition time, sec | 20 | 18 | 30 | 22 |
| Ext. time, sec | 33 | 35 | 35 | 25 |
| Dripping | | | [2] | [2] |
| Extent, inches | 0.7 | 0.8 | 0.6 | 0.4 |
| Chlorine in foam, percent | 4.19 | 8.8 | 8.57 | 8.57 |
| Phosphorus in foam, percent | 0.82 | 0 | 0.48 | 0.67 |

[1] Parts by weight.

EXAMPLE 47

A mixture of 71 grams of the propylene oxide adduct of glycerol prepared similarly to Polyol E but having a hydroxyl number of 165, 25 grams of polypropylene glycol having an average molecular weight of 1225, 4 grams of triisopropanol amine, 0.4 gram of Cab-O-sil M-5,* 20 grams of antimony oxide, and 0.4 gram of green dye were mixed well and the dissolved gases removed by heating at 100° C. under reduced pressure for 3 hours. Lead octoate catalyst (24% Pb, 0.07 gram) was added and the mixture was cooled to room temperature. Bis(2-isocyanatoethyl) 1,4,5,6,7,7 - hexachloro - 5-norbornene-2,3-dicarboxylate having 15.8 percent free isocyanate as determined by the standard analysis for isocyanate was added in such an amount (88.2 grams) that the ratio of free isocyanate to hydroxyl groups was 1.05/1. This mixture was poured into open molds and cured for 20 hours at 100° C.

The resulting polymeric elastomer was non-burning

*Colloidal silica.

with a match test and had the following additional physical properties:

| | |
|---|---|
| Hardness, Shore A | 83 |
| Tear, lb./inch | 75 |
| Tensile at 100% E, p.s.i. | 830 |
| Ultimate strength, p.s.i. | 995 |
| Ultimate elongation, percent | 136 |
| Compression set 21° C., 24 hrs. percent | 0.8 |

EXAMPLE 48

(A) A polyol blend consisting of the propylene oxide adduct of a phenol/aniline/formaledhyde condensation product and having a hydroxyl number of about 320 (40 grams); Polyol L (40 grams); and tris(dipropylene glycol) phosphonate (20 grams) was mixed with trichlorofluoromethane (42 grams), N,N,N',N'-tetramethyl-1,3-butanediamine (1.0 gram), and dibutyltin diacetate (1.0 gram). A rigid urethane foam was prepared from this mixture using the one-shot process by adding with vigorous stirring a blend of polymethylene polyphenylisocyanate (93 grams) and bis(2-isocyanatoethyl) 1,4,5,6,7,7-hexachloro-5-norbornene-2,3-dicarboxylate (62 grams). After about 15 seconds stirring the mixture was poured into an open mold and allowed to foam. The foam was then oven cured for 20 minutes at 70° C. The rigid non-burning foam thus obtained had the following properties:

| | |
|---|---|
| Density, lbs./ft.$^3$ | 2.0 |
| Closed cells, percent | 90 |
| Compressive strength 11 at 25° C., p.s.i. | 32 |
| Burning extent ASTM D-1692, inches | 0.6 |

(B) In the same manner as above, the use of 2-(2,4-diisocyanatophenyl) 1,4,5,6,7,7 - hexachloro-5-norbornene in lieu of bis(2-isocyanatoethyl) 1,4,5,6,7,7-hexachloro-5-norbornene2,3-dicarboxylate results in a rigid non-burning urethane foam.

(C) In the same manner as above, the use of 2-(2,4-diisocyanatophenoxy) 1,4,5,6,7,7-hexachloro-5-norbornene in lieu of bis(2-isocyanatoethyl) 1,4,5,6,7,7-hexachloro-5-norbornene-2,3-dicarboxylate results in a rigid, non-burning urethane foam.

EXAMPLE 49

(A) A quasi-prepolymer was prepared from a mixture of bis(2-isocyanatoethyl) 5-norbornene-2,3-dicarboxylate (42.2 grams, 0.13 mol) and a previously dehydrated copolylactone diol, 126.6 grams (ε-caprolactone-methyl-ε-caprolactone, 80/20 copolylactone started with diethylene glycol and extended to a molecular weight of 2000 having an equivalent weight of 1055). The diisocyanate and diol were combined in amounts which gave a ratio of NCO/OH of 2.2. The mixture was agitated and the temperature was maintained at 90° C. for 1 hour at which time the quasi-prepolymer had the desired equivalent weight of 1288 as determined by the standard amine analysis for isocyanate.

Spandex type films were prepared from the quasi-prepolymer after it had aged under nitrogen for two days. The quasi-prepolymer (12 grams) was dissolved in N,N-dimethylformamide (68 grams), charged to a stirred beaker, and the calculated amount of redistilled ethylenediamine (0.2239 gram) necessary to give a ratio of NH$_2$/NCO=0.8, as a solution in N,N-dimethylformamide (20 grams), was introduced rapidly. Stirring was continued for about 10 minutes after the addition of the diamine whereupon the solution was poured into Teflon molds and the molds placed in a circulating-air oven maintained at 80° C. The film which formed after curing 16 hours in the oven and at least one week at 26° C. had the following mechanical properties:

| | |
|---|---|
| Tensile strength, p.s.i. | 3000 |
| Elongation, percent | 1085 |
| Modulus, 100% | 90 |
| Modulus, 300% | 140 |
| Stress decay, percent | 25.7 |
| Work recovery, percent | 41 |

(B) Analogously, a Spandex type film prepared from the above described quasi-prepolymer and extended with redistilled 4,4'-methylenedianiline in lieu of ethylenediamine had the following mechanical properties:

| | |
|---|---|
| Tensile strength, p.s.i. | 2400 |
| Elongation, percent | 1078 |
| Modulus, 100% | 95 |
| Modulus, 300% | 162 |
| Stress decay, percent | 34.9 |
| Work recovery, percent | 30 |

EXAMPLE 50

Bis(2-isocyanatoethyl) 5-norbornene-2,3-dicarboxylate (24.8 grams, 0.075 mol) and Polyol N (75 grams, 0.0375 mol) were charged to a dry 200 cubic centimeter four-necked flask equipped with a stirrer, thermometer and reflux condenser. The mixture was stirred and heated at 100° C. for 3 hours. A clear, elastic sticky substance was obtained having an equivalent weight of 1157 by the standard amine titration for isocyanate. After standing one week the product somewhat solidified and became less sticky.

EXAMPLE 51

(A) The prepolymer of equivalent weight 1316 from bis(2-isocyanatoethyl) 5-norbornene - 2,3 - dicarboxylate and Polyol G prepared as described in Example 50 (26.3 grams, 0.02 equivalent) was degassed under reduced pressure and mixed with 4,4'-methylene bis(2-chloroaniline) (2.43 grams, 0.018 equivalent). The solution was then poured into an aluminum dish and placed in a circulating air oven at 100° C. for 3 hours.

The resulting yellow casting contained no bubbles and was soft, flexible and rubbery.

(B) A casting was prepared as in section A above using Polyol H as an extender in lieu of 4,4'-methylene bis(2-chloroaniline). The sample was clear, soft, flexible and slightly sticky.

EXAMPLE 52

(A) Bis(2 - cyanatoethyl) 5-norbornene-2,3-dicarboxylate (8.0 grams) and Polyol A (11.55 grams) were charged to a dried vacuum flask. The components were heated to effect solution and degassed under reduced pressure. To the degassed solution there was added a solution of styrene (9.78 grams) and benzoyl peroxide (0.193 gram) and then di-n-butyltin diacetate (2 drops). The resulting mixture was well stirred, quickly poured into an aluminum dish and placed in an oven at 100° C. for 3 minutes. A solid product was obtained which had a Shore (A–2) hardness of 58.

What is claimed is:

1. The process for preparing rigid urethane foamed products which are characterized by good mechanical and dimensional stability which comprises reacting (1) an admixture containing from about 15 to about 50 weight percent bis(2-isocyanatoethyl) 1,4,5,6,7,7 - hexachloro-5-norbornene-2,3-dicarboxylate, and from about 85 to about 50 weight percent of the monomethylene- and polymethylene polyphenylene polyisocyanates which are obtained by the phosgenation of the polyamine reaction products which result from the reaction of an admixture containing aniline and formaldehyde; (2) a polyhydroxy compound; (3) in the presence of a blowing agent.

References Cited
UNITED STATES PATENTS

| | | | |
|---|---|---|---|
| 3,256,213 | 1/1966 | Gmitter | 260—2.5 |
| 3,072,582 | 1/1963 | Frost | 260—2.5 |
| 2,901,509 | 8/1959 | Molotsky et al. | 260—571 |
| 2,901,510 | 8/1959 | Molotsky et al. | 260—578 |
| 3,141,900 | 7/1964 | Lynn et al. | 260—453 |

(Other references on following page)

UNITED STATES PATENTS

| | | | |
|---|---|---|---|
| 3,151,143 | 9/1964 | Hoch | 260—453 |
| 3,158,638 | 11/1964 | Hoch | 260—455 |
| 3,222,387 | 12/1965 | Von Brachel et al. | 260—453 |
| 3,231,595 | 1/1966 | Brotherton et al. | 260—453 |
| 3,275,679 | 9/1966 | Brotherton et al. | 260—475 |
| 3,338,944 | 8/1967 | Harper et al. | 260—453 |
| 3,470,248 | 9/1969 | Brotherton et al. | 260—563 |
| 3,414,548 | 12/1968 | Bartl et al. | 260—85.5 |
| 3,483,150 | 12/1969 | Ehrlich | 260—77.5 |
| 3,450,653 | 6/1969 | McClellan | 260—77.5 |

OTHER REFERENCES

"Heat Resistant Urethane Polymers," SPE Journal, February 1958, D'Ancicco, pp. 34 to 36.

DONALD E. CZAJA, Primary Examiner

C. W. IVY, Assistant Examiner

U.S. Cl. X.R.

260—18 TN, 37 N, 75 NT, 77.5 AT, 77.5 TB, 859

UNITED STATES PATENT OFFICE
CERTIFICATE OF CORRECTION

Patent No. 3,677,983          Issue Date July 18, 1972

Inventor(s) Thomas K. Brotherton, John W. Lynn and Robert J. Knopf

It is certified that error appears in the above-identified patent and that said Letters Patent are hereby corrected as shown below:

Column 19, line 9, "$HO_a$" should read --$_aOH$--.

Column 23, line 59, structure (b), "$-\underset{\underset{C}{\|}}{C}H$", should read --$-\underset{\underset{C}{\|}}{C}-$--.

Column 45, line 26, "491" should read --481--.

Column 46, line 5, "Compressivve" should read --Compressive--.

Column 48, line 51, "133" should read --13--.

Column 48, line 68, "1190" should read --119°C.--.

Column 49, line 44, "11.55" should read --1.55--.

Column 49, line 66, "millinmeter" should read --millimeters--.

Column 51, line 70, "dicraboxylate" should read --dicarboxylate--.

Column 53, line 18, "distilaltion" should read --distillation--.

Column 54, line 59, "$C_{18}$" should read --$C_{19}$--.

Column 54, line 75, after the words "washed with", insert, "ether and air/dried to give 3.5 grams melting point 181-".

UNITED STATES PATENT OFFICE
CERTIFICATE OF CORRECTION

Patent No. 3,677,983  Issue Date July 18, 1972

Inventor(s) Thomas K. Brotherton, John W. Lynn and Robert J. Knopf

It is certified that error appears in the above-identified patent and that said Letters Patent are hereby corrected as shown below:

Column 55, line 2, "(.5 grams)" should read --(4.5 grams)--.

Column 55, line 13, "1,,5,6,7,7," should read --1,4,5,6,7,7--.

Column 55, line 23, "htis" should read --this--.

Signed and sealed this 25th day of June 1974.

(SEAL)
Attest:

EDWARD M. FLETCHER, JR.
Attesting Officer

C. MARSHALL DANN
Commissioner of Patents